(12) United States Patent
Hokkyo et al.

(10) Patent No.: US 6,426,157 B1
(45) Date of Patent: Jul. 30, 2002

(54) PERPENDICULAR MAGNETIC RECORDING MEDIUM

(75) Inventors: Hirotaka Hokkyo; Shinzo Tsuboi; Katsumichi Tagami, all of Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/366,251

(22) Filed: Aug. 3, 1999

(30) Foreign Application Priority Data

Aug. 28, 1998 (JP) ............................................ 10-244060

(51) Int. Cl.$^7$ .............................. G11B 5/66; G11B 5/77; B32B 7/02
(52) U.S. Cl. ................. 428/694 TM; 428/212; 428/335; 428/900
(58) Field of Search ................. 428/694 TM, 900, 428/694 TB, 212, 335

(56) References Cited

U.S. PATENT DOCUMENTS

| | | | | |
|---|---|---|---|---|
| 5,851,643 A | * | 12/1998 | Honda et al. | 428/212 |
| 6,033,536 A | * | 3/2000 | Ichihara et al. | 204/192.2 |
| 6,037,052 A | * | 3/2000 | Chen et al. | 428/332 |
| 6,080,476 A | * | 6/2000 | Kanbe et al. | 428/332 |
| 6,146,776 A | * | 11/2000 | Fukuzawa et al. | 428/692 |

FOREIGN PATENT DOCUMENTS

| | | |
|---|---|---|
| JP | 5891 | 1/1983 |
| JP | 59127235 | 7/1984 |
| JP | 59191130 | 10/1984 |
| JP | 60239916 | 11/1985 |
| JP | 618719 | 1/1986 |
| JP | 1173312 | 7/1989 |
| JP | 10-334440 | 12/1998 |
| JP | 11-102510 | 4/1999 |

OTHER PUBLICATIONS

"Recording Performances and Preparation of Double Layer Medium for Perpendicular Magnetic Recording" Ouchi et al Journal of Magn. Soc. Japan; vol. 8, No. 1; 1984; pp. 17–22.

* cited by examiner

*Primary Examiner*—Paul Thibodeau
*Assistant Examiner*—Holly Rickman
(74) *Attorney, Agent, or Firm*—Hayes Soloway P.C.

(57) ABSTRACT

The present invention provides a perpendicular magnetic recording medium 11 having a perpendicular magnetization film 22 formed on a substrate 20, wherein a high perpendicular orientation film 24 having higher perpendicular orientation than that of the perpendicular magnetization film 22 is formed over or/and under the perpendicular magnetization film 22.

6 Claims, 156 Drawing Sheets

FIG. 7

| | PERPENDICULAR MAGNETIC ANISOTROPIC ENERGY Ku [×10$^6$ erg/cc] | SATURATION MAGNETIZATION Ms [emu/cc] | R [= 2Ku/4πMs$^2$] |
|---|---|---|---|
| Co$_{80}$Cr$_{17}$Ta$_3$ (at%) | 1.4 | 450 | 1.1 |
| Co$_{78}$Cr$_{19}$Ta$_3$ (at%) | 0.9 | 380 | 1.0 |
| Co$_{78}$Cr$_{18}$Pt$_2$TaLa (at%) | 1.0 | 350 | 1.3 |
| Co$_{77}$Cr$_{19}$Pt$_2$TaLa (at%) | 0.92 | 330 | 1.3 |
| Co$_{76}$Cr$_{20}$Pt$_2$TaLa (at%) | 0.61 | 260 | 1.4 |
| Co$_{75}$Cr$_{21}$Pt$_2$TaLa (at%) | 0.55 | 220 | 1.8 |
| Co$_{74}$Cr$_{22}$Pt$_2$TaLa (at%) | 0.52 | 210 | 1.9 |

FIG. 9

| FILM THICKNESS OF $Co_{78}Cr_{18}Pt_2TaLa$ [nm] | 5 | 15 | 25 | 35 | 42 | 47 | 50 | 52 | 55 |
|---|---|---|---|---|---|---|---|---|---|
| MEDIUM NOISE [$\mu$ Vrms] | 10.6 | 10.7 | 9.2 | 9.5 | 9.2 | 9.8 | 10.8 | 10.6 | 9.2 |

FIG.10

| FILM THICKNESS OF $Co_{77}Cr_{19}Pt_2TaLa$ [nm] | 5 | 15 | 25 | 35 | 42 | 47 | 50 | 52 | 55 |
|---|---|---|---|---|---|---|---|---|---|
| MEDIUM NOISE [$\mu Vrms$] | 10.8 | 10.7 | 10.2 | 10.5 | 10.2 | 10.2 | 10.1 | 10.5 | 10.3 |

FIG.11

| FILM THICKNESS OF $Co_{76}Cr_{20}Pt_2TaLa$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 5.8 | 5.7 | 5.2 | 5.5 | 5.2 | 5.2 | 5.1 | 10.5 | 10.2 |

FIG.12

| FILM THICKNESS OF $Co_{75}Cr_{21}Pt_2TaLa$ [nm] | 5 | 15 | 25 | 35 | 42 | 47 | 50 | 52 | 55 |
|---|---|---|---|---|---|---|---|---|---|
| MEDIUM NOISE [μVrms] | 5.7 | 5.9 | 5.2 | 5.5 | 5.9 | 5.2 | 5.7 | 10.5 | 11.2 |

*FIG.13*

| FILM THICKNESS OF $Co_{74}Cr_{22}Pt_2TaLa$ [nm] | 5 | 15 | 25 | 35 | 42 | 47 | 50 | 52 | 55 |
|---|---|---|---|---|---|---|---|---|---|
| MEDIUM NOISE [$\mu$ Vrms] | 5.1 | 5.7 | 5.4 | 5.5 | 5.5 | 5.7 | 5.6 | 11.4 | 11.2 |

FIG.14

| | PERPENDICULAR MAGNETIC ANISOTROPIC ENERGY Ku [×10⁶ erg/cc] | SATURATION MAGNETIZATION Ms [emu/cc] | R [=2Ku/4πMs²] |
|---|---|---|---|
| Co₇₈Cr₁₈Pt₂TaLu (at%) | 1.0 | 350 | 1.3 |
| Co₇₇Cr₁₉Pt₂TaLu (at%) | 0.92 | 330 | 1.3 |
| Co₇₆Cr₂₀Pt₂TaLu (at%) | 0.62 | 260 | 1.4 |
| Co₇₅Cr₂₁Pt₂TaLu (at%) | 0.57 | 220 | 1.8 |
| Co₇₄Cr₂₂Pt₂TaLu (at%) | 0.50 | 210 | 1.9 |

FIG.16

| FILM THICKNESS OF $Co_{78}Cr_{18}Pt_2TaLu$ [nm] | 5 | 15 | 25 | 35 | 42 | 47 | 50 | 52 | 55 |
|---|---|---|---|---|---|---|---|---|---|
| MEDIUM NOISE [μVrms] | 10.2 | 10.8 | 10.1 | 10.5 | 10.9 | 10.8 | 11.8 | 10.2 | 11.5 |

FIG.17

| FILM THICKNESS OF $Co_{77}Cr_{19}Pt_2TaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 10.7 | 11.2 | 11.0 | 10.8 | 10.0 | 10.9 | 10.4 | 10.5 | 11.8 |

*FIG.18*

| FILM THICKNESS OF $Co_{76}Cr_{20}Pt_2TaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 5.7 | 5.9 | 5.5 | 5.7 | 5.8 | 5.3 | 5.7 | 12.8 | 11.8 |

FIG.19

| FILM THICKNESS OF $Co_{75}Cr_{21}Pt_2TaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 5.8 | 5.2 | 5.9 | 5.4 | 5.9 | 5.2 | 5.4 | 11.3 | 10.1 |

*FIG. 20*

| FILM THICKNESS OF Co₇₄Cr₂₂Pt₂TaLu [nm] | 5 | 15 | 25 | 35 | 42 | 47 | 50 | 52 | 55 |
|---|---|---|---|---|---|---|---|---|---|
| MEDIUM NOISE [μVrms] | 5.7 | 5.4 | 5.2 | 5.7 | 5.5 | 5.6 | 5.6 | 11.1 | 12.9 |

FIG.21

| | PERPENDICULAR MAGNETIC ANISOTROPIC ENERGY Ku [x10$^6$ erg/cc] | SATURATION MAGNETIZATION Ms [emu/cc] | R [=2Ku/4$\pi$Ms$^2$] |
|---|---|---|---|
| Co$_{78}$Cr$_{18}$Pt$_2$LaLu (at%) | 1.0 | 350 | 1.3 |
| Co$_{77}$Cr$_{19}$Pt$_2$LaLu (at%) | 0.91 | 330 | 1.3 |
| Co$_{76}$Cr$_{20}$Pt$_2$LaLu (at%) | 0.63 | 260 | 1.4 |
| Co$_{75}$Cr$_{21}$Pt$_2$LaLu (at%) | 0.56 | 220 | 1.8 |
| Co$_{74}$Cr$_{22}$Pt$_2$LaLu (at%) | 0.51 | 210 | 1.9 |

FIG.23

| FILM THICKNESS OF $Co_{78}Cr_{18}Pt_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 10.7 | 10.6 | 10.5 | 10.9 | 10.5 | 11.2 | 11.9 | 10.4 | 11.5 |

FIG.24

| FILM THICKNESS OF Co₇₇Cr₁₉Pt₂LaLu [nm] | 5 | 15 | 25 | 35 | 42 | 47 | 50 | 52 | 55 |
|---|---|---|---|---|---|---|---|---|---|
| MEDIUM NOISE [μVrms] | 10.4 | 11.9 | 10.5 | 11.6 | 10.4 | 10.5 | 10.2 | 11.9 | 11.5 |

FIG.25

| FILM THICKNESS OF $Co_{76}Cr_{20}Pt_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 5.4 | 5.5 | 5.7 | 5.7 | 5.6 | 5.5 | 5.4 | 11.8 | 11.7 |

FIG.26

| FILM THICKNESS OF $Co_{75}Cr_{21}Pt_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 5.4 | 5.9 | 5.8 | 5.5 | 5.6 | 5.7 | 5.8 | 11.1 | 12.0 |

FIG. 27

| FILM THICKNESS OF $Co_{74}Cr_{22}Pt_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 5.8 | 5.2 | 5.2 | 5.4 | 5.5 | 5.6 | 5.9 | 13.4 | 12.8 |

FIG.28

| | PERPENDICULAR MAGNETIC ANISOTROPIC ENERGY Ku [×10⁶ erg/cc] | SATURATION MAGNETIZATION Ms [emu/cc] | R [=2Ku/4πMs²] |
|---|---|---|---|
| $Co_{78}Cr_{18}Ta_2LaLu$ (at%) | 1.0 | 350 | 1.3 |
| $Co_{77}Cr_{19}Ta_2LaLu$ (at%) | 0.90 | 330 | 1.3 |
| $Co_{76}Cr_{20}Ta_2LaLu$ (at%) | 0.60 | 260 | 1.4 |
| $Co_{75}Cr_{21}Ta_2LaLu$ (at%) | 0.54 | 220 | 1.8 |
| $Co_{74}Cr_{22}Ta_2LaLu$ (at%) | 0.52 | 210 | 1.9 |

FIG. 30

| FILM THICKNESS OF $Co_{78}Cr_{18}Ta_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 10.5 | 10.7 | 10.5 | 10.2 | 10.5 | 10.8 | 11.4 | 10.9 | 11.1 |

FIG.31

| FILM THICKNESS OF $Co_{77}Cr_{19}Ta_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 10.7 | 11.7 | 10.1 | 10.5 | 10.7 | 10.9 | 10.4 | 11.5 | 11.7 |

FIG. 32

| FILM THICKNESS OF $Co_{76}Cr_{20}Ta_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 4.7 | 4.7 | 4.7 | 4.6 | 4.6 | 4.5 | 5.4 | 11.7 | 10.4 |

FIG.33

| FILM THICKNESS OF $Co_{75}Cr_{21}Ta_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 4.8 | 4.8 | 5.4 | 5.5 | 4.9 | 4.7 | 4.9 | 11.8 | 10.7 |

FIG. 34

| FILM THICKNESS OF $Co_{74}Cr_{22}Ta_2LaLu$ [nm] | 5 | 15 | 25 | 35 | 42 | 47 | 50 | 52 | 55 |
|---|---|---|---|---|---|---|---|---|---|
| MEDIUM NOISE [$\mu Vrms$] | 5.4 | 4.8 | 4.7 | 5.4 | 5.6 | 5.6 | 4.8 | 11.7 | 12.4 |

FIG.35

| | PERPENDICULAR MAGNETIC ANISOTROPIC ENERGY Ku [×10$^6$ erg/cc] | SATURATION MAGNETIZATION Ms [emu/cc] | R [=2Ku/4πMs$^2$] |
|---|---|---|---|
| Co$_{78}$Cr$_{18}$Ta$_2$PrSr (at%) | 1.0 | 350 | 1.3 |
| Co$_{77}$Cr$_{19}$Ta$_2$PrSr (at%) | 0.89 | 330 | 1.3 |
| Co$_{76}$Cr$_{20}$Ta$_2$PrSr (at%) | 0.62 | 260 | 1.4 |
| Co$_{75}$Cr$_{21}$Ta$_2$PrSr (at%) | 0.53 | 220 | 1.8 |
| Co$_{74}$Cr$_{22}$Ta$_2$PrSr (at%) | 0.54 | 210 | 1.9 |

FIG.37

| FILM THICKNESS OF $Co_{78}Cr_{18}Ta_2PrSr$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 10.4 | 10.7 | 10.4 | 10.2 | 10.6 | 10.8 | 11.8 | 11.5 | 11.7 |

FIG.38

| FILM THICKNESS OF $Co_{77}Cr_{19}Ta_2PrSr$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 11.2 | 11.7 | 10.9 | 10.4 | 10.7 | 11.6 | 10.1 | 11.9 | 11.1 |

FIG.39

| FILM THICKNESS OF $Co_{76}Cr_{20}Ta_2PrSr$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 4.6 | 4.7 | 4.9 | 4.6 | 4.5 | 4.1 | 5.4 | 12.8 | 11.4 |

FIG. 40

| FILM THICKNESS OF $Co_{75}Cr_{21}Ta_2PrSr$ [nm] | 5 | 15 | 25 | 35 | 42 | 47 | 50 | 52 | 55 |
|---|---|---|---|---|---|---|---|---|---|
| MEDIUM NOISE [$\mu Vrms$] | 4.9 | 4.8 | 5.1 | 5.5 | 5.2 | 4.7 | 4.4 | 12.4 | 11.7 |

FIG. 41

| FILM THICKNESS OF $Co_{74}Cr_{22}Ta_2PrSr$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 5.1 | 4.8 | 4.9 | 5.0 | 5.6 | 5.7 | 4.2 | 11.1 | 12.4 |

FIG. 43

| FILM THICKNESS OF $Co_{78}Cr_{18}Pt_2TaLa$ [nm] | 5 | 15 | 25 | 35 | 42 | 47 | 50 | 52 | 55 |
|---|---|---|---|---|---|---|---|---|---|
| MEDIUM NOISE [$\mu$ Vrms] | 20.6 | 20.7 | 20.7 | 20.4 | 20.2 | 20.9 | 20.2 | 20.1 | 20.9 |

FIG. 44

| FILM THICKNESS OF $Co_{77}Cr_{19}Pt_2TaLa$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 20.8 | 20.7 | 20.8 | 21.4 | 20.7 | 21.3 | 21.9 | 20.4 | 20.1 |

FIG. 45

| FILM THICKNESS OF $Co_{76}Cr_{20}Pt_2TaLa$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 6.7 | 6.7 | 7.7 | 7.2 | 7.2 | 6.5 | 6.7 | 19.7 | 20.8 |

FIG.46

| FILM THICKNESS OF $Co_{75}Cr_{21}Pt_2TaLa$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 7.4 | 7.8 | 7.5 | 7.5 | 7.1 | 7.5 | 6.9 | 18.5 | 20.7 |

FIG. 47

| FILM THICKNESS OF $Co_{74}Cr_{22}Pt_2TaLa$ [nm] | 5 | 15 | 25 | 35 | 42 | 47 | 50 | 52 | 55 |
|---|---|---|---|---|---|---|---|---|---|
| MEDIUM NOISE [$\mu$ Vrms] | 6.7 | 6.9 | 7.2 | 6.7 | 7.5 | 6.6 | 7.6 | 19.8 | 22.9 |

FIG. 49

| FILM THICKNESS OF $Co_{78}Cr_{18}Pt_2TaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 20.2 | 20.8 | 20.1 | 20.5 | 20.2 | 20.4 | 21.7 | 20.3 | 20.9 |

FIG. 50

| FILM THICKNESS OF $Co_{77}Cr_{19}Pt_2TaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 20.7 | 20.2 | 21.0 | 20.7 | 20.8 | 20.1 | 20.2 | 20.7 | 20.2 |

FIG.51

| FILM THICKNESS OF Co$_{76}$Cr$_{20}$Pt$_2$TaLu [nm] | 5 | 15 | 25 | 35 | 42 | 47 | 50 | 52 | 55 |
|---|---|---|---|---|---|---|---|---|---|
| MEDIUM NOISE [μVrms] | 6.8 | 6.7 | 7.4 | 6.8 | 7.1 | 6.7 | 6.5 | 19.7 | 21.2 |

FIG. 52

| FILM THICKNESS OF $Co_{75}Cr_{21}Pt_2TaLu$ [nm] | 5 | 15 | 25 | 35 | 42 | 47 | 50 | 52 | 55 |
|---|---|---|---|---|---|---|---|---|---|
| MEDIUM NOISE [μVrms] | 6.9 | 6.6 | 7.4 | 7.4 | 6.9 | 6.5 | 6.7 | 19.4 | 19.6 |

FIG.53

| FILM THICKNESS OF $Co_{74}Cr_{22}Pt_2TaLu$ [nm] | 5 | 15 | 25 | 35 | 42 | 47 | 50 | 52 | 55 |
|---|---|---|---|---|---|---|---|---|---|
| MEDIUM NOISE [$\mu Vrms$] | 6.8 | 6.8 | 6.7 | 6.9 | 6.9 | 6.7 | 6.8 | 20.7 | 21.1 |

FIG. 55

| FILM THICKNESS OF $Co_{78}Cr_{18}Pt_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 20.7 | 20.6 | 20.5 | 20.9 | 19.5 | 20.2 | 20.9 | 19.9 | 20.5 |

FIG. 56

| FILM THICKNESS OF $Co_{77}Cr_{19}Pt_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 20.4 | 19.9 | 19.5 | 19.6 | 20.4 | 20.5 | 20.2 | 21.9 | 21.5 |

FIG. 57

| FILM THICKNESS OF $Co_{76}Cr_{20}Pt_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 6.8 | 6.6 | 6.8 | 6.7 | 6.4 | 6.9 | 6.7 | 20.7 | 19.7 |

FIG.58

| FILM THICKNESS OF $Co_{75}Cr_{21}Pt_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 7.6 | 7.7 | 7.5 | 7.7 | 7.7 | 6.9 | 7.4 | 20.6 | 21.4 |

FIG.59

| FILM THICKNESS OF $Co_{74}Cr_{22}Pt_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 7.7 | 7.7 | 7.5 | 7.6 | 7.7 | 7.4 | 7.5 | 19.4 | 19.9 |

FIG. 61

| FILM THICKNESS OF $Co_{78}Cr_{18}Ta_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 20.5 | 20.7 | 20.5 | 20.2 | 20.5 | 20.2 | 20.9 | 21.5 | 21.4 |

FIG. 62

| FILM THICKNESS OF $Co_{77}Cr_{19}Ta_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 20.7 | 20.7 | 20.1 | 19.5 | 19.9 | 20.4 | 20.3 | 20.4 | 21.6 |

FIG. 63

| FILM THICKNESS OF $Co_{76}Cr_{20}Ta_2LaLu$ [nm] | 5 | 15 | 25 | 35 | 42 | 47 | 50 | 52 | 55 |
|---|---|---|---|---|---|---|---|---|---|
| MEDIUM NOISE [$\mu$ Vrms] | 6.9 | 7.4 | 6.5 | 6.7 | 7.4 | 6.7 | 6.8 | 19.9 | 20.5 |

FIG. 64

| FILM THICKNESS OF $Co_{75}Cr_{21}Ta_2LaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 6.7 | 6.6 | 6.7 | 6.7 | 6.6 | 6.7 | 6.9 | 19.5 | 21.1 |

FIG.65

| FILM THICKNESS OF $Co_{74}Cr_{22}Ta_2LaLu$ [nm] | 5 | 15 | 25 | 35 | 42 | 47 | 50 | 52 | 55 |
|---|---|---|---|---|---|---|---|---|---|
| MEDIUM NOISE [$\mu$ Vrms] | 7.7 | 7.4 | 7.8 | 6.9 | 6.7 | 7.4 | 6.5 | 19.1 | 21.8 |

FIG. 67

| FILM THICKNESS OF $Co_{78}Cr_{18}Ta_2PrSr$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 20.1 | 20.9 | 20.5 | 20.3 | 20.5 | 20.7 | 21.1 | 21.0 | 21.7 |

FIG.68

| FILM THICKNESS OF $Co_{77}Cr_{19}Ta_2PrSr$ [nm] | 5 | 15 | 25 | 35 | 42 | 47 | 50 | 52 | 55 |
|---|---|---|---|---|---|---|---|---|---|
| MEDIUM NOISE [$\mu$ Vrms] | 20.4 | 20.8 | 20.1 | 19.9 | 19.2 | 19.5 | 20.7 | 20.2 | 21.9 |

FIG.69

| FILM THICKNESS OF $Co_{76}Cr_{20}Ta_2PrSr$ [nm] | 5 | 15 | 25 | 35 | 42 | 47 | 50 | 52 | 55 |
|---|---|---|---|---|---|---|---|---|---|
| MEDIUM NOISE [$\mu Vrms$] | 6.4 | 7.4 | 6.7 | 6.1 | 7.4 | 6.9 | 6.8 | 19.2 | 20.7 |

FIG. 70

| FILM THICKNESS OF $Co_{75}Cr_{21}Ta_2PrSr$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 6.4 | 6.6 | 6.4 | 6.7 | 6.9 | 6.4 | 6.3 | 19.1 | 21.7 |

FIG. 71

| FILM THICKNESS OF $Co_{74}Cr_{22}Ta_2PrSr$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 7.1 | 7.1 | 7.2 | 6.9 | 6.8 | 7.4 | 6.5 | 20.1 | 21.1 |

FIG. 73

| FILM THICKNESS OF $Co_{78}Cr_{18}Pt_2TaLa$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 20.7 | 20.3 | 20.7 | 20.9 | 20.2 | 20.7 | 19.2 | 20.0 | 19.2 |

FIG. 74

| FILM THICKNESS OF $Co_{77}Cr_{19}Pt_2TaLa$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 19.8 | 20.7 | 19.5 | 20.6 | 20.3 | 20.1 | 20.4 | 20.5 | 19.8 |

FIG. 75

| FILM THICKNESS OF $Co_{76}Cr_{20}Pt_2TaLa$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 6.8 | 7.4 | 6.7 | 7.5 | 7.4 | 6.7 | 6.9 | 21.6 | 19.1 |

FIG.76

| FILM THICKNESS OF $Co_{75}Cr_{21}Pt_2TaLa$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 6.7 | 7.6 | 7.6 | 6.7 | 6.5 | 7.7 | 7.4 | 21.1 | 23.2 |

FIG. 77

| FILM THICKNESS OF $Co_{74}Cr_{22}Pt_2TaLa$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 7.6 | 7.7 | 7.4 | 6.9 | 6.7 | 6.7 | 7.4 | 21.5 | 22.9 |

FIG. 79

| FILM THICKNESS OF $Co_{78}Cr_{18}Pt_2TaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 20.2 | 19.8 | 19.2 | 20.5 | 20.5 | 20.9 | 20.2 | 20.7 | 21.8 |

FIG. 80

| FILM THICKNESS OF $Co_{77}Cr_{19}Pt_2TaLu$ [nm] | 5 | 15 | 25 | 35 | 42 | 47 | 50 | 52 | 55 |
|---|---|---|---|---|---|---|---|---|---|
| MEDIUM NOISE [$\mu Vrms$] | 19.4 | 19.7 | 19.6 | 20.9 | 20.2 | 20.4 | 19.8 | 20.8 | 20.4 |

FIG. 81

| FILM THICKNESS OF $Co_{76}Cr_{20}Pt_2TaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 7.6 | 6.9 | 7.2 | 7.4 | 6.7 | 6.5 | 7.4 | 21.2 | 19.8 |

FIG. 82

| FILM THICKNESS OF $Co_{75}Cr_{21}Pt_2TaLu$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 7.6 | 7.2 | 7.7 | 7.6 | 7.8 | 7.7 | 6.8 | 19.2 | 22.5 |

FIG. 83

| FILM THICKNESS OF $Co_{74}Cr_{22}Pt_2TaLu$ [nm] | 5 | 15 | 25 | 35 | 42 | 47 | 50 | 52 | 55 |
|---|---|---|---|---|---|---|---|---|---|
| MEDIUM NOISE [$\mu Vrms$] | 6.7 | 7.4 | 6.9 | 7.4 | 6.6 | 6.8 | 7.3 | 20.1 | 21.7 |

FIG. 85

| FILM THICKNESS OF $Co_{78}Cr_{18}Pt_2PrSr$ [nm] | 5 | 15 | 25 | 35 | 42 | 47 | 50 | 52 | 55 |
|---|---|---|---|---|---|---|---|---|---|
| MEDIUM NOISE [μVrms] | 20.1 | 19.8 | 19.1 | 20.9 | 20.8 | 20.1 | 20.7 | 20.5 | 21.1 |

FIG. 86

| FILM THICKNESS OF Co$_{77}$Cr$_{19}$Pt$_2$PrSr [nm] | 5 | 15 | 25 | 35 | 42 | 47 | 50 | 52 | 55 |
|---|---|---|---|---|---|---|---|---|---|
| MEDIUM NOISE [μVrms] | 19.2 | 19.9 | 19.4 | 20.4 | 20.8 | 20.6 | 19.1 | 20.7 | 20.6 |

FIG. 87

| FILM THICKNESS OF $Co_{76}Cr_{20}Pt_2PrSr$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 7.1 | 6.7 | 7.7 | 7.4 | 6.2 | 6.5 | 7.1 | 21.8 | 19.7 |

FIG. 88

| FILM THICKNESS OF $Co_{75}Cr_{21}Pt_2PrSr$ [nm] | 5 | 15 | 25 | 35 | 42 | 47 | 50 | 52 | 55 |
|---|---|---|---|---|---|---|---|---|---|
| MEDIUM NOISE [$\mu$ Vrms] | 7.5 | 7.7 | 7.6 | 7.6 | 7.9 | 7.1 | 6.9 | 20.4 | 21.1 |

FIG. 89

| FILM THICKNESS OF $Co_{74}Cr_{22}Pt_2PrSr$ [nm] | 5 | 15 | 25 | 35 | 42 | 47 | 50 | 52 | 55 |
|---|---|---|---|---|---|---|---|---|---|
| MEDIUM NOISE [$\mu Vrms$] | 6.8 | 7.2 | 6.1 | 7.7 | 6.4 | 6.7 | 7.2 | 19.8 | 20.7 |

| | PERPENDICULAR MAGNETIC ANISOTROPIC ENERGY Ku [×10$^6$ erg/cc] |
|---|---|
| YCo$_5$ (at%) | 50 |
| CeCo$_5$ (at%) | 60 |
| SmCo$_5$Ti (at%) | 100 |
| LaCo$_5$ (at%) | 60 |
| PrCo$_5$ (at%) | 80 |
| Y$_2$Co$_{17}$ (at%) | 20 |
| Ce$_2$Co$_{17}$ (at%) | 30 |
| Sm$_2$Co$_{17}$Ti (at%) | 42 |
| La$_2$Co$_{17}$ (at%) | 35 |
| Pr$_2$Co$_{17}$ (at%) | 27 |

| FILM THICKNESS OF YCo$_5$ [nm] | 5 | 15 | 25 | 35 | 42 | 47 | 50 | 52 | 55 |
|---|---|---|---|---|---|---|---|---|---|
| MEDIUM NOISE [μVrms] | 5.7 | 4.9 | 5.3 | 5.5 | 4.8 | 4.9 | 4.7 | 11.6 | 11.2 |

FIG. 94

| FILM THICKNESS OF CeCo$_5$ [nm] | 5 | 15 | 25 | 35 | 42 | 47 | 50 | 52 | 55 |
|---|---|---|---|---|---|---|---|---|---|
| MEDIUM NOISE [μVrms] | 4.8 | 4.5 | 5.5 | 5.5 | 4.7 | 5.3 | 4.5 | 12.2 | 12.5 |

FIG. 96

| FILM THICKNESS OF SmCo$_5$Ti [nm] | 5 | 15 | 25 | 35 | 42 | 47 | 50 | 52 | 55 |
|---|---|---|---|---|---|---|---|---|---|
| MEDIUM NOISE [μVrms] | 4.8 | 4.6 | 4.7 | 4.5 | 4.7 | 4.6 | 4.8 | 11.9 | 11.3 |

FIG. 98

| FILM THICKNESS OF LaCo$_5$ [nm] | 5 | 15 | 25 | 35 | 42 | 47 | 50 | 52 | 55 |
|---|---|---|---|---|---|---|---|---|---|
| MEDIUM NOISE [μVrms] | 4.8 | 4.5 | 4.9 | 4.7 | 4.6 | 4.4 | 4.7 | 12.4 | 12.5 |

FIG.100

| FILM THICKNESS OF PrCo₅ [nm] | 5 | 15 | 25 | 35 | 42 | 47 | 50 | 52 | 55 |
|---|---|---|---|---|---|---|---|---|---|
| MEDIUM NOISE [μVrms] | 5.2 | 5.9 | 5.9 | 5.4 | 4.7 | 5.2 | 5.4 | 20.8 | 19.1 |

FIG.102

| FILM THICKNESS OF $Y_2Co_{17}$ [nm] | 5 | 15 | 25 | 35 | 42 | 47 | 50 | 52 | 55 |
|---|---|---|---|---|---|---|---|---|---|
| MEDIUM NOISE [μVrms] | 4.8 | 4.7 | 4.5 | 4.4 | 4.7 | 4.8 | 4.6 | 20.2 | 20.8 |

FIG.104

| FILM THICKNESS OF $Ce_2Co_{17}$ [nm] | 5 | 15 | 25 | 35 | 42 | 47 | 50 | 52 | 55 |
|---|---|---|---|---|---|---|---|---|---|
| MEDIUM NOISE [$\mu$ Vrms] | 5.5 | 5.7 | 5.7 | 5.6 | 5.2 | 4.9 | 5.5 | 12.8 | 10.6 |

FIG.106

| FILM THICKNESS OF $Sm_2Co_{17}Ti$ [nm] | 5 | 15 | 25 | 35 | 42 | 47 | 50 | 52 | 55 |
|---|---|---|---|---|---|---|---|---|---|
| MEDIUM NOISE [$\mu Vrms$] | 4.9 | 5.5 | 4.7 | 4.9 | 4.6 | 4.4 | 4.8 | 11.2 | 11.8 |

FIG.108

| FILM THICKNESS OF $La_2Co_{17}$ [nm] | 5 | 15 | 25 | 35 | 42 | 47 | 50 | 52 | 55 |
|---|---|---|---|---|---|---|---|---|---|
| MEDIUM NOISE [$\mu$ Vrms] | 5.1 | 5.5 | 5.6 | 5.5 | 5.4 | 4.8 | 4.7 | 11.2 | 12.7 |

FIG. 110

| FILM THICKNESS OF $Pr_2Co_{17}$ [nm] | 5 | 15 | 25 | 35 | 42 | 47 | 50 | 52 | 55 |
|---|---|---|---|---|---|---|---|---|---|
| MEDIUM NOISE [μVrms] | 4.7 | 5.4 | 4.6 | 4.7 | 5.2 | 5.7 | 4.9 | 12.7 | 11.3 |

FIG. 111

| | PERPENDICULAR MAGNETIC ANISOTROPIC ENERGY Ku [$\times 10^6$ erg/cc] |
|---|---|
| $BaFe_{12}O_{19}$ (at%) | 3.3 |
| $BaFe_{18}O_{27}$ (at%) | 3.0 |
| $SrFe_{12}O_{19}$ (at%) | 3.4 |
| $SrFe_{18}O_{27}$ (at%) | 3.1 |
| $Pt_{50}Co_{50}$ (at%) | 10 |

FIG.113

| FILM THICKNESS OF $BaFe_{12}O_{19}$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 4.7 | 4.4 | 4.8 | 4.7 | 4.6 | 4.7 | 4.8 | 10.2 | 11.8 |

FIG.115

| FILM THICKNESS OF $BaFe_{18}O_{27}$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 4.6 | 4.2 | 4.9 | 4.5 | 4.5 | 5.4 | 4.6 | 11.7 | 10.7 |

FIG.117

| FILM THICKNESS OF SrFe$_{12}$Co$_{19}$ [nm] | 5 | 15 | 25 | 35 | 42 | 47 | 50 | 52 | 55 |
|---|---|---|---|---|---|---|---|---|---|
| MEDIUM NOISE [μVrms] | 4.5 | 4.7 | 4.6 | 4.7 | 4.5 | 4.7 | 4.7 | 11.8 | 12.8 |

FIG.119

| FILM THICKNESS OF $SrFe_{18}Co_{27}$ [nm] | 5 | 15 | 25 | 35 | 42 | 47 | 50 | 52 | 55 |
|---|---|---|---|---|---|---|---|---|---|
| MEDIUM NOISE [μVrms] | 5.4 | 4.8 | 4.9 | 4.6 | 4.7 | 4.9 | 4.7 | 10.8 | 10.8 |

*FIG.121*

| FILM THICKNESS OF Pt$_{50}$Co$_{50}$ [nm] | 5 | 15 | 25 | 35 | 42 | 47 | 50 | 52 | 55 |
|---|---|---|---|---|---|---|---|---|---|
| MEDIUM NOISE [μVrms] | 5.7 | 5.9 | 5.4 | 5.6 | 5.7 | 5.8 | 5.9 | 11.8 | 12.1 |

FIG.123

| FILM THICKNESS OF YCo$_5$ [nm] | 5 | 15 | 25 | 35 | 42 | 47 | 50 | 52 | 55 |
|---|---|---|---|---|---|---|---|---|---|
| MEDIUM NOISE [μVrms] | 6.8 | 7.1 | 6.5 | 6.7 | 6.8 | 7.5 | 7.4 | 20.2 | 19.8 |

FIG.125

| FILM THICKNESS OF CeCo$_5$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 6.8 | 6.7 | 6.8 | 6.6 | 6.4 | 6.3 | 6.8 | 19.4 | 20.4 |

FIG.127

| FILM THICKNESS OF SmCo₅Ti [nm] | 5 | 15 | 25 | 35 | 42 | 47 | 50 | 52 | 55 |
|---|---|---|---|---|---|---|---|---|---|
| MEDIUM NOISE [μVrms] | 6.7 | 6.5 | 6.4 | 6.8 | 6.7 | 6.9 | 6.4 | 20.6 | 21.5 |

FIG.129

| FILM THICKNESS OF $LaCo_5$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 7.4 | 6.8 | 7.2 | 7.6 | 6.7 | 7.3 | 6.8 | 19.8 | 20.9 |

FIG.131

| FILM THICKNESS OF PrCo$_5$ [nm] | 5 | 15 | 25 | 35 | 42 | 47 | 50 | 52 | 55 |
|---|---|---|---|---|---|---|---|---|---|
| MEDIUM NOISE [μVrms] | 6.7 | 6.8 | 6.7 | 7.3 | 6.9 | 7.4 | 7.3 | 19.3 | 21.4 |

FIG.133

| FILM THICKNESS OF $Y_2Co_{17}$ [nm] | 5 | 15 | 25 | 35 | 42 | 47 | 50 | 52 | 55 |
|---|---|---|---|---|---|---|---|---|---|
| MEDIUM NOISE [$\mu$ Vrms] | 7.6 | 7.8 | 7.4 | 6.9 | 7.6 | 6.7 | 7.5 | 21.2 | 22.2 |

FIG.135

| FILM THICKNESS OF $Ce_2Co_{17}$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 6.7 | 7.5 | 6.8 | 7.4 | 6.8 | 6.6 | 6.4 | 19.7 | 21.6 |

FIG.137

| FILM THICKNESS OF Sm$_2$Co$_{17}$Ti [nm] | 5 | 15 | 25 | 35 | 42 | 47 | 50 | 52 | 55 |
|---|---|---|---|---|---|---|---|---|---|
| MEDIUM NOISE [μVrms] | 6.9 | 7.5 | 6.5 | 7.7 | 6.9 | 7.2 | 7.7 | 19.4 | 21.1 |

FIG.139

| FILM THICKNESS OF $La_2Co_{17}$ [nm] | 5 | 15 | 25 | 35 | 42 | 47 | 50 | 52 | 55 |
|---|---|---|---|---|---|---|---|---|---|
| MEDIUM NOISE [μVrms] | 6.8 | 6.4 | 7.6 | 7.7 | 7.4 | 7.2 | 7.7 | 19.6 | 20.4 |

FIG.141

| FILM THICKNESS OF $Pr_2Co_{17}$ [nm] | 5 | 15 | 25 | 35 | 42 | 47 | 50 | 52 | 55 |
|---|---|---|---|---|---|---|---|---|---|
| MEDIUM NOISE [$\mu$Vrms] | 6.6 | 6.8 | 6.9 | 6.4 | 6.9 | 6.7 | 6.9 | 19.9 | 21.6 |

FIG. 143

| FILM THICKNESS OF BaFe$_{12}$O$_{19}$ [nm] | 5 | 15 | 25 | 35 | 42 | 47 | 50 | 52 | 55 |
|---|---|---|---|---|---|---|---|---|---|
| MEDIUM NOISE [μVrms] | 6.8 | 6.9 | 6.9 | 6.5 | 6.6 | 6.8 | 6.9 | 19.7 | 20.1 |

FIG.145

| FILM THICKNESS OF BaFe$_{18}$O$_{27}$ [nm] | 5 | 15 | 25 | 35 | 42 | 47 | 50 | 52 | 55 |
|---|---|---|---|---|---|---|---|---|---|
| MEDIUM NOISE [μVrms] | 6.9 | 6.4 | 6.7 | 6.5 | 6.6 | 6.4 | 6.2 | 18.9 | 21.6 |

FIG.147

| FILM THICKNESS OF SrFe₁₂O₁₉ [nm] | 5 | 15 | 25 | 35 | 42 | 47 | 50 | 52 | 55 |
|---|---|---|---|---|---|---|---|---|---|
| MEDIUM NOISE [μVrms] | 6.6 | 6.9 | 6.6 | 6.8 | 6.5 | 6.9 | 6.7 | 21.4 | 22.1 |

FIG.149

| FILM THICKNESS OF SrFe$_{18}$O$_{27}$ [nm] | 5 | 15 | 25 | 35 | 42 | 47 | 50 | 52 | 55 |
|---|---|---|---|---|---|---|---|---|---|
| MEDIUM NOISE [μVrms] | 6.9 | 6.6 | 6.9 | 6.7 | 6.7 | 6.6 | 6.2 | 21.7 | 20.2 |

FIG.151

| FILM THICKNESS OF $Pt_{50}Co_{50}$ [nm] | 5 | 15 | 25 | 35 | 42 | 47 | 50 | 52 | 55 |
|---|---|---|---|---|---|---|---|---|---|
| MEDIUM NOISE [μVrms] | 6.7 | 6.9 | 6.4 | 6.6 | 6.7 | 6.8 | 6.9 | 21.8 | 22.1 |

FIG.153

| FILM THICKNESS OF SmCo5Ti [nm] | 5 | 15 | 25 | 35 | 42 | 47 | 50 | 52 | 55 |
|---|---|---|---|---|---|---|---|---|---|
| MEDIUM NOISE [μVrms] | 7.4 | 7.5 | 7.7 | 7.6 | 6.7 | 7.1 | 7.4 | 19.3 | 20.8 |

*FIG.155*

| FILM THICKNESS OF Sm$_2$Co$_{17}$Ti [nm] | 5 | 15 | 25 | 35 | 42 | 47 | 50 | 52 | 55 |
|---|---|---|---|---|---|---|---|---|---|
| MEDIUM NOISE [μVrms] | 6.9 | 6.5 | 6.5 | 6.7 | 6.9 | 6.2 | 6.7 | 20.4 | 20.1 |

PERPENDICULAR MAGNETIC RECORDING MEDIUM

BACKGROUND OF THE INVENTION

1. Field of the Invention

The present invention relates to a perpendicular magnetic recording medium used as a magnetic disc.

2. Description of the Related Art

Recently, with progress of personal computers and work stations, the hard disc has been required to have a large capacity and small size, i.e., a high density. However, in order to realize a high recording density in the conventional longitudinal direction recording method, there are various problems. For example, if the recording bit is made smaller, there arises a problem of thermal fluctuation of recording magnetization and a problem of high coercive force which may exceed the recording capability of the recording head. To cope with this, a perpendicular magnetic recording method has been studied as means to significantly increase the recording density.

FIG. 156 is a cross sectional view of such a conventional magnetic recording medium. In this perpendicular magnetic recording medium 50, a perpendicular magnetization film 54 having a perpendicular magnetic anisotropy is formed on a substrate 56. For example, CoCr alloys are used for the perpendicular magnetization film (Journal of Magn. Soc. Japan, Vol. 8, No. 1, 1984, pp.17–22).

However, in such a conventional perpendicular magnetic recording medium, there has been a problem that medium noise characteristic is very bad in a low recording density region. This is because the perpendicular magnetization film 54 is magnetized perpendicularly, and a demagnetizing field caused by the magnetic poles generated on the medium surface generates a reversed-magnetic domain. The lower is the recording density, the more the reversed-magnetic domains are generated. This has been the main cause to deteriorate the medium noise characteristic in the low recording density region. This medium noise increase in the low recording density region becomes a big trouble when forming a high-density information recording apparatus.

In order to reduce the effect of the demagnetizing field generated by the magnetic pole generated on the medium surface, there has been suggested to provide a soft magnetic layer under the perpendicular magnetization film so as to reduce the magnetic poles generated at the boundary between the perpendicular magnetization film and the soft magnetic layer (Japanese Patent Publication (examined) B58-91). This is generally known as a perpendicular two-layered magnetic recording medium.

However, in this two-layered perpendicular magnetic recording medium, if a perpendicular magnetization film is provided on a soft magnetic layer such as NiFe (Permalloy), there arises a problem that the soft magnetic layer generates a spike-shaped noise, disabling to obtain a preferable medium S/N ratio.

To cope with this, Japanese Patent Publication (unexamined) A59-127235, Japanese Patent Publication (unexamined) A59-191130, Japanese Patent Publication (unexamined) A60-239916, Japanese Patent Publication (unexamined) A61-8719, and Japanese Patent Publication (unexamined) A1-173312 suggest use of a perpendicular magnetization film on a backing layer made from Co or a Co alloy which is more advantageous than use of the permalloy soft magnetic layer.

However, the inventor of the present invention has found that when these soft magnetic films are used, these films easily absorb an external magnetic field generated by a magnetic disc rotation spindle motor. This results in concentration of the magnetic flux in a magnetic head and losing of recording signals. That is, the perpendicular magnetic recording medium of the two-layered film configuration can reduce the effect of the demagnetizing field caused by the magnetic poles generated on the medium surface, but this cannot be a solution for medium noise reduction.

SUMMARY OF THE INVENTION

It is therefore an object of the present invention to provide a perpendicular magnetic recording medium having a reduced effect of the demagnetizing field caused by a magnetic poles generated on a perpendicular magnetization film surface and having a preferable medium noise characteristic in a low recording density region.

The perpendicular magnetic recording medium according to the present invention has a perpendicular magnetization film formed on a substrate, wherein a high perpendicular orientation film having higher perpendicular orientation than the perpendicular magnetization film is formed over or/and under the perpendicular magnetization film.

A backing soft magnetic film may be formed under the high perpendicular orientation film, or under the perpendicular magnetic film if there is no high perpendicular orientation film under the perpendicular magnetization film.

It is preferable that the high perpendicular orientation film have a perpendicular magnetic anisotropic energy Ku [erg/cc] and a saturation magnetization Ms [emu/cc] which are in the relationship R defined as $2Ku/4\pi Ms^2$ equal to or greater than ($\geq$) 1.4.

Moreover, it is preferable that the high perpendicular orientation film have a greater perpendicular magnetic anisotropic energy than that of the perpendicular magnetization film. The perpendicular magnetic anisotropic energy of the high perpendicular orientation film is preferably equal to or greater than $1 \times 10^6$ [erg/cc], and more preferably equal to or greater than $2 \times 10^7$ [erg/cc]. The high perpendicular orientation film preferably has a thickness equal to or greater than 50 [nm]

The high perpendicular orientation film is preferably made from: a CoCrM alloy (wherein M represent three elements selected from a group consisting of Pt, Ta, La, Lu, Pr, and Sr); an alloy containing $RCo_5$ (R=Y, Ce, Sm, La, Pr) as a main content; an alloy containing $R_2Co_{17}$ (R=Y, Ce, Sm, La, Pr) as a main content; Ba ferrite ($BaFe_{12}O_{19}$ $BaFe_{18}O_{27}$ and the like); Sr ferrite ($SrFe_{12}O_{19}$, $SrFe_{18}O_{27}$ and the like), PtCo, and the like.

The backing soft magnetic film is preferably made from FeSiAl, FesiAl alloy, FeTaN, FeTaN alloy, and the like.

In the perpendicular magnetic recording medium according to the present invention, the perpendicular magnetization film on its upper surface or lower surface a high perpendicular orientation film having a higher perpendicular orientation than that of the perpendicular magnetization film. Accordingly, it is possible to significantly suppress generation of a reversed magnetic domain in the vicinity of the surface of the perpendicular magnetization film.

When the high perpendicular orientation film is made from a CoCr alloy, it is preferable that the perpendicular magnetic anisotropic energy Ku [erg/cc] and the saturation magnetization Ms [emu/cc] be in the relationship as $R=2Ku/4\pi Ms^2$ wherein $R \geq 1.4$.

On the other hand, when the high perpendicular orientation film is made from a SmCo alloy (i.e., a material other than the CoCr alloy), it is preferable that the high perpendicular orientation film have a perpendicular magnetic anisotropic energy Ku greater than that of the perpendicular magnetization film. This enables to reduce generation of reversed magnetic domain in the vicinity of the surface of the perpendicular magnetization film.

BRIEF DESCRIPTION OF THE DRAWINGS

FIG. 7 is a table showing values of perpendicular magnetic anisotropic energy Ku and saturation magnetization Ms for each of the Examples of the present invention.

FIG. 9 is a table showing relationships between the film thickness and the medium noise in Example 1 of the present invention.

FIG. 10 is another table showing relationships between the film thickness and the medium noise in the Example 1 of the present invention.

FIG. 11 is still another table showing relationship between the film thickness and the medium noise in the Example 1 of the present invention.

FIG. 12 is yet another table showing relationships between the film thickness and the medium noise in the Example 1 of the present invention.

FIG. 13 is still yet another table showing relationships between the film thickness and the medium noise in the Example 1 of the present invention.

FIG. 14 is a table showing values of the perpendicular magnetic anisotropic energy Ku and saturation magnetization Ms for the respective Examples of the present invention.

FIG. 16 is another table showing the relationship between the film thickness and the medium noise in Example 2 of the present invention.

FIG. 17 is still another table showing the relationship between the film thickness and the medium noise in Example 2 of the present invention.

FIG. 18 is yet another table showing the relationship between the film thickness and the medium noise in Example 2 of the present invention.

FIG. 19 is still yet another table showing the relationship between the film thickness and the medium noise in Example 2 of the present invention.

FIG. 20 is yet another table showing the relationship between the film thickness and the medium noise in Example 2 of the present invention.

FIG. 21 is a table showing values of the perpendicular magnetic anisotropic energy Ku and saturation magnetization Ms for the respective Examples of the present invention.

FIG. 23 is a table showing the relationship between the film thickness and the medium noise in Example 3 of the present invention.

FIG. 24 is another table showing the relationship between the film thickness and the medium noise in Example 3 of the present invention.

FIG. 25 is still another table showing the relationship between the film thickness and the medium noise in Example 3 of the present invention.

FIG. 26 is yet another table showing the relationship between the film thickness and the medium noise in Example 3 of the present invention.

FIG. 27 is still yet another table showing the relationship between the film thickness and the medium noise in Example 3 of the present invention.

FIG. 28 is a table showing values of the perpendicular magnetic anisotropic energy Ku and saturation magnetization Ms for the respective Examples of the present invention.

FIG. 30 is a table showing the relationship between the film thickness and the medium noise in Example 4-1 of the present invention.

FIG. 31 is another table showing the relationship between the film thickness and the medium noise in Example 4-1 of the present invention.

FIG. 32 is still another table showing the relationship between the film thickness and the medium noise in Example 4-1 of the present invention.

FIG. 33 is yet another table showing the relationship between the film thickness and the medium noise in Example 4-1 of the present invention.

FIG. 34 is still yet another table showing the relationship between the film thickness and the medium noise in Example 4-1 of the present invention.

FIG. 35 is a table showing values of the perpendicular magnetic anisotropic energy Ku and saturation magnetization Ms for the respective Examples of the present invention.

FIG. 37 is a table showing the relationship between the film thickness and the medium noise in Example 4-2 of the present invention.

FIG. 38 is another table showing the relationship between the film thickness and the medium noise in Example 4-2 of the present invention.

FIG. 39 is still another table showing the relationship between the film thickness and the medium noise in Example 4-2 of the present invention.

FIG. 40 is yet another table showing the relationship between the film thickness and the medium noise in Example 4-2 of the present invention.

FIG. 41 is still yet another table showing the relationship between the film thickness and the medium noise in Example 4-2 of the present invention.

FIG. 43 is a table showing the relationship between the film thickness and the medium noise in Example 5 of the present invention.

FIG. 44 is a table showing the relationship between the film thickness and the medium noise in Example 5 of the present invention.

FIG. 45 is another table showing the relationship between the film thickness and the medium noise in Example 5 of the present invention.

FIG. 46 is still another table showing the relationship between the film thickness and the medium noise in Example 5 of the present invention.

FIG. 47 is yet another table showing the relationship between the film thickness and the medium noise in Example 5 of the present invention.

FIG. 49 is a table showing the relationship between the film thickness and the medium noise in Example 6 of the present invention.

FIG. 50 is another table showing the relationship between the film thickness and the medium noise in Example 6 of the present invention.

FIG. 51 is still another table showing the relationship between the film thickness and the medium noise in Example 6 of the present invention.

FIG. 52 is yet another table showing the relationship between the film thickness and the medium noise in Example 6 of the present invention.

FIG. 53 is still yet another table showing the relationship between the film thickness and the medium noise in Example 6 of the present invention.

FIG. 55 is a table showing the relationship between the film thickness and the medium noise in Example 7 of the present invention.

FIG. 56 another table showing the relationship between the film thickness and the medium noise in Example 7 of the present invention.

FIG. 57 is still another table showing the relationship between the film thickness and the medium noise in Example 7 of the present invention.

FIG. 58 is yet another table showing the relationship between the film thickness and the medium noise in Example 7 of the present invention.

FIG. 59 is yet still another table showing the relationship between the film thickness and the medium noise in Example 7 of the present invention.

FIG. 61 is a table showing the relationship between the film thickness and the medium noise in Example 8-1 of the present invention FIG. 62 is another table showing the relationship between the film thickness and the medium noise in Example 8-1 of the present invention.

FIG. 63 is yet another table showing the relationship between the film thickness and the medium noise in Example 8-1 of the present invention.

FIG. 64 is still another table showing the relationship between the film thickness and the medium noise in Example 8-1 of the present invention.

FIG. 65 is yet still another table showing the relationship between the film thickness and the medium noise in Example 8-1 of the present invention.

FIG. 67 is a table showing the relationship between the film thickness and the medium noise in Example 8-2 of the present invention.

FIG. 68 is another table showing the relationship between the film thickness and the medium noise in Example 8-2 of the present invention.

FIG. 69 is yet another table showing the relationship between the film thickness and the medium noise in Example 8-2 of the present invention.

FIG. 70 is still another table showing the relationship between the film thickness and the medium noise in Example 8-2 of the present invention.

FIG. 71 is yet still another table showing the relationship between the film thickness and the medium noise in Example 8-2 of the present invention.

FIG. 73 is a table showing the relationship between the film thickness and the medium noise in Example 9 of the present invention.

FIG. 74 is another table showing the relationship between the film thickness and the medium noise in Example 9 of the present invention.

FIG. 75 is yet another table showing the relationship between the film thickness and the medium noise in Example 9 of the present invention.

FIG. 76 is still another table showing the relationship between the film thickness and the medium noise in Example 9 of the present invention.

FIG. 77 is yet still another table showing the relationship between the film thickness and the medium noise in Example 9 of the present invention.

FIG. 79 is a table showing the relationship between the film thickness and the medium noise in Example 10-1 of the present invention.

FIG. 80 is another table showing the relationship between the film thickness and the medium noise in Example 10-1 of the present invention.

FIG. 81 is yet another table showing the relationship between the film thickness and the medium noise in Example 10-1 of the present invention.

FIG. 82 is still another table showing the relationship between the film thickness and the medium noise in Example 10-1 of the present invention.

FIG. 83 is yet still another table showing the relationship between the film thickness and the medium noise in Example 10-1 of the present invention.

FIG. 85 is a table showing the relationship between the film thickness and the medium noise in Example 10-2 of the present invention.

FIG. 86 is another table showing the relationship between the film thickness and the medium noise in Example 10-2 of the present invention.

FIG. 87 is yet another table showing the relationship between the film thickness and the medium noise in Example 10-2 of the present invention.

FIG. 88 is still another table showing the relationship between the film thickness and the medium noise in Example 10-2 of the present invention.

FIG. 89 is yet still another table showing the relationship between the film thickness and the medium noise in Example 10-2 of the present invention.

FIG. 90 is a table showing values of the perpendicular magnetic anisotropic energy Ku of the respective Examples of the present invention.

FIG. 92 is a table showing the relationship between the film thickness and the medium noise in Example 11 of the present invention.

FIG. 94 is a table showing the relationship between the film thickness and the medium noise in Example 12 of the present invention.

FIG. 96 is a table showing the relationship between the film thickness and the medium noise in Example 13 of the present invention.

FIG. 98 is a table showing the relationship between the film thickness and the medium noise in Example 14 of the present invention.

FIG. 100 is a table showing the relationship between the film thickness and the medium noise in Example 15 of the present invention.

FIG. 102 is a table showing the relationship between the film thickness and the medium noise in Example 16 of the present invention.

FIG. 104 is a table showing the relationship between the film thickness and the medium noise in Example 17 of the present invention.

FIG. 106 is a table showing the relationship between the film thickness and the medium noise in Example 18 of the present invention.

FIG. 108 is a table showing the relationship between the film thickness and the medium noise in Example 19 of the present invention.

FIG. 110 is a table showing the relationship between the film thickness and the medium noise in Example 20 of the present invention.

FIG. 111 is a table showing values of the perpendicular magnetic anisotropic energy Ku for the respective Examples of the present invention.

FIG. 113 shows the relationship between the film thickness and the medium noise in Example 21 of the present invention.

FIG. 115 shows the relationship between the film thickness and the medium noise in Example 22 of the present invention.

FIG. 117 shows the relationship between the film thickness and the medium noise in Example 23 of the present invention.

FIG. 119 shows the relationship between the film thickness and the medium noise in Example 24 of the present invention.

FIG. 121 shows the relationship between the film thickness and the medium noise in Example 25 of the present invention.

FIG. 122 is a graph showing the medium noise dependency on the recording density in Example 26 of the present invention.

FIG. 123 shows the relationship between the film thickness and the medium noise in Example 26 of the present invention.

FIG. 124 is a graph showing the medium noise dependency on the recording density in Example 27 of the present invention.

FIG. 125 shows the relationship between the film thickness and the medium noise in Example 27 of the present invention.

FIG. 126 is a graph showing the medium noise dependency on the recording density in Example 28 of the present invention.

FIG. 127 shows the relationship between the film thickness and the medium noise in Example 28 of the present invention.

FIG. 128 is a graph showing the medium noise dependency on the recording density in Example 29 of the present invention.

FIG. 129 shows the relationship between the film thickness and the medium noise in Example 29 of the present invention.

FIG. 130 is a graph showing the medium noise dependency on the recording density in Example 30 of the present invention.

FIG. 131 shows the relationship between the film thickness and the medium noise in Example 30 of the present invention.

FIG. 132 is a graph showing the medium noise dependency on the recording density in Example 31 of the present invention.

FIG. 133 shows the relationship between the film thickness and the medium noise in Example 31 of the present invention.

Figure 134:
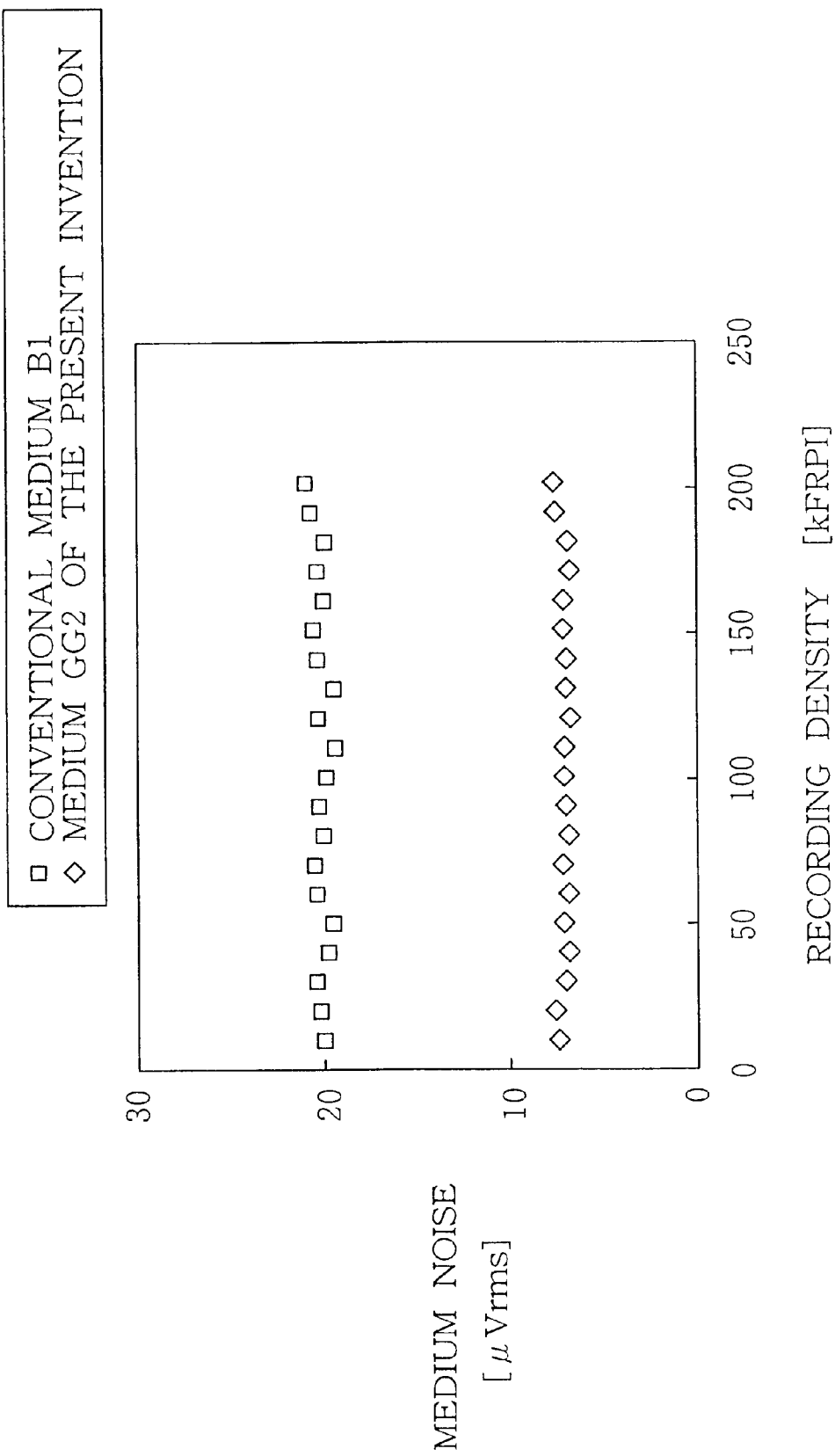

FIG. 134 is a graph showing the medium noise dependency on the recording density in Example 32 of the present invention.

FIG. 135 shows the relationship between the film thickness and the medium noise in Example 32 of the present invention.

Figure 136:
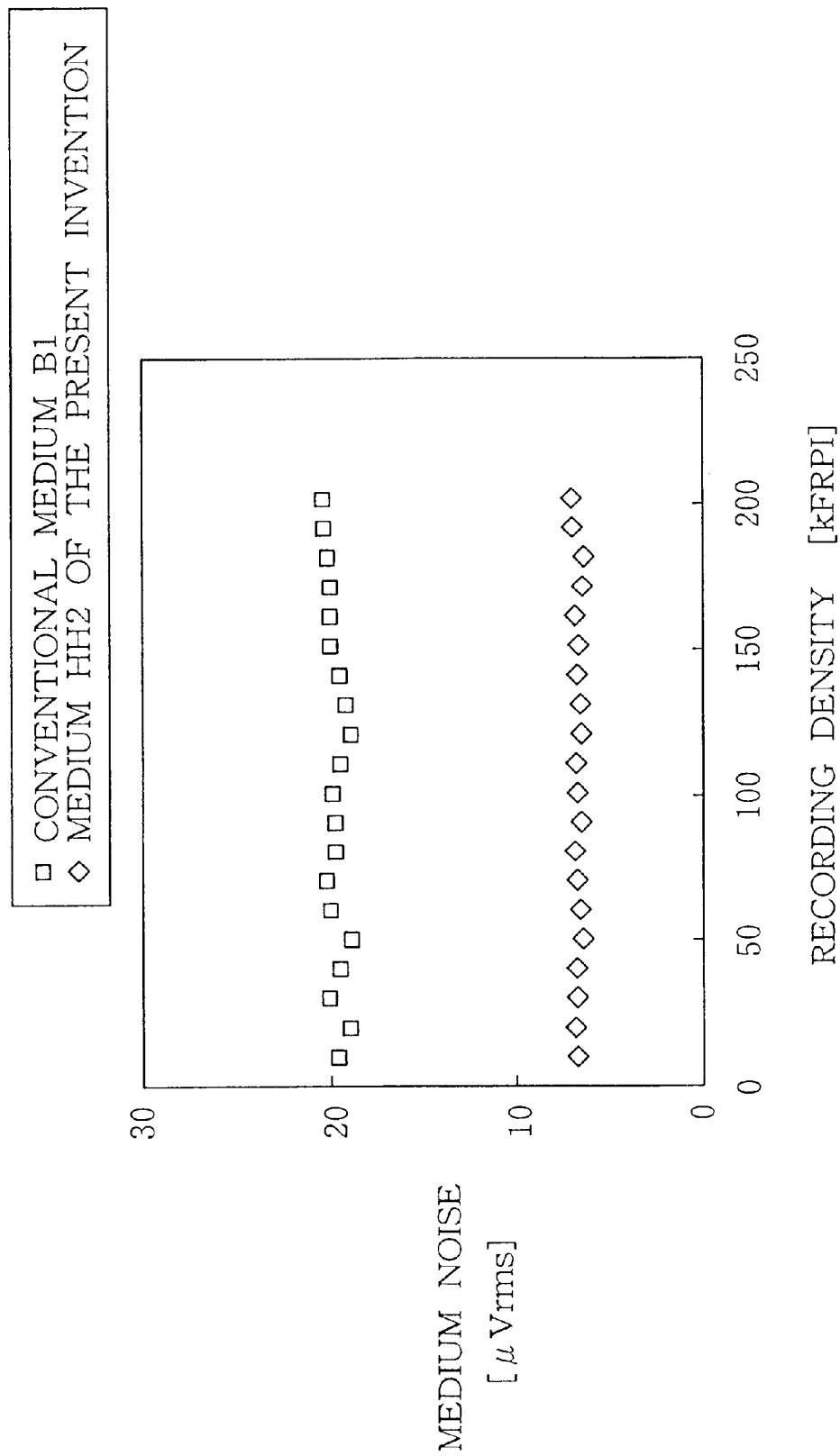

FIG. 136 is a graph showing the medium noise dependency on the recording density in Example 33 of the present invention.

FIG. 137 shows the relationship between the film thickness and the medium noise in Example 33 of the present invention.

Figure 138:
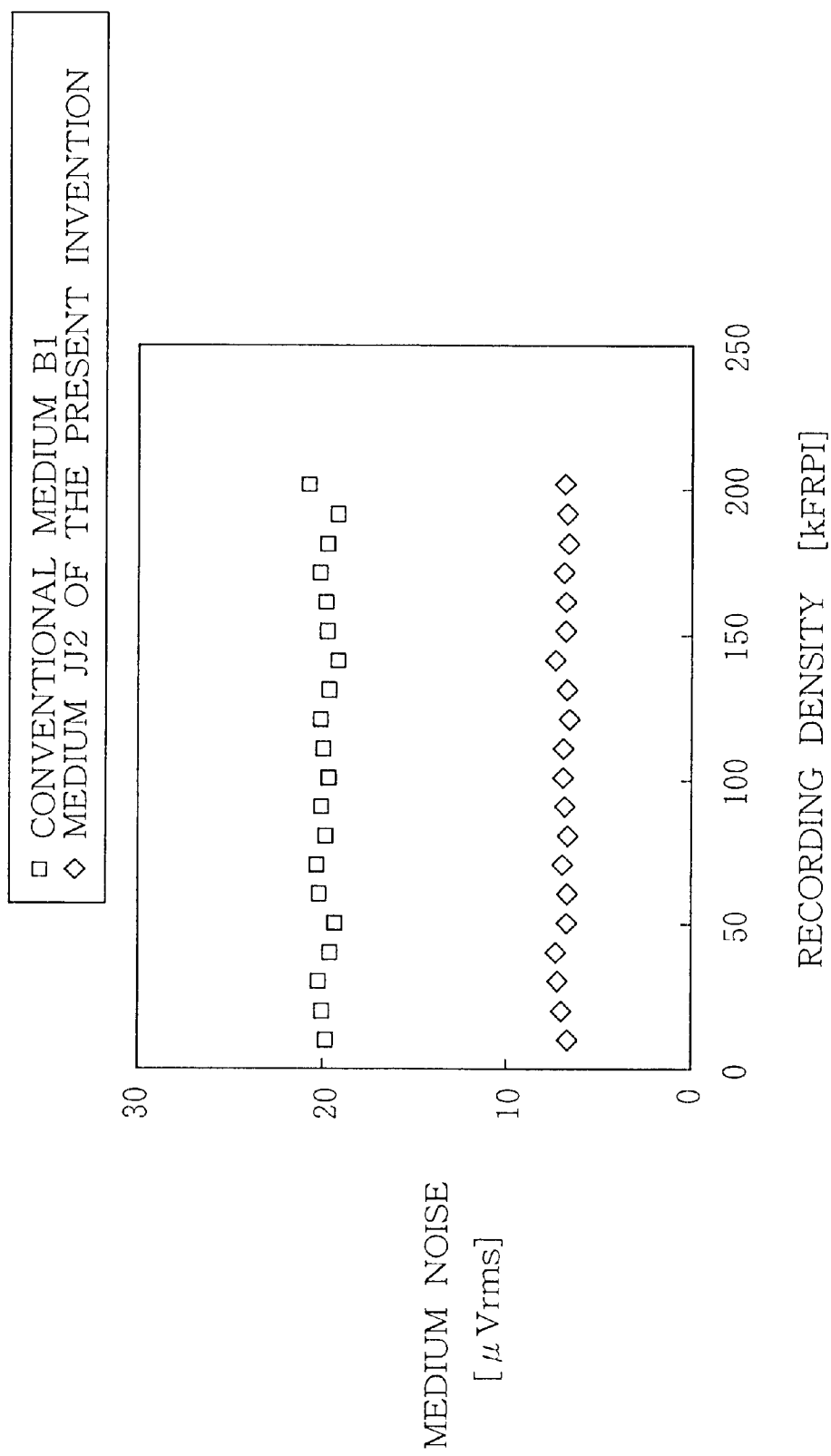

FIG. 138 is a graph showing the medium noise dependency on the recording density in Example 34 of the present invention.

FIG. 139 shows the relationship between the film thickness and the medium noise in Example 34 of the present invention.

Figure 140:
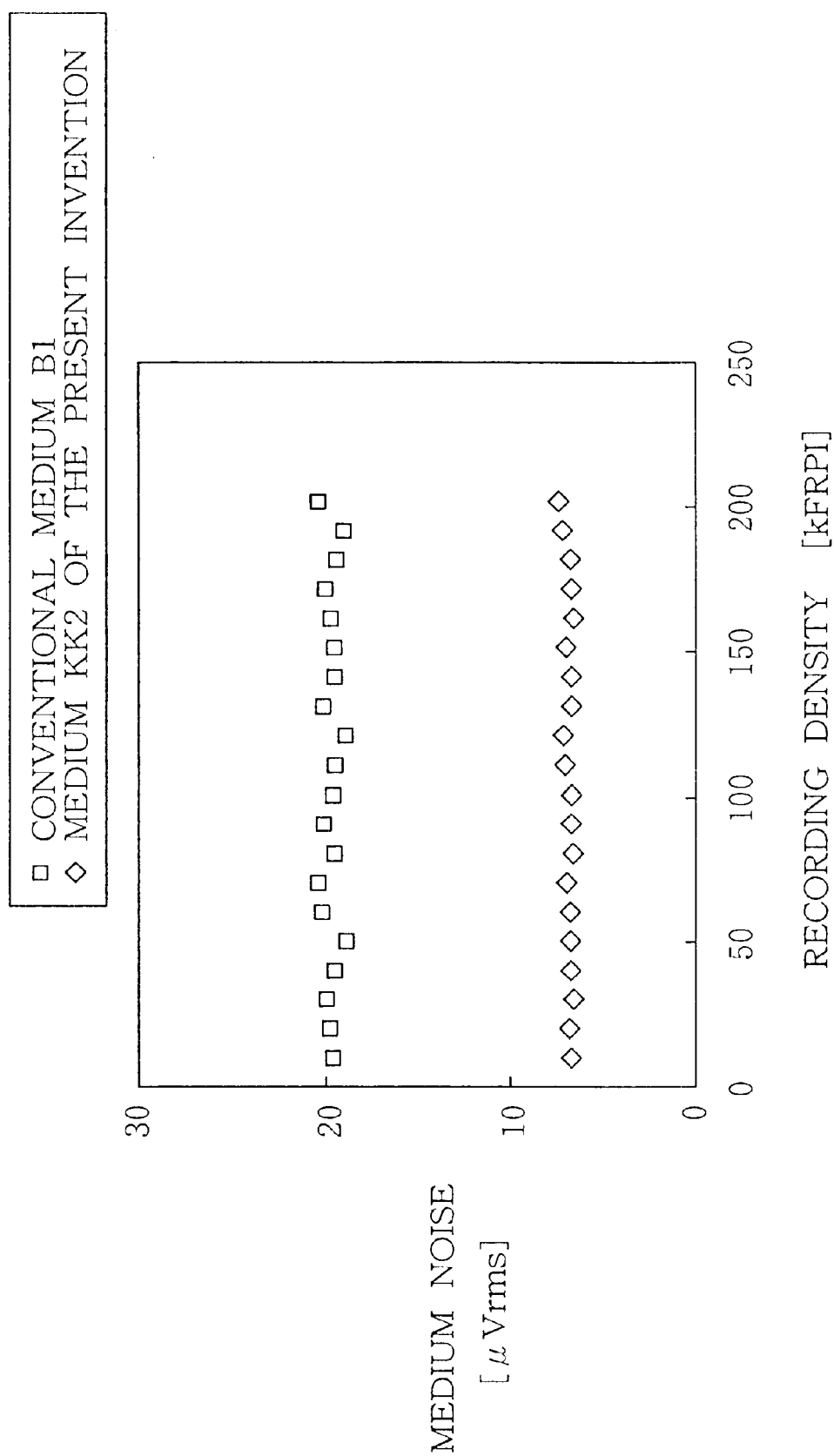

FIG. 140 is a graph showing the medium noise dependency on the recording density in Example 35 of the present invention.

FIG. 141 shows the relationship between the film thickness and the medium noise in Example 35 of the present invention.

Figure 142:
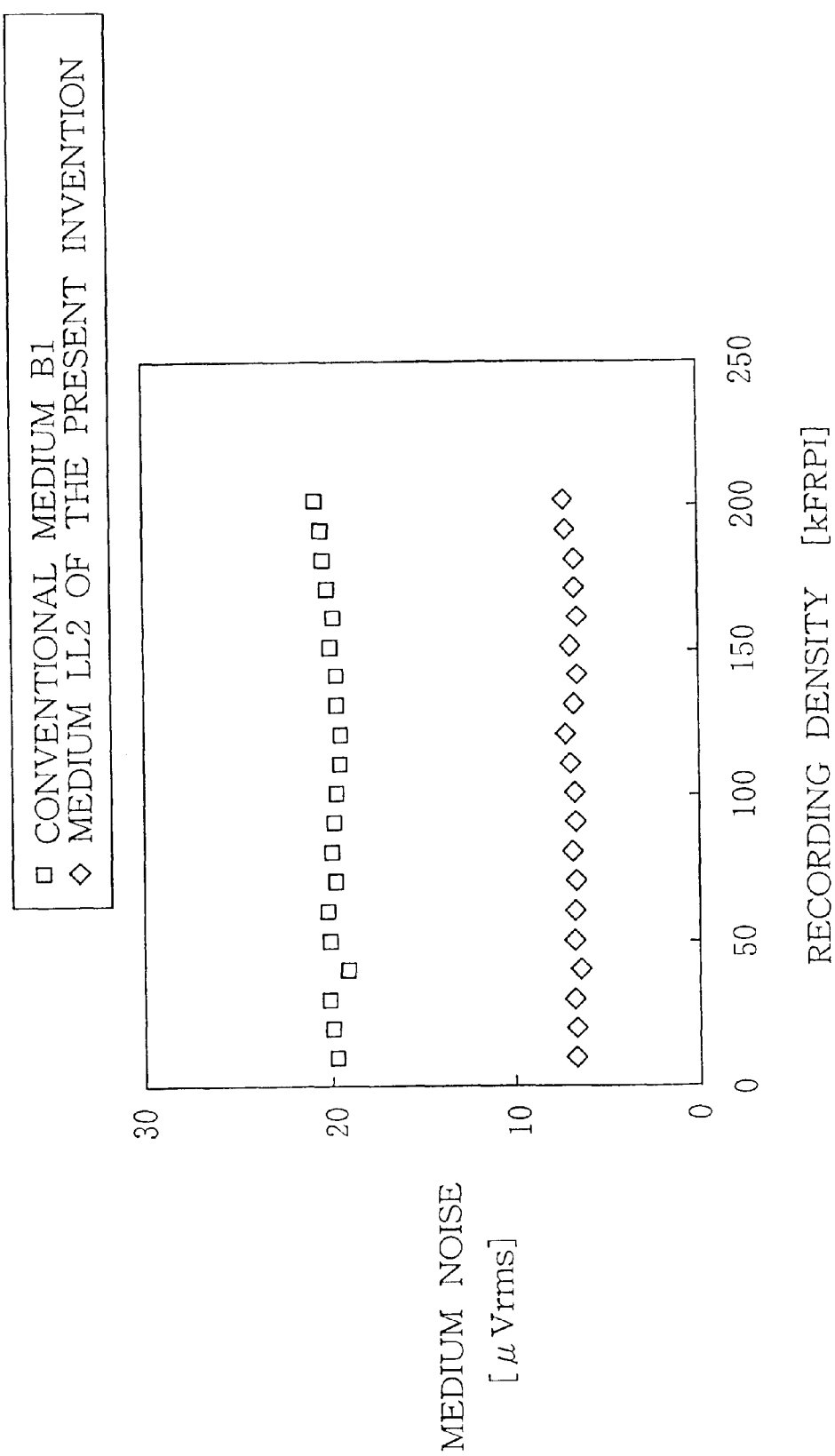

FIG. 142 is a graph showing the medium noise dependency on the recording density in Example 36 of the present invention.

FIG. 143 shows the relationship between the film thickness and the medium noise in Example 36 of the present invention.

Figure 144:
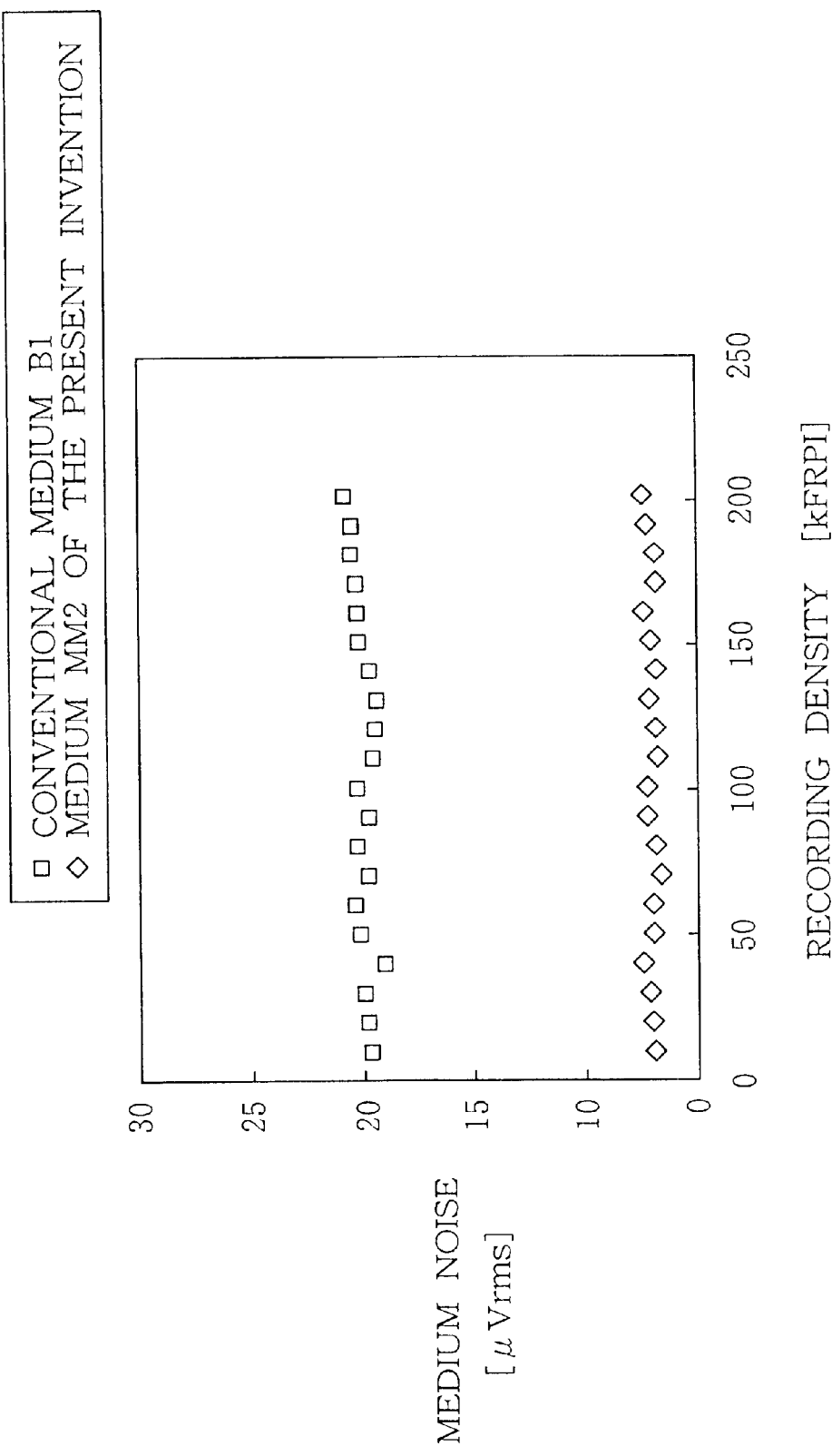

FIG. 144 is a graph showing the medium noise dependency on the recording density in Example 37 of the present invention.

FIG. 145 shows the relationship between the film thickness and the medium noise in Example 37 of the present invention.

Figure 146:
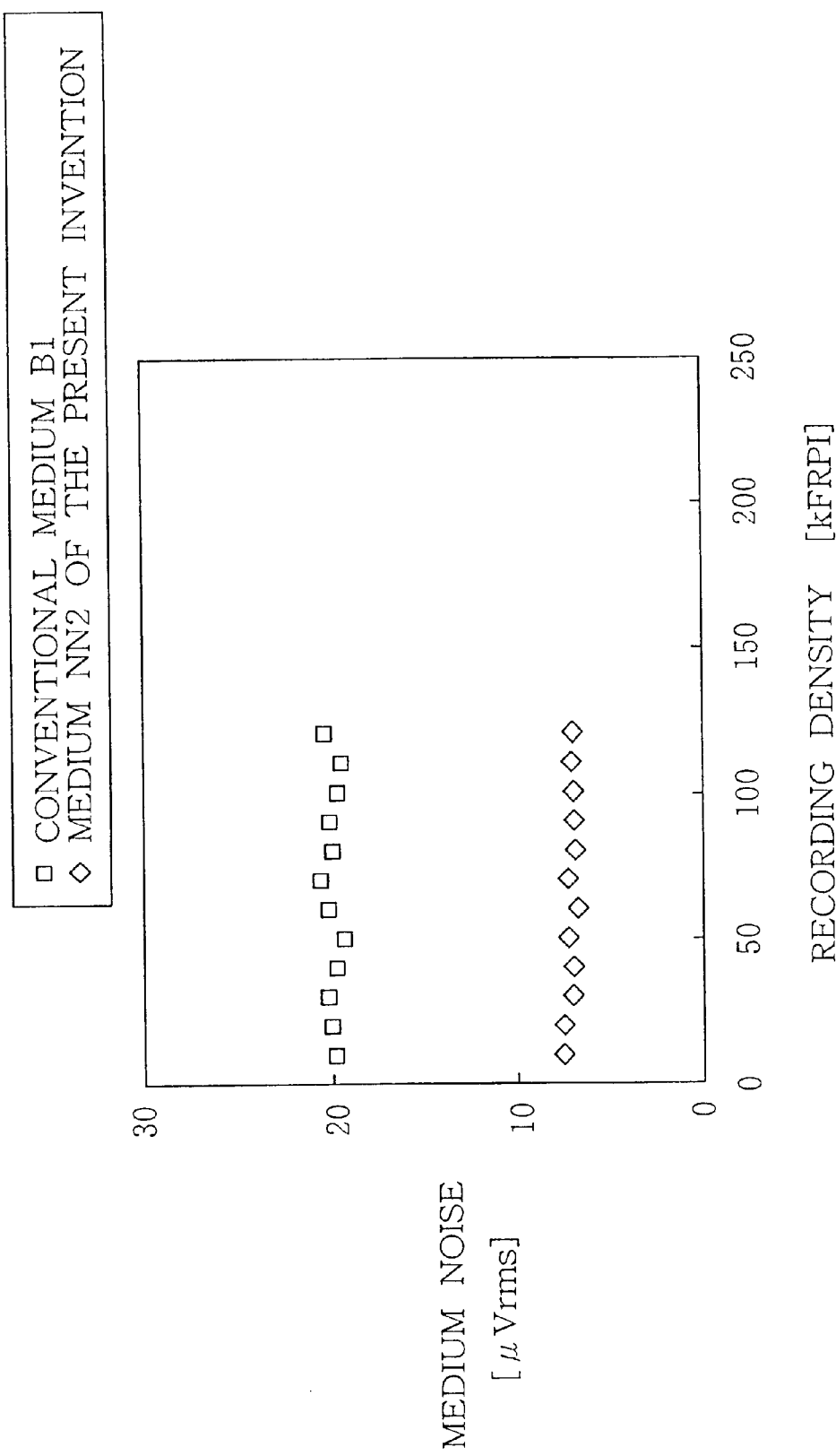

FIG. 146 is a graph showing the medium noise dependency on the recording density in Example 38 of the present invention.

FIG. 147 shows the relationship between the film thickness and the medium noise in Example 38 of the present invention.

Figure 148:
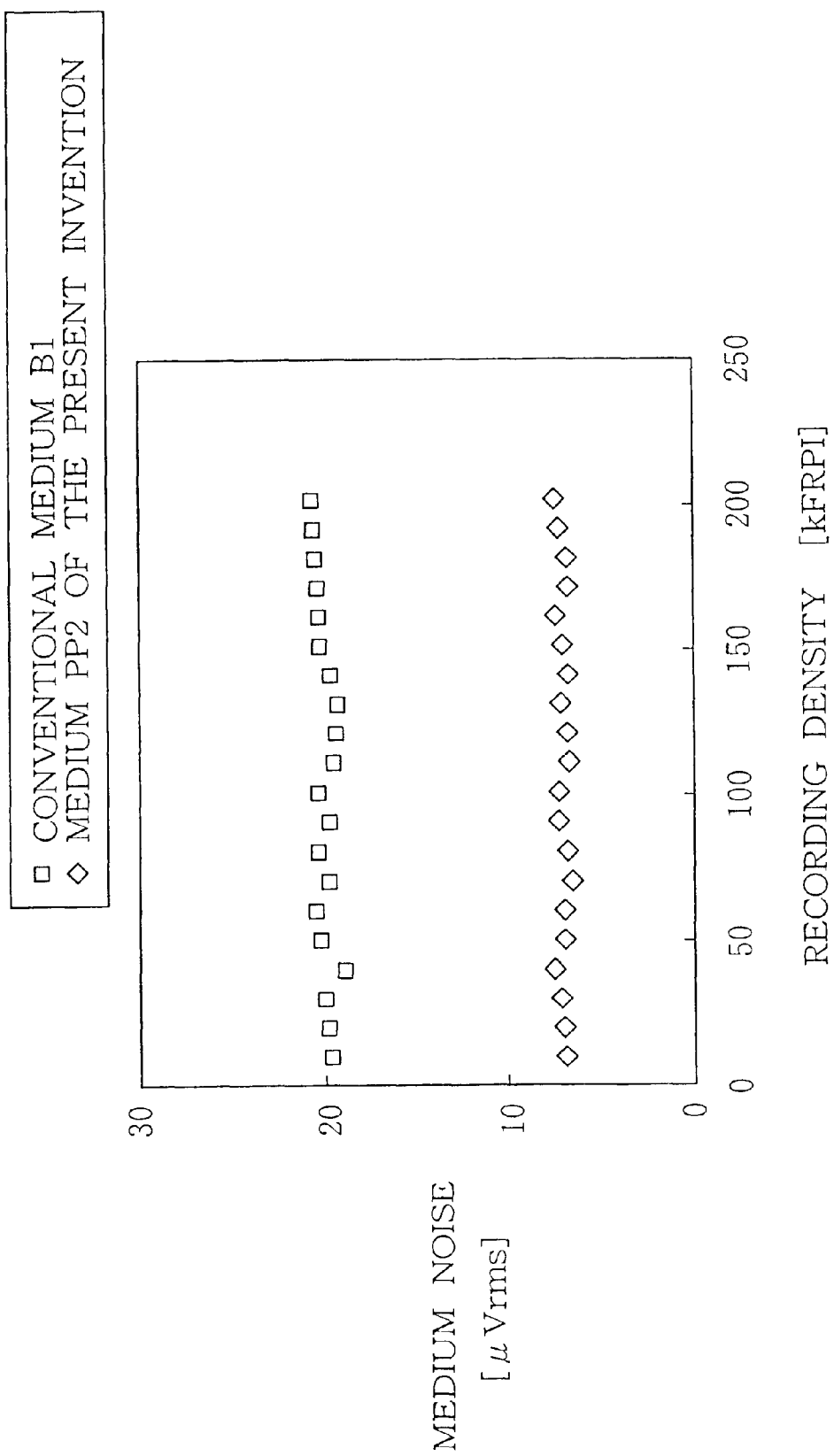

FIG. 148 is a graph showing the medium noise dependency on the recording density in Example 39 of the present invention.

FIG. 149 shows the relationship between the film thickness and the medium noise in Example 39 of the present invention.

Figure 150:
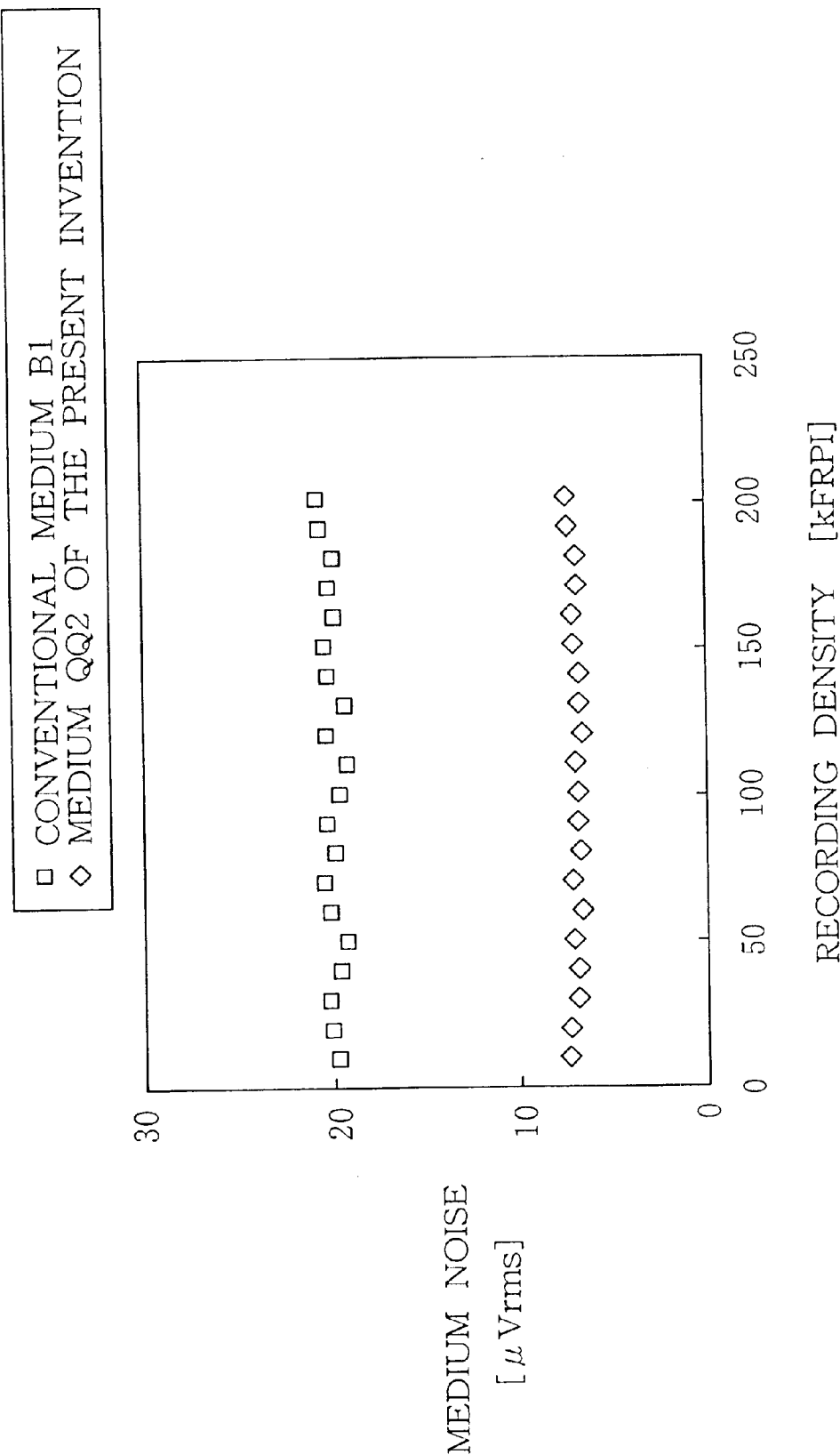

FIG. 150 is a graph showing the medium noise dependency on the recording density in Example 40 of the present invention.

FIG. 151 shows the relationship between the film thickness and the medium noise in Example 40 of the present invention.

Figure 152:
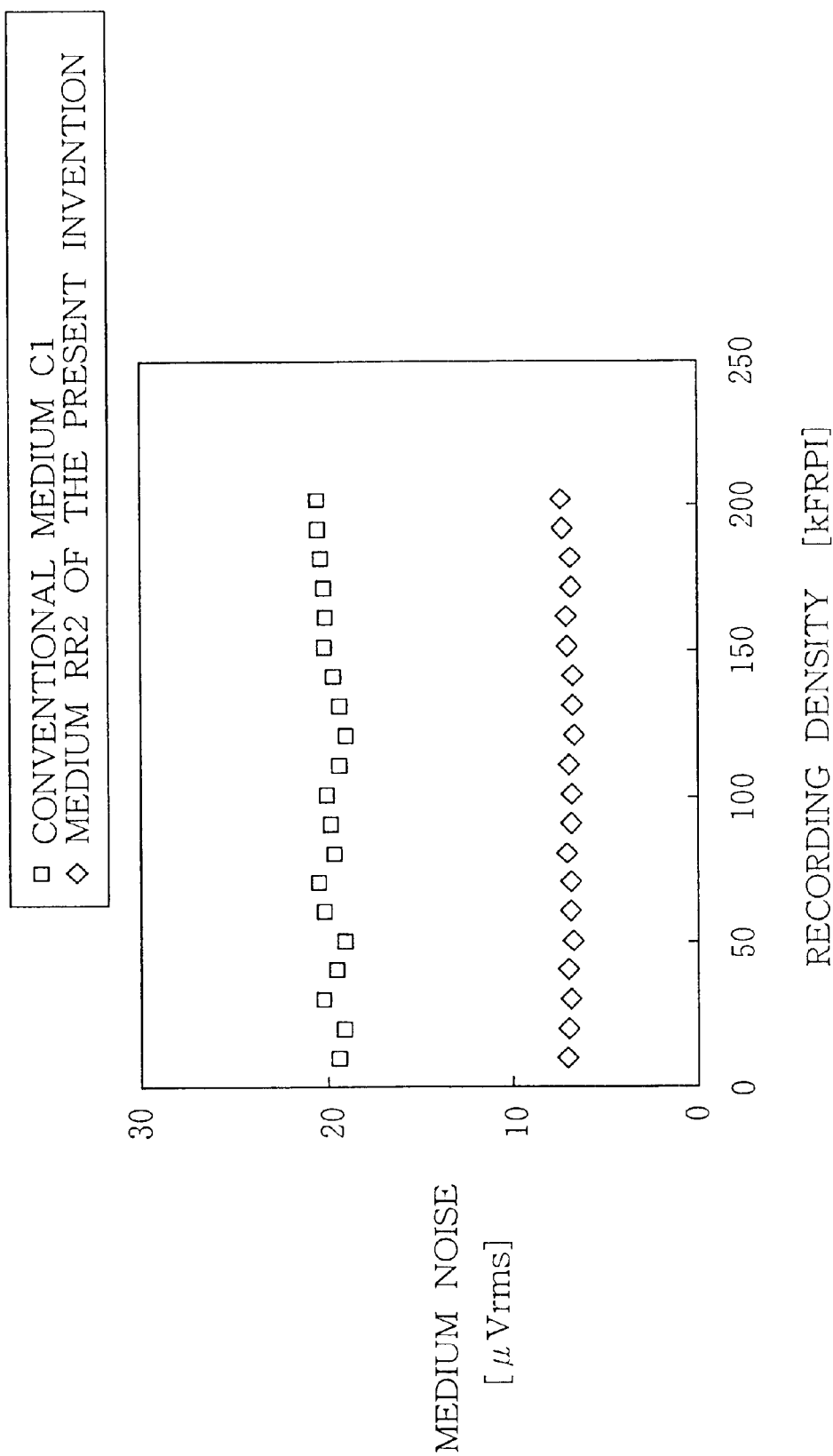

FIG. 152 is a graph showing the medium noise dependency on the recording density in Example 41 of the present invention.

FIG. 153 shows the relationship between the film thickness and the medium noise in Example 41 of the present invention.

Figure 154:
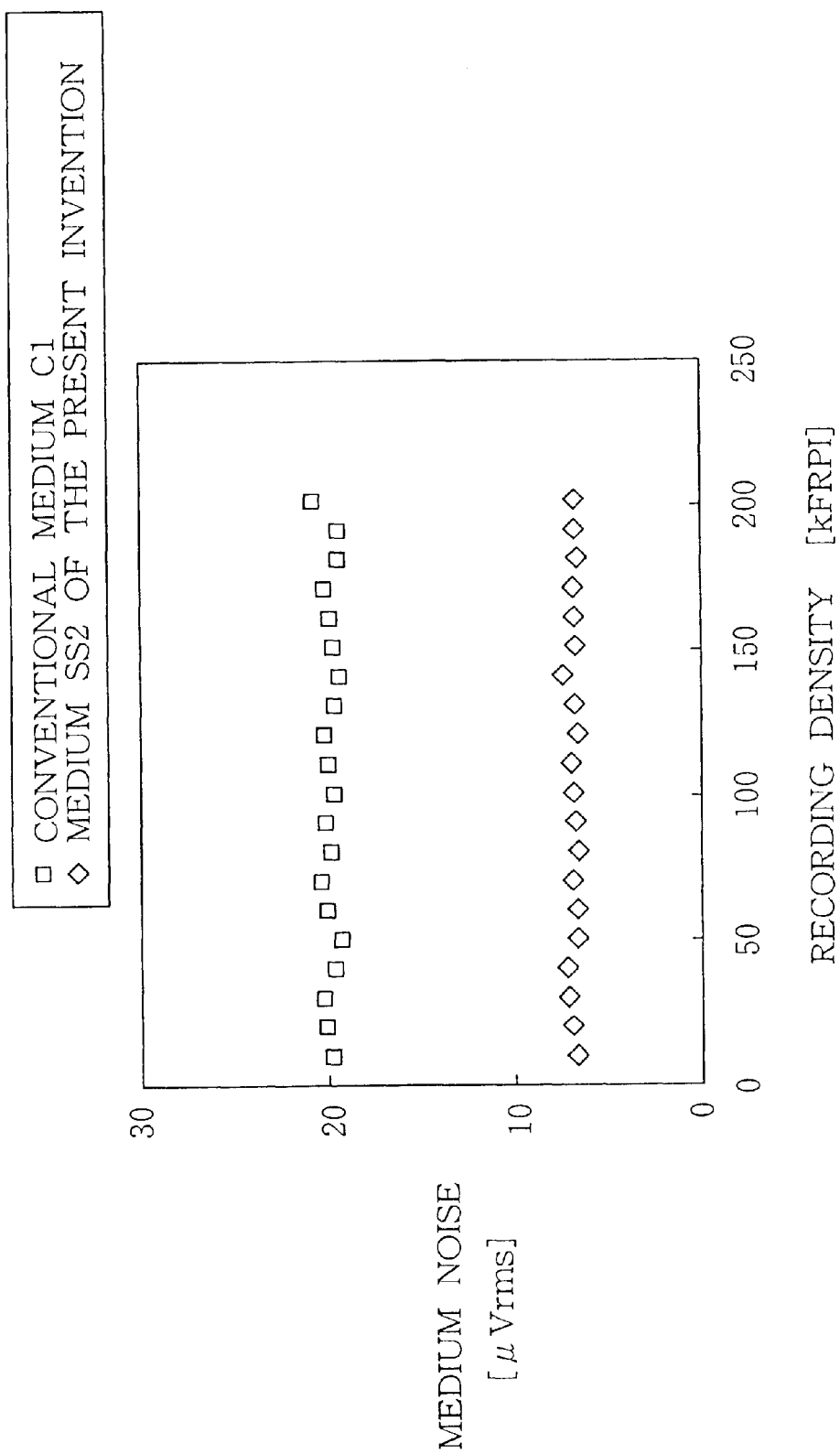

FIG. 154 is a graph showing the medium noise dependency on the recording density in Example 42 of the present invention.

FIG. 155 shows the relationship between the film thickness and the medium noise in Example 42 of the present invention.

Figure 156:
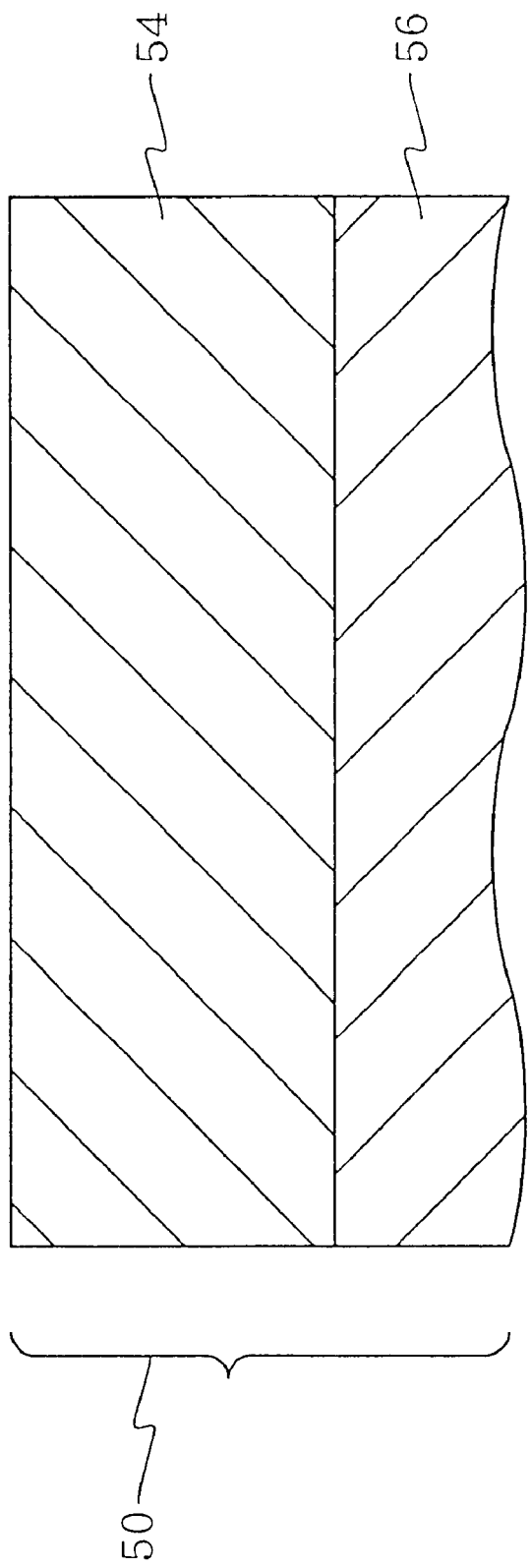

FIG. 156 is a cross sectional view of a conventional perpendicular magnetic recording medium.

DESCRIPTION OF THE PREFERRED EMBODIMENTS

Figure 1:
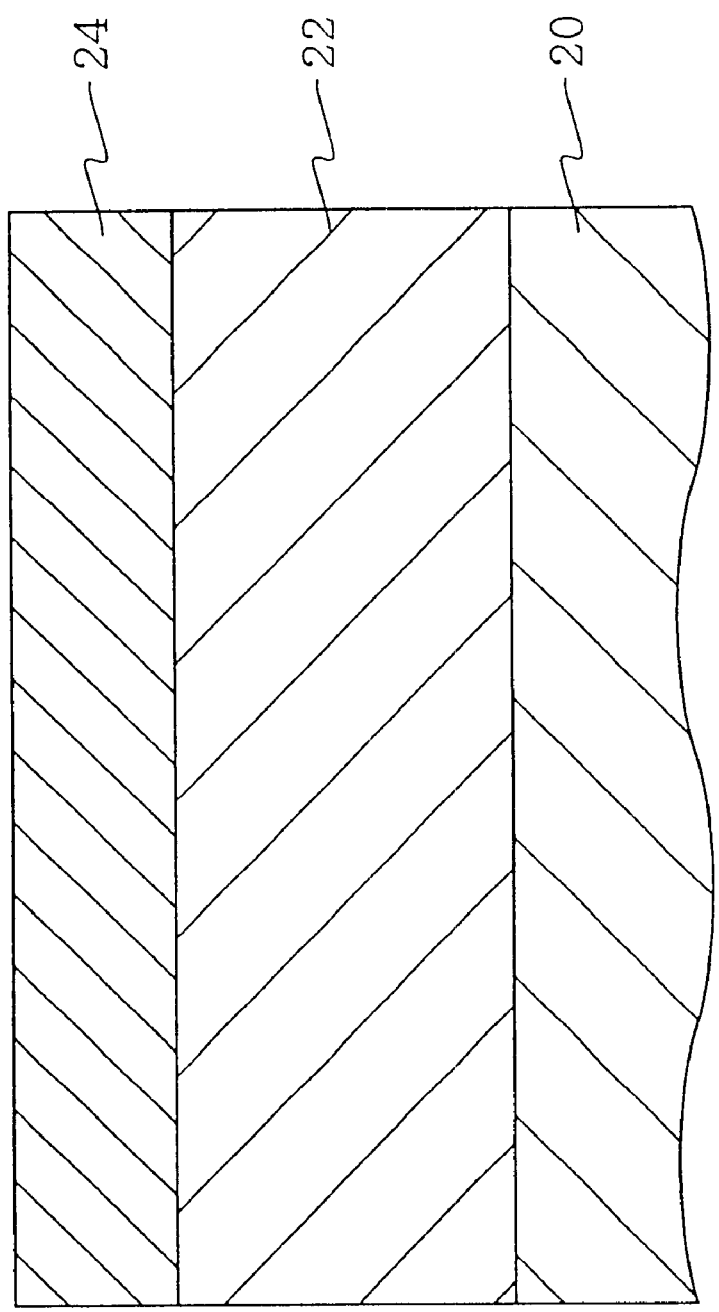
FIG. 1 is a cross sectional view of a perpendicular magnetic recording medium according to a first embodiment of the present invention.
Figure 2:
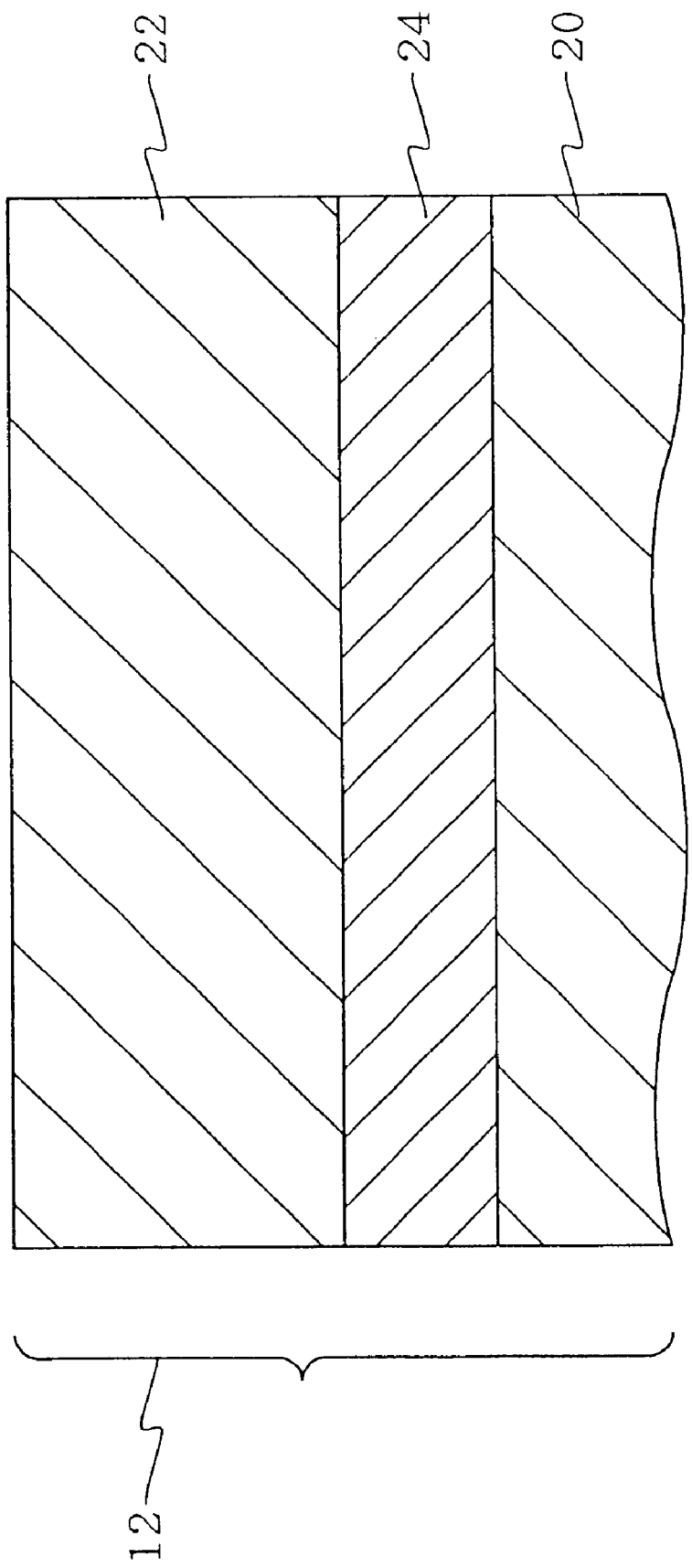
FIG. 2 is a cross sectional view of a perpendicular magnetic recording medium according to a second embodiment of the present invention.
Figure 3:
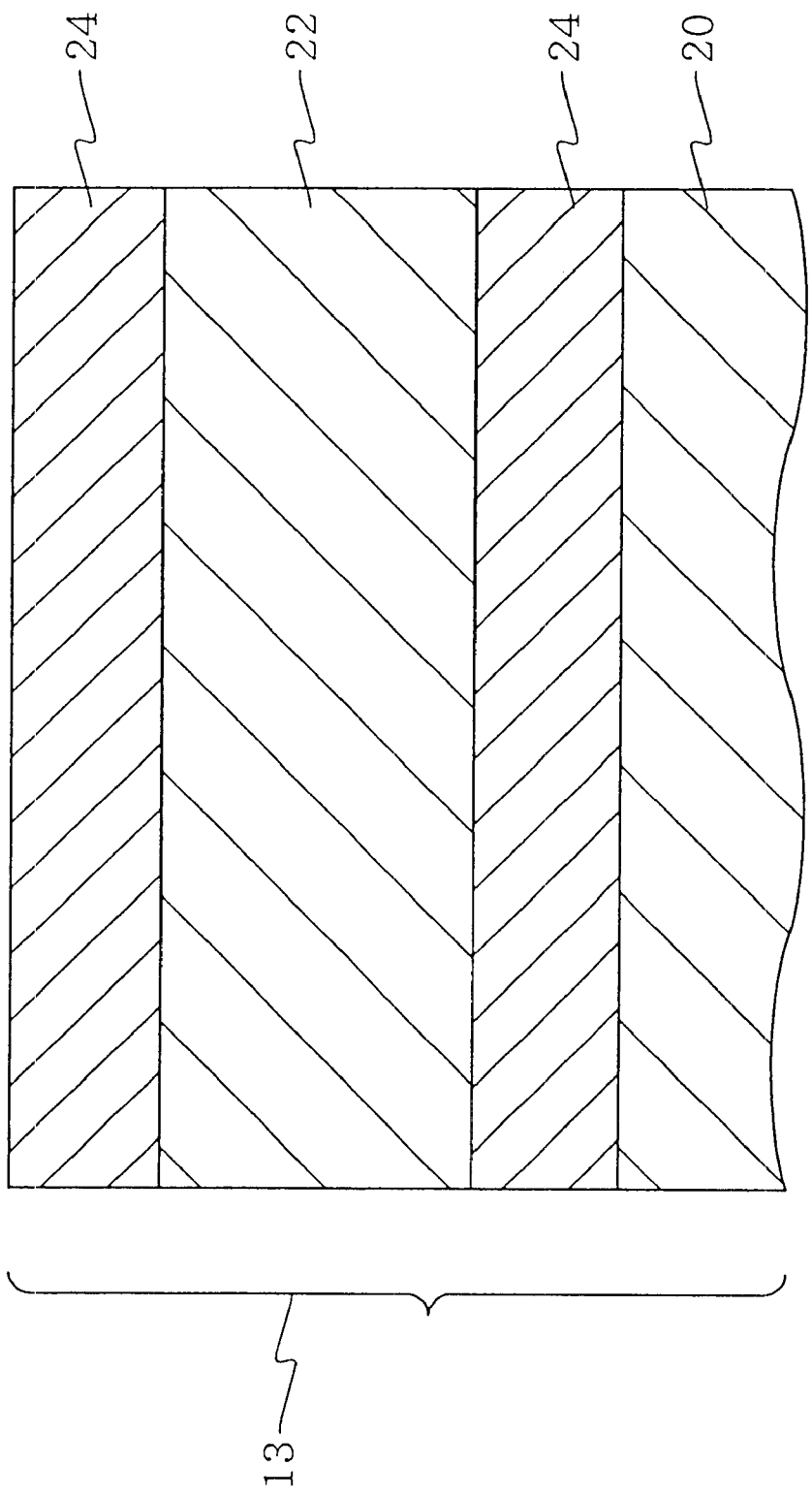
FIG. 3 is a cross sectional view of a perpendicular magnetic recording medium according to a third embodiment of the present invention.
Figure 4:
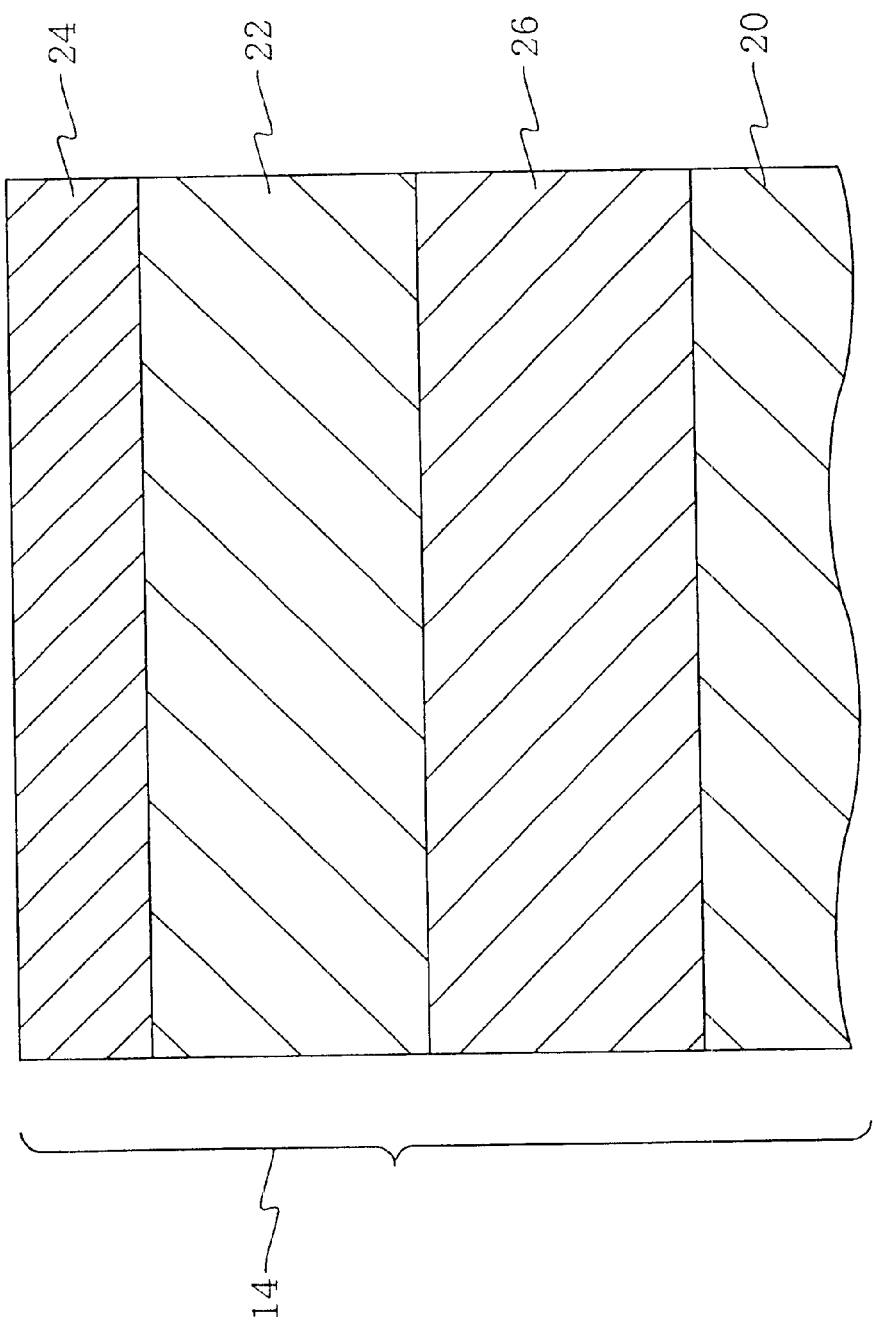
FIG. 4 is a cross sectional view of a perpendicular magnetic recording medium according to a fourth embodiment of the present invention.
Figure 5:
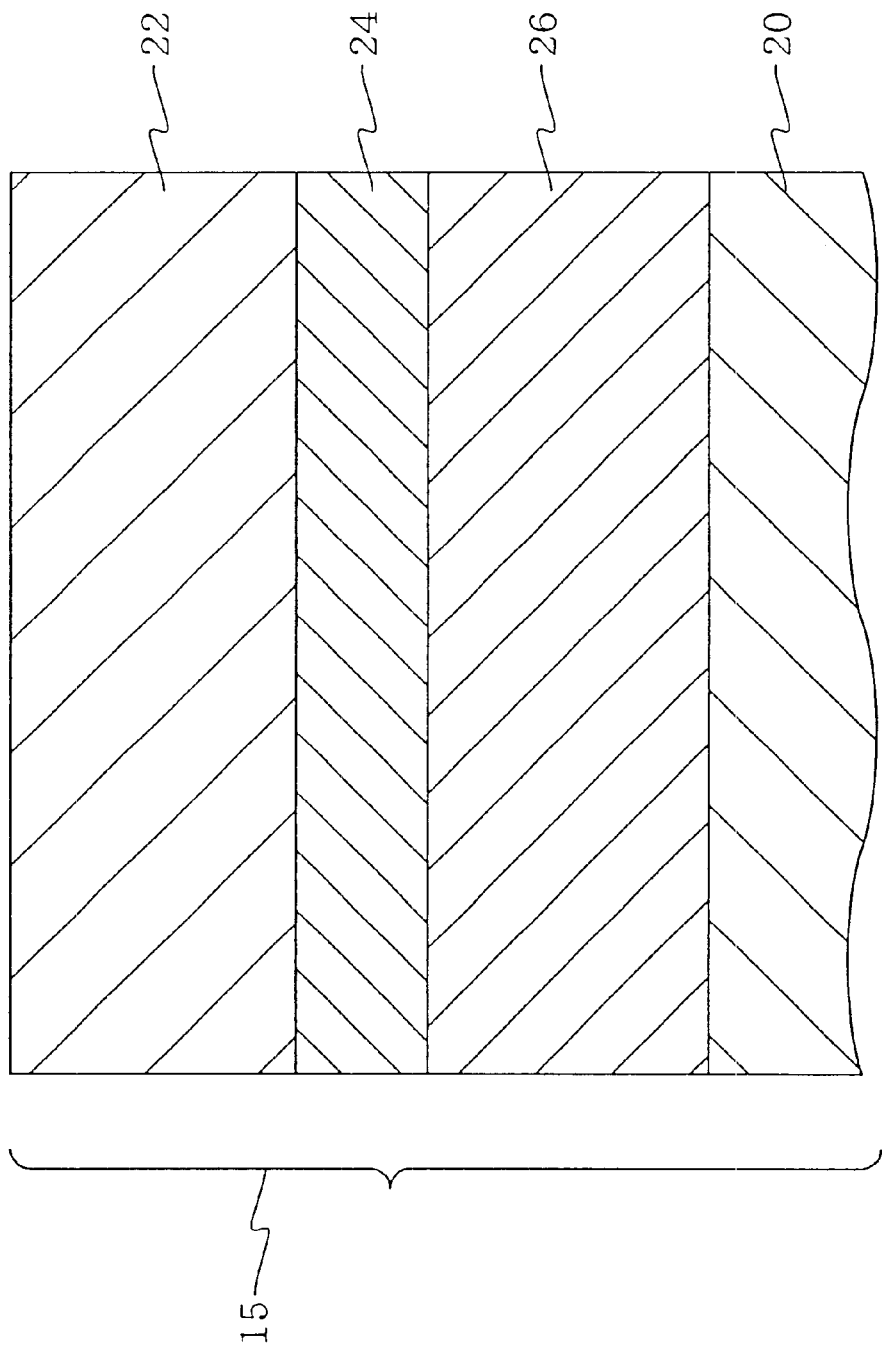
FIG. 5 is a cross sectional view of a perpendicular magnetic recording medium according to a fifth embodiment of the present invention.
Figure 6:
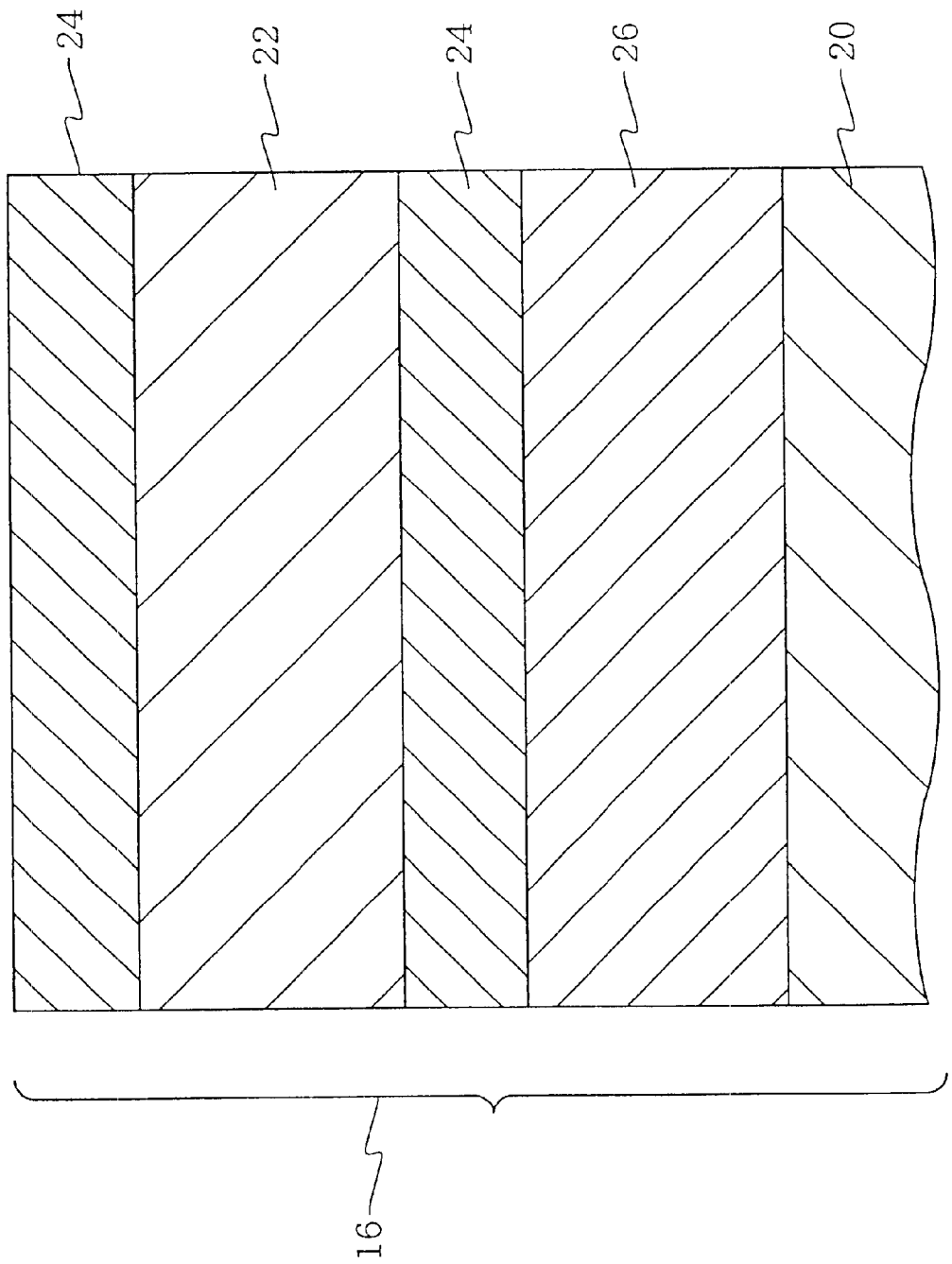
FIG. 6 is a cross sectional view of a perpendicular magnetic recording medium according to a sixth embodiment of the present invention.

FIG. 1 to FIG. 6 are cross sectional views of perpendicular magnetic recording media according to the present invention. FIG. 1 shows a perpendicular magnetic recording medium 11 including a perpendicular magnetization film 22 and a high perpendicular orientation film 24 formed in this order on a substrate 20. FIG. 2 shows a perpendicular magnetic recording medium 12 including a high perpendicular orientation film 24 and a perpendicular magnetization film formed in this order on a substrate 20. FIG. 3 shows a perpendicular magnetic recording medium 13 including a high perpendicular orientation film 24, a perpendicular magnetization film 22, and a high perpendicular orientation film 24 formed in this order on a substrate 20. FIG. 4 shows a perpendicular magnetic recording medium 14 including a backing soft magnetic film 26, a perpendicular magnetization film 22, and a high perpendicular orientation film 24 formed in this order on a substrate 20. FIG. 5 shows a perpendicular magnetic recording medium 15 including a backing soft magnetic film 26, a high perpendicular orientation film 24, and a perpendicular magnetization film 22 formed in this order on a substrate 20. FIG. 6 shows a perpendicular magnetic recording medium 15 including a backing soft magnetic film 26, a high perpendicular orientation film 24, a perpendicular magnetization film 22, and a high perpendicular orientation film 24 formed in this order on a substrate 20.

The high perpendicular orientation film 24 has a higher perpendicular orientation characteristic than the perpendicular magnetization film 22. The high perpendicular orientation film 24 may be made from: CoCrM alloys wherein M represents any three elements selected from a group consisting of Pt, Ta, La, Lu, Pr, and Sr; RCo$_5$ wherein R represents any one of Y, Ce, Sm, La, and Pr; R$_2$Co$_{17}$ wherein R represents any one of Y, Ce, Sm, La, and Pr; Ba ferrite, Sr ferrite, PtCo, and the like.

The high perpendicular orientation film 24 made from the aforementioned materials is provided at least over or under the perpendicular magnetization film 22. This reduces effects of the demagnetizing field generated by the magnetic pole on the surface of the perpendicular magnetization film 22. Accordingly, it is possible to obtain a perpendicular magnetic recording medium having a preferable noise characteristic even in the low recording density region.

EXAMPLE 1

Using a 6-inch Co$_{80}$Cr$_{17}$Ta$_3$ (%) target for sputtering, a perpendicular magnetization film Co$_{80}$Cr$_{17}$Ta$_3$ was formed to have a thickness of 100 nm on a 2.5-inch substrate at 400 degrees centigrade. The film formation conditions were as follows: initial vacuum degree 5×10$^7$ [mTorr]; electric power 0.5 [kw]; argon gas pressure 4 [mTorr]; film formation speed 3 [nm/sec].

After this, the film was covered by the high perpendicular orientation film of 5 to 55 [nm] thickness formed by using: a Co$_{74}$Cr$_{22}$Pt$_2$TaLa target, a Co$_{75}$Cr$_{21}$Pt$_2$TaLa target, a Co$_{76}$Cr$_{20}$Pt$_2$TaLa target, a Co$_{77}$Cr$_{19}$Pt$_2$TaLa target, and a Co$_{78}$Cr$_{18}$Pt$_2$TaLa target.

After this, a C (carbon) protection film 10 [nm] was formed to cover the high perpendicular orientation film.

The medium having the high perpendicular orientation film of Co$_{76}$Cr$_{20}$Pt$_2$TaLa of 50 [nm] thickness will be referred to as medium AAA2 of the present invention. On the other hand, the medium having only the perpendicular magnetization film Co$_{80}$Cr$_{17}$Ta$_3$ without forming the high perpendicular orientation film of Co$_{76}$Cr$_{20}$Pt$_2$TaLa will be referred to as a conventional medium (comparative example) D1.

It should be noted we also prepared a medium having the Co$_{76}$Cr$_{20}$Pt$_2$TaLa film and the Co$_{80}$Cr$_{17}$Ta$_3$ film in the reversed order. That is, firstly, Co$_{76}$Cr$_{20}$Pt$_2$TaLa film was formed on the substrate, and then the Co$_{80}$Cr$_{17}$Ta$_3$ film was formed on the Co$_{76}$Cr$_{20}$Pt$_2$TaLa film.

The perpendicular magnetic anisotropic energy Ku of the following seven films were measured using a torque magnetometer; and saturation magnetization Ms of the seven films were measured using a sample vibration type magnetometer (VSM): a Co$_{74}$Cr$_{22}$Pt$_2$TaLa film, a Co$_{75}$Cr$_{21}$Pt$_2$TaLa film, a Co$_{76}$Cr$_{20}$Pt$_2$TaLa film, a Co$_{77}$Cr$_{19}$Pt$_2$TaLa film, a Co$_{78}$Cr$_{18}$Pt$_2$TaLa film, a Co$_{78}$Cr$_{19}$Ta$_3$ film, and a Co$_{80}$Cr$_{17}$Ta$_3$ film. The measurement results are shown in FIG. 7.

In general, a magnetic film can be a perpendicular magnetization film if the perpendicular anisotropy magnetic field Hk is greater than the maximum perpendicular magnetic field 4pMs (p represents the number $\pi$) so as to satisfy the relationship of Hk≧4pMs. Moreover, the perpendicular anisotropy magnetic field Hk can be expressed by using the perpendicular magnetic anisotropic energy Ku, i.e., Hk=2Ku/Ms. That is, the quality of the perpendicular orientation of the perpendicular magnetization film can be determined by finding which is greater Hk or 4pMs. Here, R is assumed to be Hk/4pMs, and the R values are shown in the table of FIG. 7.

The Co$_{80}$Cr$_{17}$Ta$_3$ film has R=1.1 whereas the Co$_{76}$Cr$_{20}$Pt$_2$TaLa film has R=1.4. That is the Co$_{76}$Cr$_{20}$Pt$_2$TaLa film has by far better perpendicular magnetic anisotropy than the Co$_{80}$Cr$_{17}$Ta$_3$ film. However, if the percentage content of the Co is 73% or below, the Co alloy does not show the ferromagnetic characteristic. Accordingly, it is impossible to lower the Co content without limit.

On the other hand, by using the ID (inductive)/MR (magneto-resistance effect) composite head, the recording/reproduction characteristics were checked on the medium AAA2 of the present invention and the conventional medium D1. The check conditions were set as follows: ID/MR composite head recording track width 4 [micrometers], the reproduction track width 3 [micrometers], recording gap length 0.4 [micrometers], and reproduction gap length 0.32 [micrometers]. Evaluation of the check was performed under the conditions of: recording current 19 [mAop], sense current 12 [mA], peripheral velocity 12.7 [m/s], floating amount 45 [nm], and noise bandwidth 50 [MHz].

Figure 8:
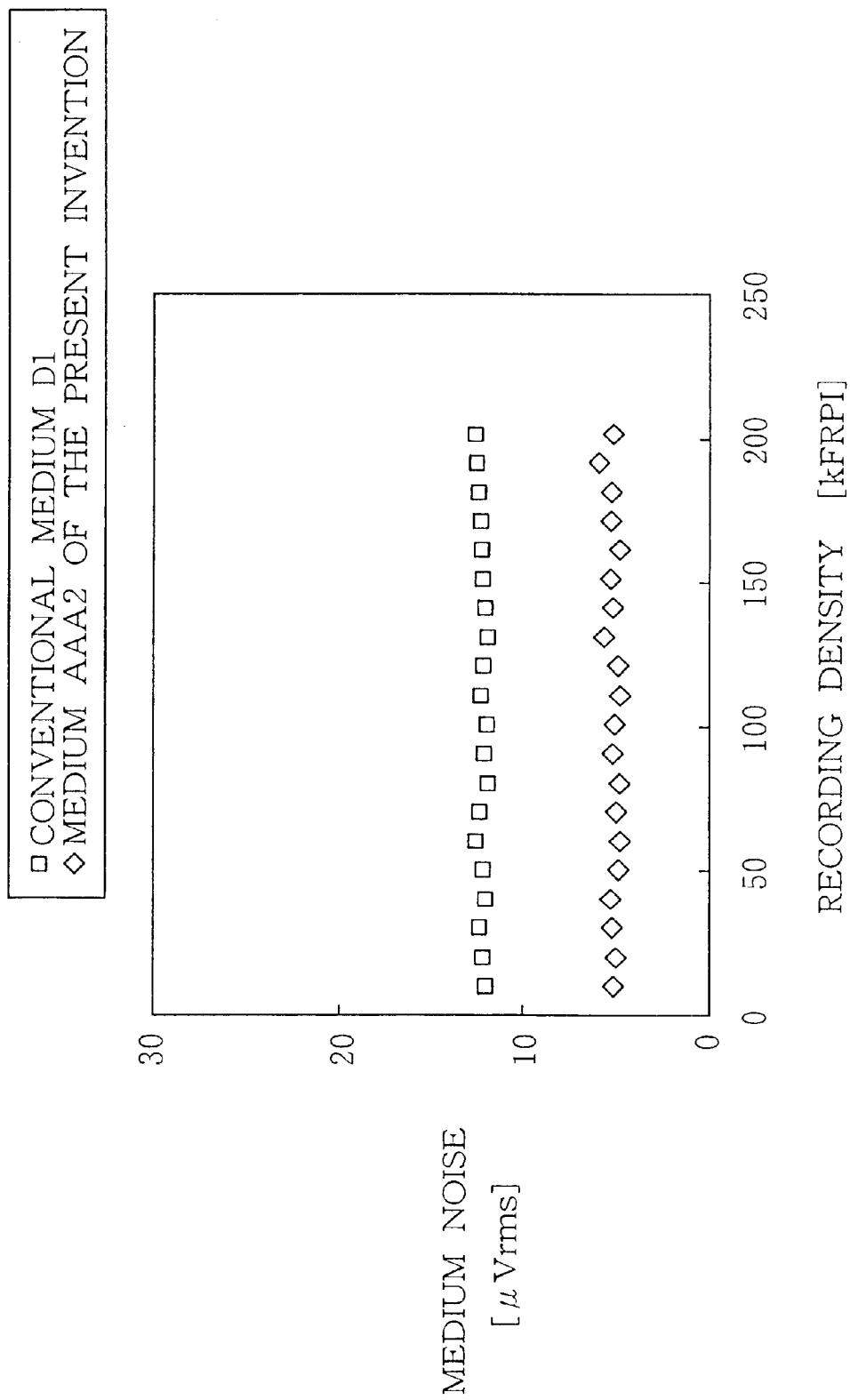
FIG. 8 is a graph showing medium noise dependency on the recording density in Example 1 of the present invention.

FIG. 8 shows the medium noise dependency on the recording density for the AAA2 of the present invention and the conventional D1. As is clear from FIG. 8, the conventional medium D1 shows a very high medium noise in the lower recording density, whereas in the medium AAA2 of the present invention, the medium noise in the same recording region is much suppressed in comparison to the conventional medium D1. This is because the medium AAA2 of the present invention includes a film having a preferable perpendicular magnetic anisotropy on the perpendicular magnetization film of Co$_{80}$Cr$_{17}$Ta$_3$. Accordingly, in contrast to the conventional D1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 9 to FIG. 13. As is clear from FIG. 9 to FIG. 13, when the value R (Hk/4pMs) is smaller than 1.4, medium noise cannot be improved even if the film thickness is reduced. This is because if R is below 1.4, the perpendicular orientation characteristic is insufficient and it is impossible to sufficiently suppress generation of a reversed magnetic domain in the vicinity of the surface of the perpendicular magnetization film. On the other hand, if the film satisfies the relationship that R is equal to or greater than 1.4, the medium noise is reduced up to the film thickness 50 [nm] for all the film types. As has been described above, if a film satisfies the relationship that R is equal to or greater than 1.4, it is possible to suppress generation of a reversed magnetic domain in the vicinity of the surface of the perpendicular magnetization film. However, even if the film satisfies the aforementioned relationship, the medium noise reduction cannot be seen when the film thickness exceeds 50 [nm]. This is because of the fact that if the film thickness is too great, the orientation perpendicular to the film surface is deteriorated and it is impossible to suppress generation of a reversed magnetic domain in the vicinity of the surface of the perpendicular magnetization film.

As has been described above, the recording medium AAA2 of the present invention shows a preferable medium noise characteristic even in a low recording density region. That is, by using the AAA2 of the present invention, it is possible to realize suppression of medium noise increase in the low recording region. Moreover, when the Co$_{76}$Cr$_{20}$Pt$_2$TaLa film is provided under or both under and over the perpendicular magnetization film, similar results can be obtained because of the aforementioned reasons. Furthermore, film types other than the $Co_{76}Cr_{20}Pt_2TaLa$ film can also have similar results if the relationship that R is equal to or more than 1.4 is satisfied.

EXAMPLE 2

Media of Example 2 were prepared in the same way as Example 1 except for that the $Co_xCr_{96-x}Pt_2TaLa$ ($74 \leq x \leq 78$) target was replaced by $Co_xCr_{96-x}Pt_2TaLu$ ($74 \leq x \leq 78$) target. The medium examples made from $Co_{76}Cr_{20}Pt_2TaLu$ film having a film thickness of 50 [nm] will be referred to as medium BBB2 of the present invention. Note that we also prepared media having the $Co_{80}Cr_{17}Ta_3$ film and the $Co_{76}Cr_{20}Pt_2TaLu$ film in the reversed order, i.e., firstly $Co_{76}Cr_{20}Pt_2TaLu$ film was formed on the substrate, and then the $Co_{80}Cr_{17}Ta_3$ film was formed thereon.

The perpendicular magnetic anisotropic energy Ku of the following six films were measured using a torque magnetometer; and saturation magnetization Ms of these six films were measured using a sample vibration type magnetometer (VSM): a $Co_{74}Cr_{22}Pt_2TaLu$ film, a $Co_{75}Cr_{21}Pt_2TaLu$ film, a $Co_{76}Cr_{20}Pt_2TaLu$ film, a $Co_{77}Cr_{19}Pt_2TaLu$ film, a $Co_{78}Cr_{18}Pt_2TaLu$ film, and a $Co_{80}Cr_{17}Ta_3$ film. The check results are shown in FIG. 14 and FIG. 7.

Here, R is defined as Hk/4pMs in the same way as in Example 1. FIG. 14 shows the R values for each of the films. The $Co_{80}Cr_{17}Ta_3$ film has R=1.1 whereas the $Co_{76}Cr_{20}Pt_2TaLu$ film has R=1.4. That is, the $Co_{76}Cr_{20}Pt_2TaLu$ film shows by far more preferable perpendicular magnetic anisotropy than the $Co_{80}Cr_{17}Ta_3$ film. However, the Co alloy film having Co content 73 or below does not show the ferromagnetic characteristic. Accordingly, it is impossible to reduce the Co content without limit.

The ID/MR composite head was used to check the recording/reproduction characteristic of the medium BBB2 of the present invention and the conventional medium (comparative example) D1. The head and the recording/reproduction conditions were set in the same way as in Example 1.

Figure 15:
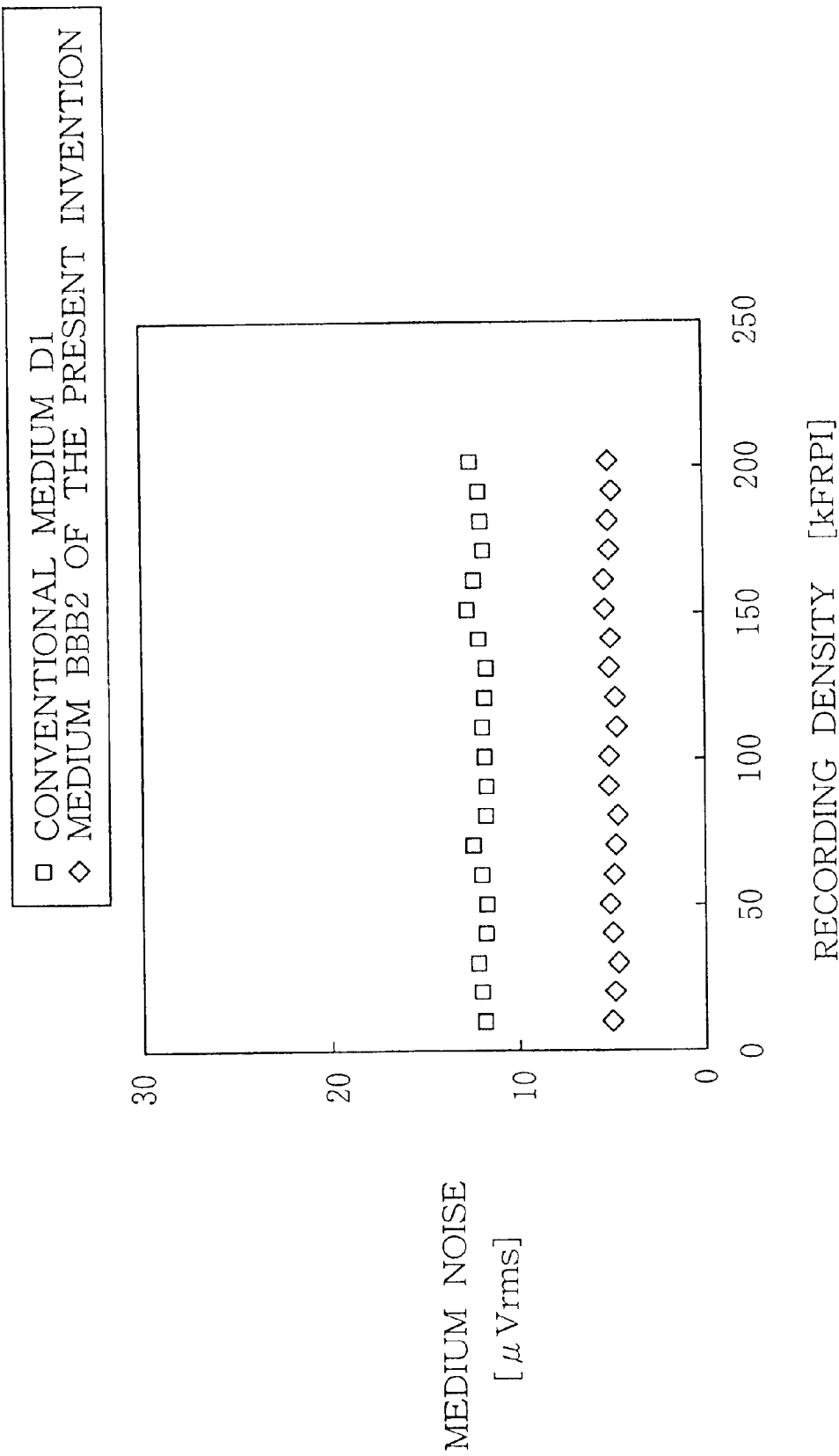
FIG. 15 is a graph showing the medium noise dependency on the recording density in Example 2 of the present invention.

FIG. 15 shows the medium noise dependency on the recording density for the BBB2 of the present invention and the conventional medium D1. As is clear from FIG. 15, the conventional medium D1 has a very high noise in the low recording medium region, whereas the medium BBB2 of the present invention shows noise by far lower than the conventional medium D1 in the low recording density region. This is because the BBB2 has a preferable film of perpendicular magnetic anisotropy on the perpendicular magnetization film of $Co_{80}Cr_{17}Ta_3$ and it is possible to suppress generation of a reversed magnetic domain in the vicinity of the surface of the perpendicular magnetization film much more than the conventional medium D1.

Next, the film thickness of the film formed on the perpendicular magnetization film was gradually changed from 5 to 55 [nm] to check the medium noise values at recording density 10 [KFRPI] for all the film types. The results of this check are shown in FIG. 16 to FIG. 20. As is clear from FIG. 16 to FIG. 20, when the value R (Hk/4pMs) is smaller than 1.4, medium noise cannot be improved even if the film thickness is reduced. This is because if R is below 1.4, the perpendicular orientation characteristic is insufficient and it is difficult to suppress generation of a reversed magnetic domain in the vicinity of the surface of the perpendicular magnetization film. On the other hand, if the film satisfies the relationship that R is equal to or greater than 1.4, the medium noise is reduced up to the film thickness 50 [nm] for all the film types. As has been described above, in the film which satisfies the relationship that R is equal to or greater than 1.4, it is possible to suppress generation of a reversed magnetic domain in the vicinity of the surface of the perpendicular magnetization film. However, even if the film satisfies the aforementioned relationship, the medium noise reduction cannot be seen when the film thickness exceeds 50 [nm]. This is because of the fact that if the film thickness is too great, the orientation perpendicular to the film surface is deteriorated and it is impossible to suppress generation of a reversed magnetic domain in the vicinity of the surface of the perpendicular magnetization film.

As has been described above, the recording medium BBB2 of the present invention shows a preferable medium noise characteristic even in a low recording density region. That is, by using the BBB2 of the present invention, it is possible to realize suppression of medium noise increase in the low recording region. Moreover, when the $Co_{76}Cr_{20}Pt_2TaLu$ film is provided under or both under and over the perpendicular magnetization film, similar results can be obtained because of the aforementioned reasons. Furthermore, film types other than the $Co_{76}Cr_{20}Pt_2TaLu$ film can also have similar results if the relationship that R is equal to or more than 1.4 is satisfied.

EXAMPLE 3

Media of Example 3 were prepared in the same way as Example 1 except for that the $Co_xCr_{96-x}Pt_2TaLa$ ($74 \leq x \leq 78$) target was replaced by $Co_xCr_{96-x}Pt_2LaLu$ ($74 \leq x \leq 78$) target. The medium examples made from $Co_{76}Cr_{20}Pt_2LaLu$ film having a film thickness of 50 [nm] will be referred to as medium CCC2 of the present invention. Note that we also prepared media having the $Co_{80}Cr_{17}Ta_3$ film and $Co_{76}Cr_{20}Pt_2LaLu$ film in the reversed order, i.e., firstly $Co_{76}Cr_{20}Pt_2LaLu$ film was formed on the substrate, and then the $Co_{80}Cr_{17}Ta_3$ film was formed thereon.

The perpendicular magnetic anisotropic energy Ku of the following six films were measured using a torque magnetometer; and saturation magnetization Ms of these six films were measured using a sample vibration type magnetometer (VSM): a $Co_{74}Cr_{22}Pt_2LaLu$ film, a $Co_{75}Cr_{21}Pt_2LaLu$ film, a $Co_{76}Cr_{20}Pt_2LaLu$ film, a $Co_{77}Cr_{19}Pt_2LaLu$ film, a $Co_{78}Cr_{18}Pt_2LaLu$ film, and a $Co_{80}Cr_{17}Ta_3$ film. The check results are shown in FIG. 21 and FIG. 7.

Here, R is defined as Hk/4pMs in the same way as in Example 1. FIG. 21 shows the R values for each of the films. The $Co_{80}Cr_{17}Ta_3$ film has R=1.1 whereas the $Co_{76}Cr_{20}Pt_2LaLu$ film has R=1.4. That is, the $Co_{76}Cr_{20}Pt_2LaLu$ film shows by far more preferable perpendicular magnetic anisotropy than the $Co_{80}Cr_{17}Ta_3$ film. However, the Co alloy film having a Co percentage content of 73% or below does not show the ferromagnetic characteristic. Accordingly, it is impossible to reduce the Co content without limit.

The ID/MR composite head was used to check the recording/reproduction characteristic of the medium CCC2 of the present invention and the conventional medium (comparative example) D1. The head and the recording/reproduction conditions were set in the same way as in Example 1.

Figure 22:
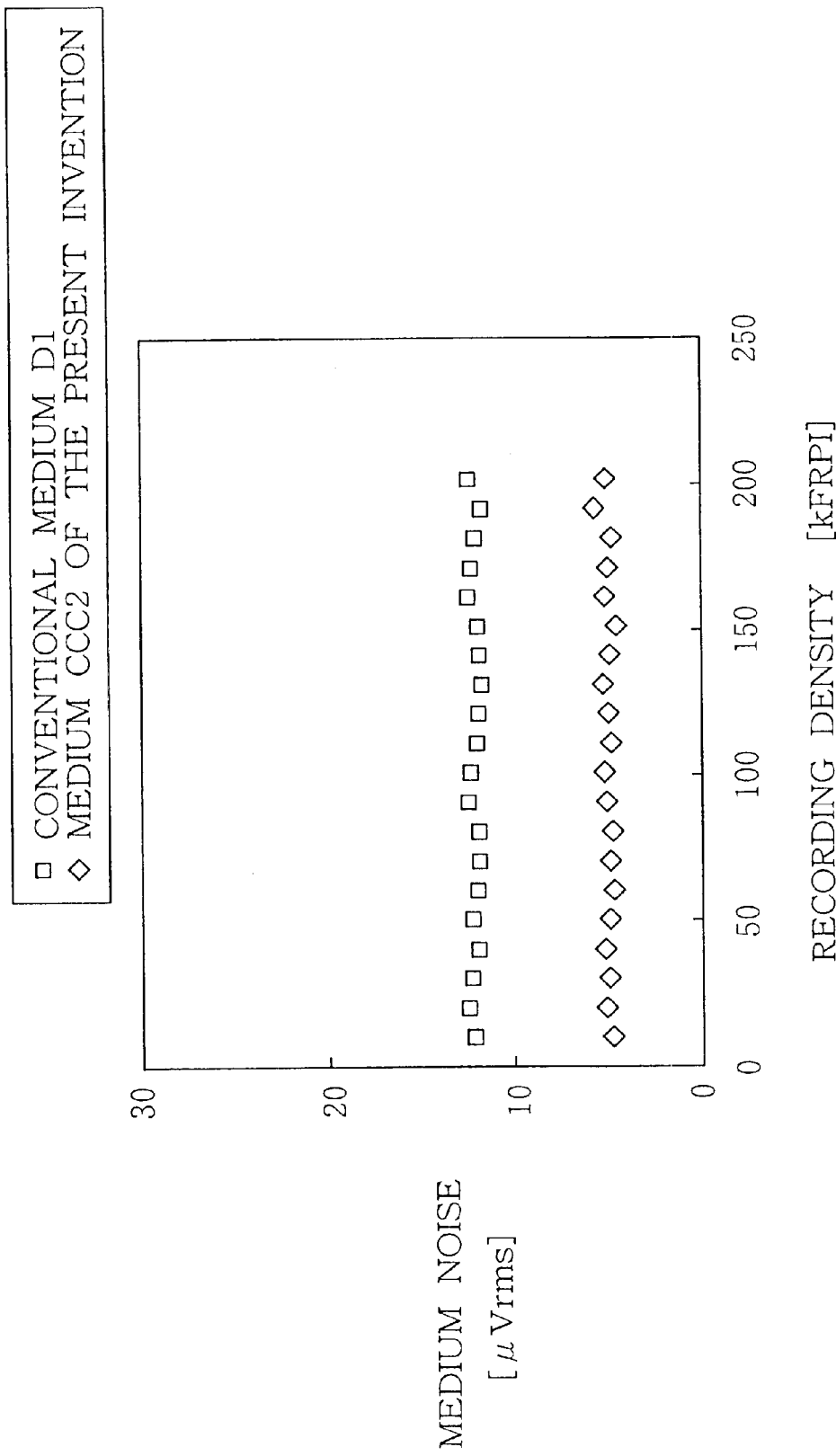
FIG. 22 is a graph showing the medium noise dependency on the recording density in Example 3 of the present invention.

FIG. 22 shows the medium noise dependency on the recording density for the CCC2 of the present invention and the conventional medium D1. As is clear from FIG. 22, the conventional medium D1 has a very high noise in the low recording medium region, whereas the medium CCC2 of the present invention shows noise by far lower than the conventional medium D1 in the low recording density region. This is because the CCC2 has a preferable film of perpendicular magnetic anisotropy on the perpendicular magnetization film of $Co_{80}Cr_{17}Ta_3$ and it is possible to suppress generation of a reversed magnetic domain in the vicinity of the surface of the perpendicular magnetization film much more than the conventional medium D1.

Next, the film thickness of the film formed on the perpendicular magnetization film was gradually changed from 5 to 55 [nm] to check the medium noise values at recording density 10 [KFRPI] for all the film types. The results of this check are shown in FIG. 23 to FIG. 27. As is clear from FIG. 23 to FIG. 27, when the value R (Hk/4pMs) is smaller than 1.4, medium noise cannot be improved even if the film thickness is reduced. This is because if R is below 1.4, the perpendicular orientation characteristic is insufficient and it is difficult to suppress generation of a reversed magnetic domain in the vicinity of the surface of the perpendicular magnetization film. On the other hand, if the film satisfies the relationship that R is equal to or greater than 1.4, i.e., $R \geq 1.4$, the medium noise is reduced up to the film thickness 50 [nm] for all the film types. As has been described above, in the film which satisfies the relationship that R is equal to or greater than 1.4, it is possible to suppress generation of a reversed magnetic domain in the vicinity of the surface of the perpendicular magnetization film. However, even if the film satisfies the aforementioned relationship, the medium noise reduction cannot be seen when the film thickness exceeds 50 [nm]. This is because of the fact that if the film thickness is too great, the orientation perpendicular to the film surface is deteriorated and it is impossible to suppress generation of a reversed magnetic domain in the vicinity of the surface of the perpendicular magnetization film.

As has been described above, the recording medium CCC2 of the present invention shows a preferable medium noise characteristic even in a low recording density region. That is, by using the CCC2 of the present invention, it is possible to realize suppression of medium noise increase in the low recording region. Moreover, when the $Co_{76}Cr_{20}Pt_2LaLu$ film is provided under or both under and over the perpendicular magnetization film, similar results can be obtained because of the aforementioned reasons. Furthermore, film types other than the $Co_{76}Cr_{20}Pt_2LaLu$ film can also have similar results if the relationship that R is equal to or more than 1.4 is satisfied.

EXAMPLE 4-1

Media of Example 4-1 were prepared in the same way as Example 1 except for that the $Co_xCr_{96-x}Pt_2TaLa$ ($74 \leq x \leq 78$) target was replaced by $Co_xCr_{96-x}Ta_2LaLu$ ($74 \leq x \leq 78$) target. The medium examples made from $Co_{76}Cr_{20}Ta_2LaLu$ film having a film thickness of 50 [nm] will be referred to as medium DDD2 of the present invention. Note that we also prepared media having the $Co_{80}Cr_{17}Ta_3$ film and $Co_{76}Cr_{20}Ta_2LaLu$ film in the reversed order, i.e., firstly $Co_{76}Cr_{20}Ta_2LaLu$ film was formed on the substrate, and then the $Co_{80}Cr_{17}Ta_3$ film was formed thereon.

FIG. 28 and FIG. 7 show the perpendicular magnetic anisotropic energy Ku and saturation magnetization Ms of the six films: a $Co_{74}Cr_{22}Ta_2LaLu$ film, a $Co_{75}Cr_{21}Ta_2LaLu$ film, a $Co_{76}Cr_{20}Ta_2LaLu$ film, a $Co_{77}Cr_{19}Ta_2LaLu$ film, a $Co_{78}Cr_{18}Ta_2LaLu$ film, and a $Co_{80}Cr_{17}Ta_3$ film.

Here, the R is defined in the same way as in Example 1. FIG. 28 shows the respective R values. The $Co_{80}Cr_{17}Ta_3$ film has R=1.1, whereas the $Co_{76}Cr_{20}Ta_2LaLu$ film, for example, has R=1.4. That is, the $Co_{76}Cr_{20}Ta_2LaLu$ film has by far preferable perpendicular magnetic compared to the $Co_{80}Cr_{17}Ta_3$ film. However, if Co content is equal to or below 73, the Co alloy does not exhibit the ferromagnetic characteristic. Accordingly, it is impossible to reduce the Co content without limit.

The ID/MR composite head was used to check the reproduction characteristic of the DDD2 of the present invention and the conventional medium D1. The head and the recording/reproduction conditions were set the same as in Example 1.

Figure 29:
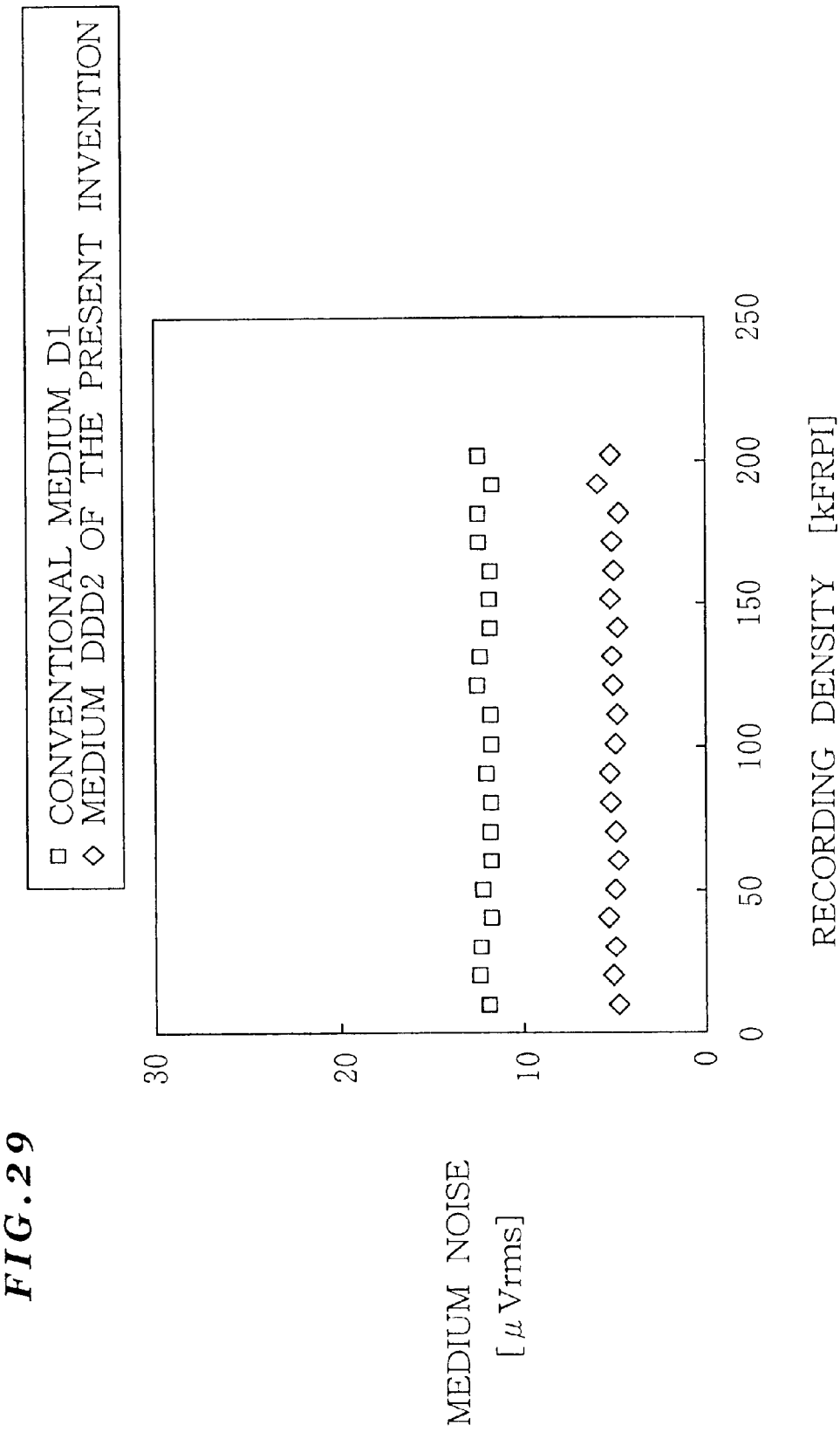
FIG. 29 is a graph showing the medium noise dependency on the recording density in Example 4-1 of the present invention.

FIG. 29 shows the medium noise dependency on the recording density for the DDD2 of the present invention and the conventional medium D1. As is clear from FIG. 29, the conventional medium D1 has a very high noise in the low recording medium region, whereas the medium DDD2 of the present invention shows noise by far lower than the conventional medium D1 in the low recording density region. This is because the DDD2 has a preferable film of perpendicular magnetic anisotropy on the perpendicular magnetization film of $Co_{80}Cr_{17}Ta_3$ and it is possible to suppress generation of a reversed magnetic domain in the vicinity of the surface of the perpendicular magnetization film much more than the conventional medium D1.

Next, the film thickness of the film formed on the perpendicular magnetization film was gradually changed from 5 to 55 [nm] to check the medium noise values at recording density 10 [KFRPI] for all the film types. The results of this check are shown in FIG. 30 to FIG. 34. As is clear from FIG. 30 to FIG. 34, when the value R (Hk/4pMs) is smaller than 1.4, medium noise cannot be improved (reduced) even if the film thickness is reduced. This is because if R is below 1.4, the perpendicular orientation characteristic is insufficient and it is difficult to suppress generation of a reversed magnetic domain in the vicinity of the surface of the perpendicular magnetization film. On the other hand, if the film satisfies the relationship that R is equal to or greater than 1.4, i.e., $R \geq 1.4$, the medium noise is reduced up to the film thickness 50 [nm] for all the film types. As has been described above, in the film which satisfies the relationship that R is equal to or greater than 1.4, it is possible to suppress generation of a reversed magnetic domain in the vicinity of the surface of the perpendicular magnetization film. However, even if the film satisfies the aforementioned relationship, the medium noise reduction cannot be seen when the film thickness exceeds 50 [nm]. This is because of the fact that if the film thickness is too great, the orientation perpendicular to the film surface is deteriorated and it is impossible to suppress generation of a reversed magnetic domain in the vicinity of the surface of the perpendicular magnetization film.

As has been described above, the recording medium DDD2 of the present invention shows a preferable medium noise characteristic even in a low recording density region. That is, by using the DDD2 of the present invention, it is possible to realize suppression of medium noise increase in the low recording region. Moreover, when the $Co_{76}Cr_{20}Ta_2LaLu$ film is provided under or both under and over the perpendicular magnetization film, similar results can be obtained because of the aforementioned reasons. Furthermore, film types other than the $Co_{96}Cr_{20}Ta_2LaLu$ film can also have similar results if the relationship that R is equal to or more than 1.4 is satisfied.

EXAMPLE 4-2

Media of Example 4-1 were prepared in the same way as Example 1 except for that the $Co_xCr_{96-x}Pt_2TaLa$ ($74 \leq x$ ≦78) target was replaced by $Co_xCr_{96-x}Ta_2PrSr$ (74≦x≦78) target. The medium examples made from $Co_{76}Cr_{20}Ta_2PrSr$ film having a film thickness of 50 [nm] will be referred to as medium DDD3 of the present invention. Note that we also prepared media having the $Co_{80}Cr_{17}Ta_3$ film and $Co_{76}Cr_{20}Ta_2PrSr$ film in the reversed order, i.e., firstly $Co_{76}Cr_{20}Ta_2PrSr$ film was formed on the substrate, and then the $Co_{80}Cr_{17}Ta_3$ film was formed thereon.

The perpendicular magnetic anisotropic energy Ku of the following six films were measured using a torque magnetometer; and saturation magnetization Ms of these six films were measured using a sample vibration type magnetometer (VSM): i.e., a $Co_{74}Cr_{22}Ta_2PrSr$ film, a $Co_{75}Cr_{21}Ta_2PrSr$ film, a $Co_{76}Cr_{20}Ta_2PrSr$ film, a $Co_{77}Cr_{19}Ta_2PrSr$ film, a $Co_{78}Cr_{18}Ta_2PrSr$ film, and a $Co_{80}Cr_{17}Ta_3$ film. The check results are shown in FIG. 35 and FIG. 7.

Here, R is defined as Hk/4pMs in the same way as in Example 1. FIG. 35 shows the R values for each of the films. The $Co_{80}Cr_{17}Ta_3$ film has R=1.1 whereas the $Co_{76}Cr_{20}Ta_2PrSr$ film has R=1.4. That is, the $Co_{76}Cr_{20}Ta_2PrSr$ film shows by far more preferable perpendicular magnetic anisotropy than the $Co_{80}Cr_{17}Ta_3$ film. However, the Co alloy film having a Co percentage content of 73% or below does not show the ferromagnetic characteristic. Accordingly, it is impossible to reduce the Co content without limit.

The ID/MR composite head was used to check the recording/reproduction characteristic of the medium DDD3 of the present invention and the conventional medium (comparative example) D1. The head and the recording/reproduction conditions were set in the same way as in Example 1.

Figure 36:
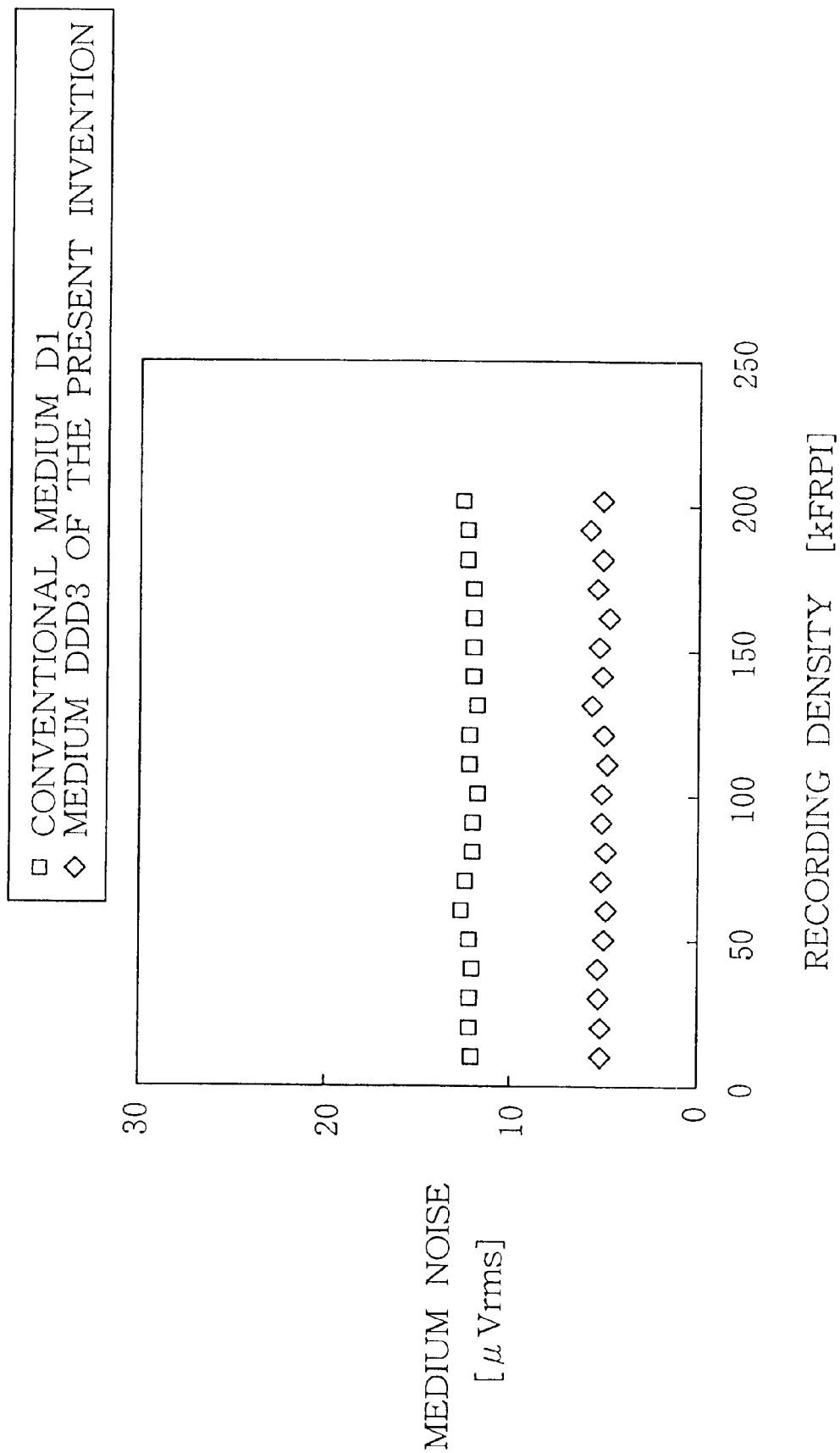
FIG. 36 is a graph showing the medium noise dependency on the recording density in Example 4-2 of the present invention.

FIG. 36 shows the medium noise dependency on the recording density for the DDD3 of the present invention and the conventional medium D1. As is clear from FIG. 36, the conventional medium D1 has a very high noise in the low recording medium region, whereas the medium DDD3 of the present invention shows noise by far lower than the conventional medium D1 in the low recording density region. This is because the DDD3 has a preferable film of perpendicular magnetic anisotropy on the perpendicular magnetization film of $Co_{80}Cr_{17}Ta_3$ and it is possible to suppress generation of a reversed magnetic domain in the vicinity of the surface of the perpendicular magnetization film much more than the conventional medium D1.

Next, the film thickness of the film formed on the perpendicular magnetization film was gradually changed from 5 to 55 [nm] to check the medium noise values at recording density 10 [KFRPI] for all the film types. The results of this check are shown in FIG. 37 to FIG. 41. As is clear from FIG. 37 to FIG. 41, when the value R (Hk/4pMs) is smaller than 1.4, medium noise cannot be improved (reduced) even if the film thickness is reduced. This is because if R is below 1.4, the perpendicular orientation characteristic is insufficient and it is difficult to suppress generation of a reversed magnetic domain in the vicinity of the surface of the perpendicular magnetization film. On the other hand, if the film satisfies the relationship that R is equal to or greater than 1.4, i.e., R≧1.4, the medium noise is reduced up to the film thickness 50 [nm] for all the film types. As has been described above, in the film which satisfies the relationship that R is equal to or greater than 1.4, it is possible to suppress generation of a reversed magnetic domain in the vicinity of the surface of the perpendicular magnetization film. However, even if the film satisfies the aforementioned relationship, the medium noise reduction cannot be seen when the film thickness exceeds 50 [nm]. This is because of the fact that if the film thickness is too great, the orientation perpendicular to the film surface is deteriorated and it is impossible to suppress generation of a reversed magnetic domain in the vicinity of the surface of the perpendicular magnetization film.

As has been described above, the recording medium DDD3 of the present invention shows a preferable medium noise characteristic even in a low recording density region. That is, by using the DDD3 of the present invention, it is possible to realize suppression of medium noise increase in the low recording region. Moreover, when the $Co_{76}Cr_{20}Ta_2PrSr$ film is provided under or both under and over the perpendicular magnetization film, similar results can be obtained because of the aforementioned reasons. Furthermore, film-types other than the $Co_{76}Cr_{20}Ta_2PrSr$ film can also have similar results if the relationship that R is equal to or more than 1.4 is satisfied.

EXAMPLE 5

Using a 6-inch FeSiAl target for sputtering, a FeSiAl film was formed with a thickness of 500 [nm] on 2.5-inch substrates. The film formation conditions were as follows: initial vacuum degree $5 \times 10^{-7}$ [mTorr]; electric power 0.5 [kw]; argon gas pressure 4 [mTorr]; film formation speed 3 [nm/sec].

Then, each of the FeSiAl films on the substrates at temperature of 400 degrees centigrade was covered by 100 [nm] of $Co_{80}Cr_{17}Ta_3$ film formed by using a $Co_{80}Cr_{17}Ta_3$ target under the same film formation conditions as FeSiAl.

Next, the $Co_{80}Cr_{17}Ta_3$ films were respectively covered by 5 to 55 [nm] thickness of a $Co_{74}Cr_{22}Pt_2TaLa$ film, a $Co_{75}Cr_{21}Pt_2TaLa$ film, a $Co_{76}Cr_{20}Pt_2TaLa$ film, a $Co_{77}Cr_{19}Pt_2TaLa$ film, and a $Co_{77}Cr_{19}Pt_2TaLa$ film by using the corresponding targets. Furthermore, a C (carbon) protection film of 10 [nm] was formed to cover the aforementioned films.

The medium having the $Co_{76}Cr_{20}Pt_2TaLa$ film of 50 [nm] will be referred to as AAAA2 of the present invention. On the other hand, the medium having only the $Co_{80}Cr_{17}Ta_3$ film on the FeSiAl film without forming the $Co_{76}Cr_{20}Pt_2TaLa$ film will be referred to as a conventional medium (comparative example) E1.

It should be noted we also prepared a medium having the $Co_{76}Cr_{20}Pt_2TaLa$ film and the $Co_{80}Cr_{17}Ta_3$ film in the reversed order. That is, firstly, $Co_{76}Cr_{20}Pt_2TaLa$ film was formed on the substrate, and then the $Co_{80}Cr_{17}Ta_3$ film was formed on the $Co_{76}Cr_{20}Pt_2TaLa$ film.

FIG. 7 shows the perpendicular magnetic anisotropic energy Ku and saturation magnetization Ms of the $Co_{74}Cr_{22}Pt_2TaLa$ film, the $Co_{75}Cr_{21}Pt_2TaLa$ film, the $Co_{76}Cr_{20}Pt_2TaLa$ film, the $Co_{77}Cr_{19}Pt_2TaLa$ film, the $Co_{78}Cr_{18}Pt_2TaLa$ film, and the $Co_{80}Cr_{17}Ta_3$ film.

By using a mono-pole/MR (magneto-resistance effect) composite head, the recording/reproduction characteristics were checked on the medium AAAA2 of the present invention and the conventional medium E1. The check conditions were set as follows: mono-pole head recording track width 4 [micrometers], the main magnetic pole film thickness 0.4 [micrometers], reproduction track width 3 [micrometers], and reproduction gap length 0.32 [micrometers]. Note that the check was performed under the condition of: recording current 10 [mAop], sense current 12 [mA], peripheral velocity 12.7 [m/s], and floating amount 45 [nm].

Figure 42:
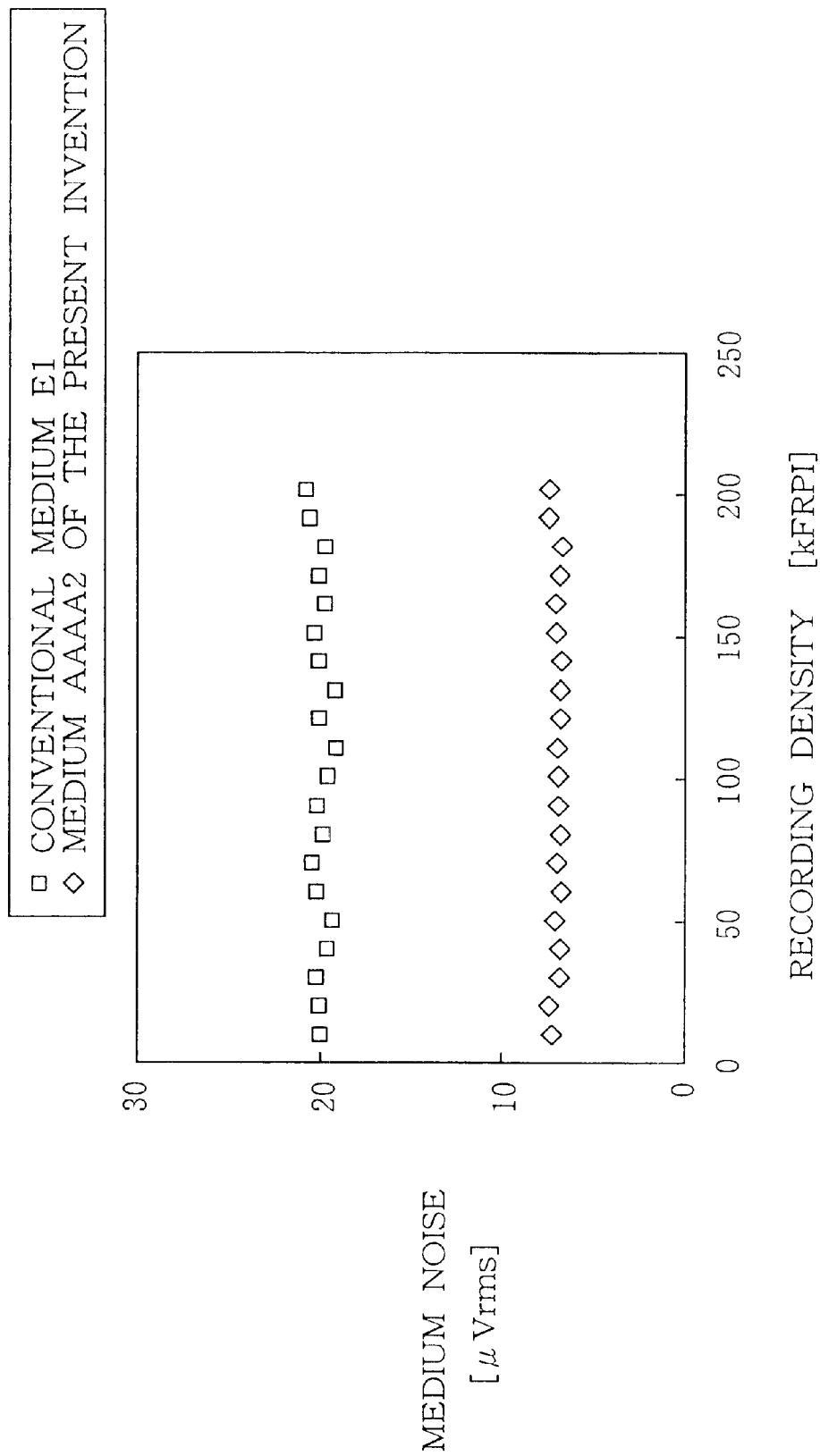
FIG. 42 is a graph showing the medium noise dependency on the recording density in Example 5 of the present invention.

FIG. 42 shows the medium noise dependency on the recording density for the AAAA2 of the present invention and the conventional medium E1. As is clear from FIG. 42, the conventional medium E1 shows a very high medium noise in the lower recording density, whereas in the medium AAAA2 of the present invention, the medium noise in the same recording region is much suppressed in comparison to the conventional medium E1. This is because the medium AAAA2 of the present invention includes a film having a preferable perpendicular magnetic anisotropy on the perpendicular magnetization film of $Co_{80}Cr_{17}Ta_3$. Accordingly, in contrast to the conventional E1, it is possible to much more suppress generation of reversed magnetic domain in the vicinity of the surface of the perpendicular magnetization film. Note that the FeSiAl film has no magnetic domain wall structure and the spike-shaped noise is not generated easily due to the magnetic domain wall movement.

Next, the film thickness of the film formed on the perpendicular magnetization film was gradually changed from 5 to 55 [nm] to check the medium noise values at recording density 10 [KFRPI] for all the film types. The results of this check are shown in FIG. 43 to FIG. 47. As is clear from FIG. 43 to FIG. 47, when the value R (Hk/4pMs) is smaller than 1.4, medium noise cannot be improved (reduced) even if the film thickness is reduced. This is because if R is below 1.4, the perpendicular orientation characteristic is insufficient and it is impossible to sufficiently suppress generation of a reversed magnetic domain in the vicinity of the surface of the perpendicular magnetization film.

On the other hand, if the film satisfies the relationship that R is equal to or greater than 1.4, the medium noise is reduced up to the film thickness 50 [nm] for all the film types. As has been described above, if a film satisfies the relationship that R is equal to or greater than 1.4, it is possible to suppress generation of a reversed magnetic domain in the vicinity of the surface of the perpendicular magnetization film. However, even if the film satisfies the aforementioned relationship, the medium noise reduction cannot be seen when the film thickness exceeds 50 [nm]. This is because of the fact that if the film thickness is too great, the orientation perpendicular to the film surface is deteriorated and it is impossible to suppress generation of a reversed magnetic domain in the vicinity of the surface of the perpendicular magnetization film.

As has been described above, the recording medium AAAA2 of the present invention shows a preferable medium noise characteristic even in a low recording density region. That is, by using the AAAA2 of the present invention, it is possible to realize suppression of medium noise increase in the low recording region. Moreover, when the $Co_{76}Cr_{20}Pt_2TaLa$ film is provided under or both under and over the perpendicular magnetization film, similar results can be obtained because of the aforementioned reasons. Furthermore, film types other than the $Co_{76}Cr_{20}Pt_2TaLa$ film can also have similar results if the relationship that R is equal to or more than 1.4 is satisfied.

Moreover, in the experiment using the ID/MR composite head used in Example 1 instead of the mono-pole composite head, similar results were obtained because of the aforementioned reasons.

EXAMPLE 6

Media of Example 6 were prepared in the same way as Example 5 except for that the $Co_xCr_{96-x}Pt_2TaLa$ (74≦x≦78) target was replaced by $Co_xCr_{96-x}Ta_2TaLu$ (74≦x≦78) target. The medium examples made from $Co_{76}Cr_{20}Pt_2TaLu$ film having a film thickness of 50 [nm] will be referred to medium BBBB2 of the present invention. Note that we also prepared media having the $Co_{80}Cr_{17}Ta_3$ film and $Co_{76}Cr_{20}Ta_2LaLu$ film in the reversed order, i.e., firstly $Co_{76}Cr_{20}Ta_2LaLu$ film was formed on the substrate, and then the $Co_{80}Cr_{17}Ta_3$ film was formed thereon.

FIG. 7 shows the perpendicular magnetic anisotropic energy Ku and saturation magnetization Ms of the $Co_{74}Cr_{22}Pt_2TaLu$ film, the $Co_{75}Cr_{21}Pt_2TaLu$ film, the $Co_{76}Cr_{20}Pt_2TaLu$ film, the $Co_{77}Cr_{19}Pt_2TaLu$ film, the $Co_{78}Cr_{18}Pt_2TaLu$ film, and the $Co_{80}Cr_{17}Ta_3$ film.

By using a mono-pole/MR (magneto-resistance effect) composite head, the recording/reproduction characteristics were checked on the medium BBBB2 of the present invention and the conventional medium E1. The check conditions and head characteristics were the same as in Example 5.

Figure 48:
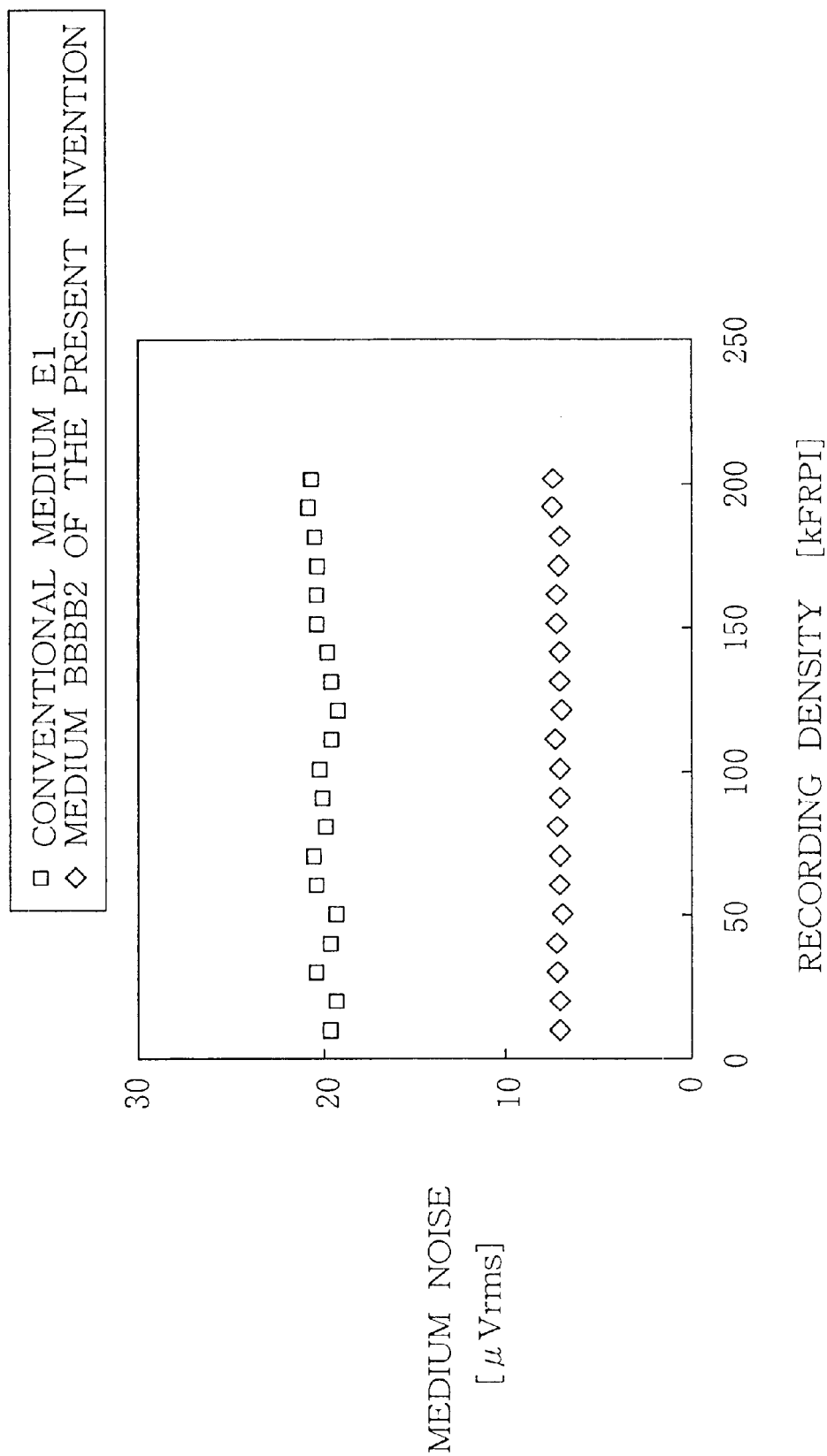
FIG. 48 is a graph showing the medium noise dependency on the recording density in Example 6 of the present invention.

FIG. 48 shows the medium noise dependency on the recording density for the BBBB2 of the present invention and the conventional medium E1. As is clear from FIG. 48, the conventional medium E1 shows a very high medium noise in the lower recording density, whereas in the medium BBBB2 of the present invention, the medium noise in the same recording region is much suppressed in comparison to the conventional medium E1. This is because the medium BBBB2 of the present invention includes a film having a preferable perpendicular magnetic anisotropy on the perpendicular magnetization film of $Co_{80}Cr_{17}Ta_3$. Accordingly, in contrast to the conventional E1, it is possible to much more suppress generation of reversed magnetic domain in the vicinity of the surface of the perpendicular magnetization film. Note that the FeSiAl film has no magnetic domain wall structure and the spike-shaped noise is not easily caused by the magnetic domain wall movement.

Next, the film thickness of the film formed on the perpendicular magnetization film was gradually changed from 5 to 55 [nm] to check the medium noise values at recording density 10 [KFRPI] for all the film types. The results of this check are shown in FIG. 49 to FIG. 53. As is clear from FIG. 49 to FIG. 53, when the value R (Hk/4pMs) is smaller than 1.4, medium noise cannot be improved (reduce) even if the film thickness is reduced. This is because if R is below 1.4, the perpendicular orientation characteristic is insufficient and it is impossible to sufficiently suppress generation of a reversed magnetic domain in the vicinity of the surface of the perpendicular magnetization film.

On the other hand, if the film satisfies the relationship that R is equal to or greater than 1.4, the medium noise is reduced up to the film thickness 50 [nm] for all the film types. As has been described above, if a film satisfies the relationship that R is equal to or greater than 1.4, it is possible to suppress generation of a reversed magnetic domain in the vicinity of the surface of the perpendicular magnetization film. However, even if the film satisfies the aforementioned relationship, the medium noise reduction cannot be seen when the film thickness exceeds 50 [nm]. This is because of the fact that if the film thickness is too great, the orientation perpendicular to the film surface is deteriorated and it is impossible to suppress generation of a reversed magnetic domain in the vicinity of the surface of the perpendicular magnetization film.

As has been described above, the recording medium BBBB2 of the present invention shows a preferable medium noise characteristic even in a low recording density region. That is, by using the BBBB2 of the present invention, it is possible to realize suppression of medium noise increase in the low recording region.

Moreover, when the $Co_{76}Cr_{20}Pt_2TaLu$ film is provided under or both under and over the perpendicular magnetization film, similar results can be obtained because of the aforementioned reasons. Furthermore, film types other than the $Co_{76}Cr_{20}Pt_2TaLu$ film can also have similar results if the relationship that R is equal to or more than 1.4 is satisfied.

EXAMPLE 7

Media of Example 7 were prepared in the same way as Example 5 except for that the $Co_xCr_{96-x}Pt_2TaLa$ (74≦x ≦78) target was replaced by $Co_xCr_{96-x}Pt_2LaLu$ (74≦x≦78) target. The medium examples made from $Co_{76}Cr_{20}Pt_2LaLu$ film having a film thickness of 50 [nm] will be referred to medium CCCC2 of the present invention. Note that we also prepared media having the $Co_{80}Cr_{17}Ta_3$ film and $Co_{76}Cr_{20}Pt_2LaLu$ film in the reversed order, i.e., firstly $Co_{76}Cr_{20}Pt_2LaLu$ film was formed on the substrate, and then the $Co_{80}Cr_{17}Ta_3$ film was formed thereon.

FIG. 21 and FIG. 7 shows the perpendicular magnetic anisotropic energy Ku and saturation magnetization Ms of the $Co_{74}Cr_{22}Pt_2LaLu$ film, the $Co_{75}Cr_{21}Pt_2zLaLu$ film, the $Co_{76}Cr_{20}Pt_2LaLu$ film, the $Co_{77}Cr_{19}Pt_2LaLu$ film, the $Co_{78}Cr_{18}Pt_2LaLu$ film, and the $Co_{80}Cr_{17}Ta_3$ film.

By using a mono-pole/MR (magneto-resistance effect) composite head, the recording/reproduction characteristics were checked on the medium CCCC2 of the present invention and the conventional medium E1. The check conditions and head characteristics were the same as in Example 5.

Figure 54:
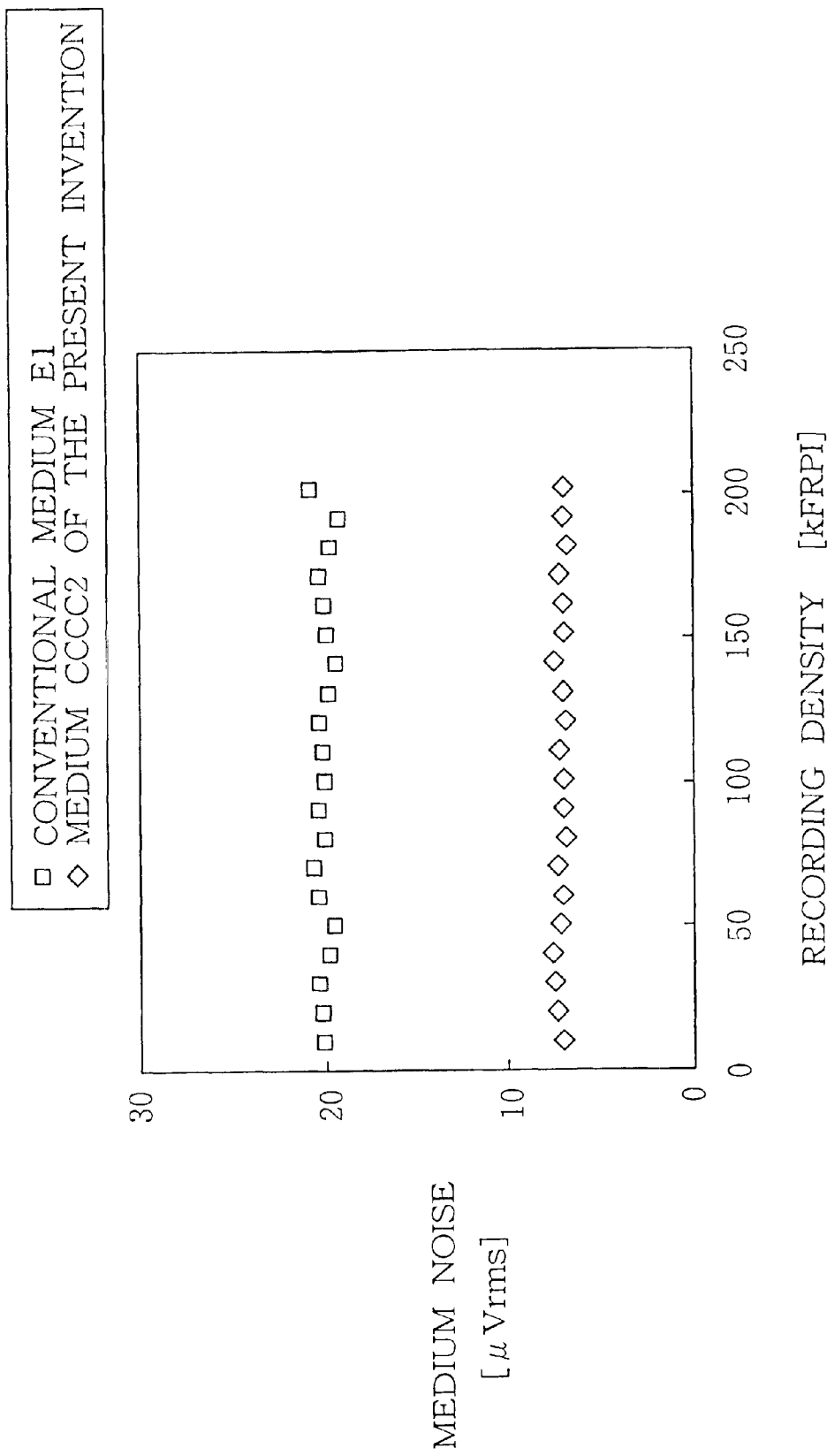
FIG. 54 is a graph showing the medium noise dependency on the recording density in Example 7 of the present invention.

FIG. 54 shows the medium noise dependency on the recording density for the CCCC2 of the present invention and the conventional medium E1. As is clear from FIG. 54, the conventional medium E1 shows a very high medium noise in the lower recording density, whereas in the medium CCCC2 of the present invention, the medium noise in the same recording region is much suppressed in comparison to the conventional medium E1. This is because the medium CCCC2 of the present invention includes a film having a preferable perpendicular magnetic anisotropy on the perpendicular magnetization film of $Co_{80}Cr_{17}Ta_3$. Accordingly, in contrast to the conventional E1, it is possible to much more suppress generation of reversed magnetic domain in the vicinity of the surface of the perpendicular magnetization film. Note that the FeSiAl film has no magnetic domain wall structure and the spike-shaped noise is not easily caused by the magnetic domain wall movement.

Next, the film thickness of the film formed on the perpendicular magnetization film was gradually changed from 5 to 55 [nm] to check the medium noise values at recording density 10 [KFRPI] for all the film types. The results of this check are shown in FIG. 55 to FIG. 59. As is clear from FIG. 55 to FIG. 59, when the value R (Hk/4pMs) is smaller than 1.4, medium noise cannot be improved even if the film thickness is reduced. This is because if R is below 1.4, the perpendicular orientation characteristic is insufficient and it is impossible to sufficiently suppress generation of a reversed magnetic domain in the vicinity of the surface of the perpendicular magnetization film.

On the other hand, if the film satisfies the relationship that R is equal to or greater than 1.4, the medium noise is r educed up to the film thickness 50 [nm] for all the film types. As has been described above, if a film satisfies the relationship that R is equal to or greater than 1.4, it is possible to suppress generation of a reverse d magnetic domain in the vicinity of the surface of the perpendicular magnetization film. However, even if the film satisfies the aforementioned relationship, the medium noise reduction cannot be seen when the film thickness exceeds 50 [nm]. This is because of the fact that if the film thickness is too great, the orientation perpendicular to the film surface is deteriorated and it is impossible to suppress generation of a reversed magnetic domain in the vicinity of the surface of the perpendicular magnetization film.

As has been described above, the recording medium CCCC2 of the present invention shows a preferable medium noise characteristic even in a low recording density region. That is, by using the CCCC2 of the present invention, it is possible to realize suppression of medium noise increase in the low recording region. Moreover, when the $Co_{76}Cr_{20}Pt_2LaLu$ film is provided under or both under and over the perpendicular magnetization film, similar results can be obtained because of the aforementioned reasons. Furthermore, film types other than the $Co_{76}Cr_{20}Pt_2LaLu$ film can also have similar results if the relationship that R is equal to or more than 1.4 is satisfied.

Moreover, experiments were performed using the ID/MR composite head used in Example 1, instead of the monopole/MR composite head. The experiments showed results similar to the aforementioned results.

EXAMPLE 8-1

Media of Example 8-1 were prepared in the same way as Example 5 except for that the $Co_xCr_{96-x}Pt_2TaLa$ (74≦x ≦78) target was replaced by $Co_xCr_{96-x}Ta_2LaLu$ (74 ≦x≦78) target. The medium examples made from $Co_{76}Cr_{20}Ta_2LaLu$ film having a film thickness of 50 [nm] will be referred to as medium DDDD2 of the present invention. Note that we also prepared media having the $Co_{80}Cr_{17}Ta_3$ film and $Co_{76}Cr_{20}Ta_2LaLu$ film in the reversed order, i.e., firstly $Co_{76}Cr_{20}Ta_2LaLu$ film was formed on the substrate, and then the $Co_{80}Cr_{17}Ta_3$ film was formed thereon.

FIG. 28 and FIG. 7 show the perpendicular magnetic anisotropic energy Ku and saturation magnetization Ms of the $Co_{74}Cr_{22}Ta_2LaLu$ film, the $Co_{75}Cr_{21}Ta_2LaLu$ film, the $Co_{76}Cr_{20}Ta_2LaLu$ film, the $Co_{77}Cr_{19}Ta_2LaLu$ film, the $Co_{78}Cr_{18}Ta_2LaLu$ film, and the $Co_{80}Cr_{17}Ta_3$ film.

By using a mono-pole/MR (magneto-resistance effect) composite head, the recording/reproduction characteristics were checked on the medium DDDD2 of the present invention and the conventional medium E1. The check conditions and head characteristics were the same as in Example 5.

Figure 60:
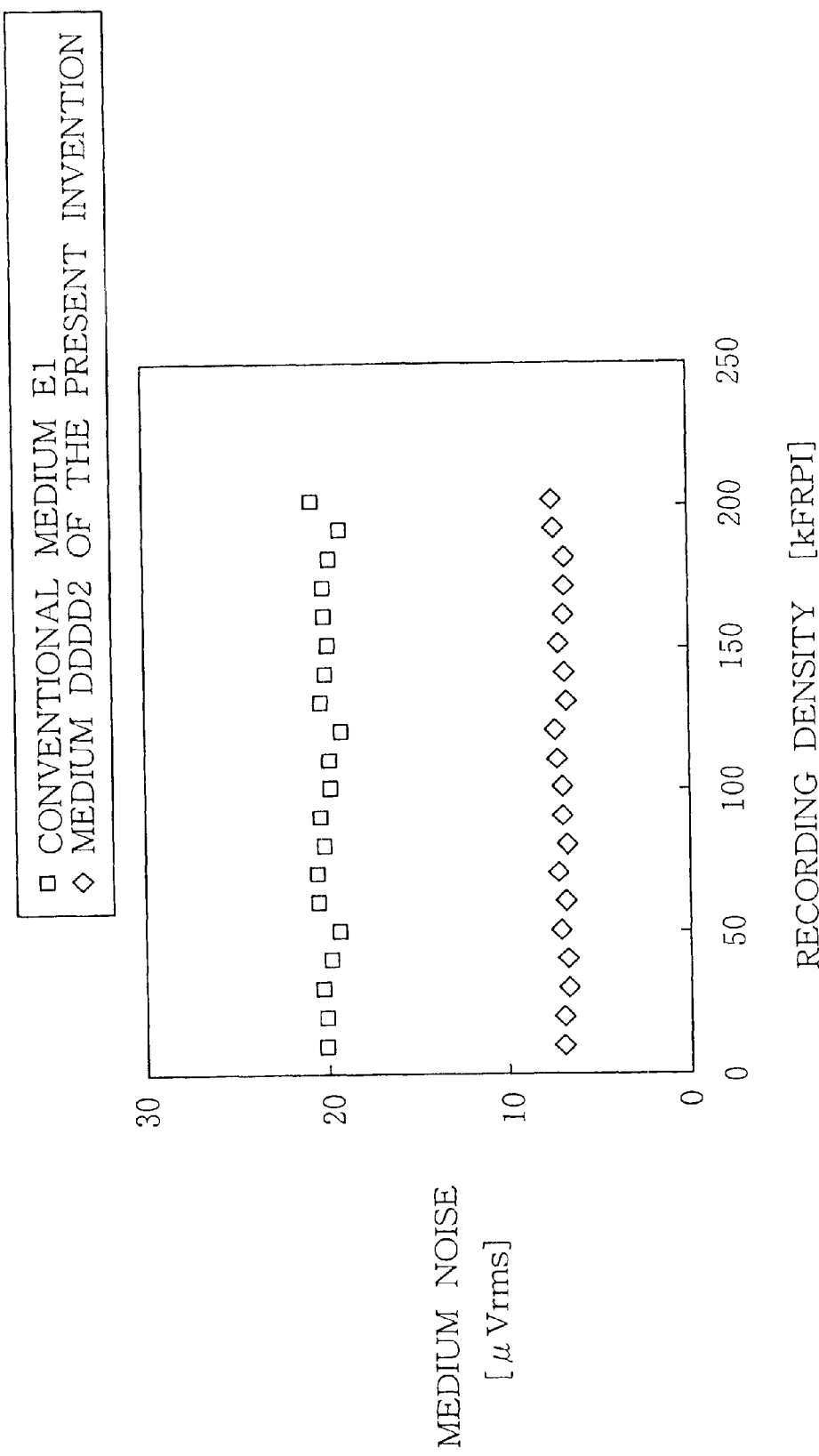
FIG. 60 is a graph showing the medium noise dependency on the recording density in Example 8-1 of the present invention.

FIG. 60 shows the medium noise dependency on the recording density for the DDDD2 of the present invention and the conventional medium E1. As is clear from FIG. 60, the conventional medium E1 shows a very high medium noise in the lower recording density, whereas in the medium DDDD2 of the present invention, the medium noise in the same recording region is much suppressed in comparison to the conventional medium E1. This is because the medium DDDD2 of the present invention includes a film having a preferable perpendicular magnetic anisotropy on the perpendicular magnetization film of $Co_{80}Cr_{17}Ta_3$. Accordingly, in contrast to the conventional E1, it is possible to much more suppress generation of reversed magnetic domain in the vicinity of the surface of the perpendicular magnetization film. Note that the FeSiAl film has no magnetic domain wall structure and the spike-shaped noise is not easily caused by the magnetic domain wall movement.

Next, the film thickness of the film formed on the perpendicular magnetization film was gradually changed from 5 to 55 [nm] to check the medium noise values at recording density 10 [KFRPI] for all the film types. The results of this check are shown in FIG. 61 to FIG. 65. As is clear from FIG. 61 to FIG. 65, when the value R (Hk/4pMs) is smaller than 1.4, medium noise cannot be improved (reduced) even if the film thickness is reduced. This is because if R is below 1.4, the perpendicular orientation characteristic is insufficient and it is impossible to sufficiently suppress generation of a reversed magnetic domain in the vicinity of the surface of the perpendicular magnetization film. On the other hand, if the film satisfies the relationship that R is equal to or greater than 1.4, the medium noise is reduced up to the film thickness 50 [nm] for all the film types. As has been described above, if a film satisfies the relationship that R is equal to or greater than 1.4, it is possible to suppress generation of a reversed magnetic domain in the vicinity of the surface of the perpendicular magnetization film. However, even if the film satisfies the aforementioned relationship, the medium noise reduction cannot be seen when the film thickness exceeds 50 [nm]. This is because of the fact that if the film thickness is too great, the orientation perpendicular to the film surface is deteriorated and it is impossible to suppress generation of a reversed magnetic domain in the vicinity of the surface of the perpendicular magnetization film.

As has been described above, the recording medium DDDD2 of the present invention shows a preferable medium noise characteristic even in a low recording density region. That is, by using the DDDD2 of the present invention, it is possible to realize suppression of medium noise increase in the low recording region. Moreover, when the $Co_{76}Cr_{20}Ta_2LaLu$ film is provided under or both under and over the perpendicular magnetization film, similar results can be obtained because of the aforementioned reasons. Furthermore, film types other than the $Co_{76}Cr_{20}Ta_2LaLu$ film can also have similar results if the relationship that R is equal to or more than 1.4 is satisfied.

Moreover, experiment was performed using the ID/MR composite head used in Example 1, instead of the monopole/MR composite head. The experiment showed results similar to the aforementioned results.

EXAMPLE 8-2

Media of Example 8-2 were prepared in the same way as Example 5 except for that the $Co_xCr_{96-x}Pt_2TaLa$ (74≦x≦78) target was replaced by $Co_xCr_{96-x}Ta_2PrSr$ (74≦x≦78) target. The medium examples made from $Co_{76}Cr_{20}Ta_2PrSr$ film having a film thickness of 50 [nm] will be referred to as medium DDDD3 of the present invention. Note that we also prepared media having the $Co_{80}Cr_{17}Ta_3$ film and $Co_{76}Cr_2Ta_2PrSr$ film in the reversed order, i.e., firstly $Co_{76}Cr_{20}Ta_2PrSr$ film was formed on the substrate, and then the $Co_{80}Cr_{17}Ta_3$ film was formed thereon.

FIG. 35 and FIG. 7 shows the perpendicular magnetic anisotropic energy Ku and saturation magnetization Ms of the $Co_{74}Cr_{22}Ta_2PrSr$ film, the $Co_{75}Cr_{21}Ta_2PrSr$ film, the $Co_{76}Cr_{20}Ta_2PrSr$ film, the $Co_{77}Cr_{19}Ta_2PrSr$ film, the $Co_{78}Cr_{18}Ta_2LaLu$ film, and the $Co_{80}Cr_{17}Ta_3$ film.

By using a mono-pole/MR (magneto-resistance effect) composite head, the recording/reproduction characteristics were checked on the medium DDDD3 of the present invention and the conventional medium E1. The check conditions and head characteristics were the same as in Example 5.

Figure 66:
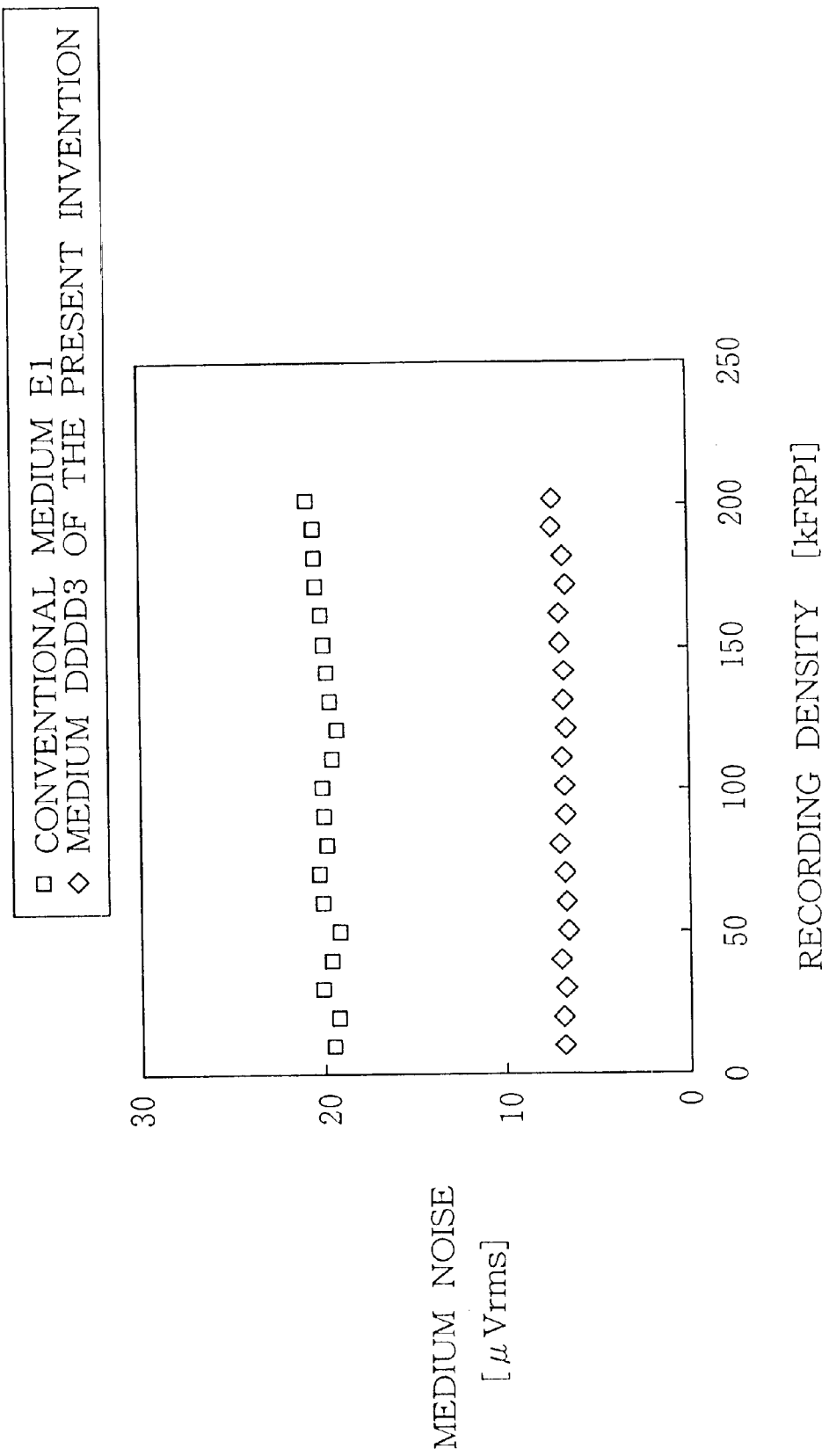
FIG. 66 is a graph showing the medium noise dependency on the recording density in Example 8-2 of the present invention.

FIG. 66 shows the medium noise dependency on the recording density for the DDDD3 of the present invention and the conventional medium E1. As is clear from FIG. 66, the conventional medium E1 shows a very high medium noise in the lower recording density, whereas in the medium DDDD3 of the present invention, the medium noise in the same recording region is much suppressed in comparison to the conventional medium E1. This is because the medium DDDD3 of the present invention includes a film having a preferable perpendicular magnetic anisotropy on the perpendicular magnetization film of $Co_{80}Cr_{17}Ta_3$. Accordingly, in contrast to the conventional E1, it is possible to much more suppress generation of reversed magnetic domain in the vicinity of the surface of the perpendicular magnetization film. Note that the FeSiAl film has no magnetic domain wall structure and the spike-shaped noise is not easily caused by the magnetic domain wall movement.

Next, the film thickness of the film formed on the perpendicular magnetization film was gradually changed from 5 to 55 [nm] to check the medium noise values at recording density 10 [KFRPI] for all the film types. The results of this check are shown in FIG. 67 to FIG. 71. As is clear from FIG. 67 to FIG. 71, when the value R (Hk/4pMs) is smaller than 1.4, medium noise cannot be improved (reduced) even if the film thickness is reduced. This is because if R is below 1.4, the perpendicular orientation characteristic is insufficient and it is impossible to sufficiently suppress generation of a reversed magnetic domain in the vicinity of the surface of the perpendicular magnetization film.

On the other hand, if the film satisfies the relationship that R is equal to or greater than 1.4, the medium noise is reduced up to the film thickness 50 [nm] for all the film types. As has been described above, if a film satisfies the relationship that R is equal to or greater than 1.4, it is possible to suppress generation of a reversed magnetic domain in the vicinity of the surface of the perpendicular magnetization film. However, even if the film satisfies the aforementioned relationship, the medium noise reduction cannot be seen when the film thickness exceeds 50 [nm]. This is because of the fact that if the film thickness is too great, the orientation perpendicular to the film surface is deteriorated and it is impossible to suppress generation of a reversed magnetic domain in the vicinity of the surface of the perpendicular magnetization film.

As has been described above, the recording medium DDDD3 of the present invention shows a preferable medium noise characteristic even in a low recording density region. That is, by using the DDDD3 of the present invention, it is possible to realize suppression of medium noise increase in the low recording region. Moreover, when the $Co_{76}Cr_{20}Ta_2PrSr$ film is provided under or both under and over the perpendicular magnetization film, similar results can be obtained because of the aforementioned reasons. Furthermore, film types other than the $Co_{76}Cr_{20}Ta_2PrSr$ film can also have similar results if the relationship that R is equal to or more than 1.4 is satisfied.

Moreover, experiment was performed using the ID/MR composite head used in Example 1, instead of the monopole/MR composite head. The experiment showed results similar to the aforementioned results.

EXAMPLE 9

Media of Example 9 were prepared in the same way as in Example 5 except for that the FeSiAl target for sputtering was replaced by FeTaN target.

The medium having the $Co_{76}Cr_{20}Pt_2TaLa$ film of 50 [nm] will be referred to as EEEE2 of the present invention. On the other hand, the medium having only the $Co_{80}Cr_{17}Ta_3$ film on the FeTaN film without forming the $Co_{76}Cr_{20}Pt_2TaLa$ film will be referred to as a conventional medium (comparative example) F1.

It should be noted we also prepared a medium having the $Co_{76}Cr_{20}Pt_2TaLa$ film and the $Co_{80}Cr_{17}Ta_3$ film in the reversed order. That is, firstly, $Co_{76}Cr_{20}Pt_2TaLa$ film was formed on the substrate, and then the $Co_{80}Cr_{17}Ta_3$ film was formed on the $Co_{76}Cr_{20}Pt_2TaLa$ film.

FIG. 7 shows the perpendicular magnetic anisotropic energy Ku and saturation magnetization Ms of the $Co_{74}Cr_{22}Pt_2TaLa$ film, the $Co_{75}Cr_{21}Pt_2TaLa$ film, the $Co_{76}Cr_{20}Pt_2TaLa$ film, the $Co_{77}Cr_{19}Pt_2TaLa$ film, the $Co_{78}Cr_{18}Pt_2TaLa$ film, and the $Co_{80}Cr_{17}Ta_3$ film.

By using a mono-pole/MR (magneto-resistance effect) composite head, the recording/reproduction characteristics were checked on the medium EEEE2 of the present invention and the conventional medium F1. The check conditions and the head characteristics were set in the same way as Example 5.

Figure 72:
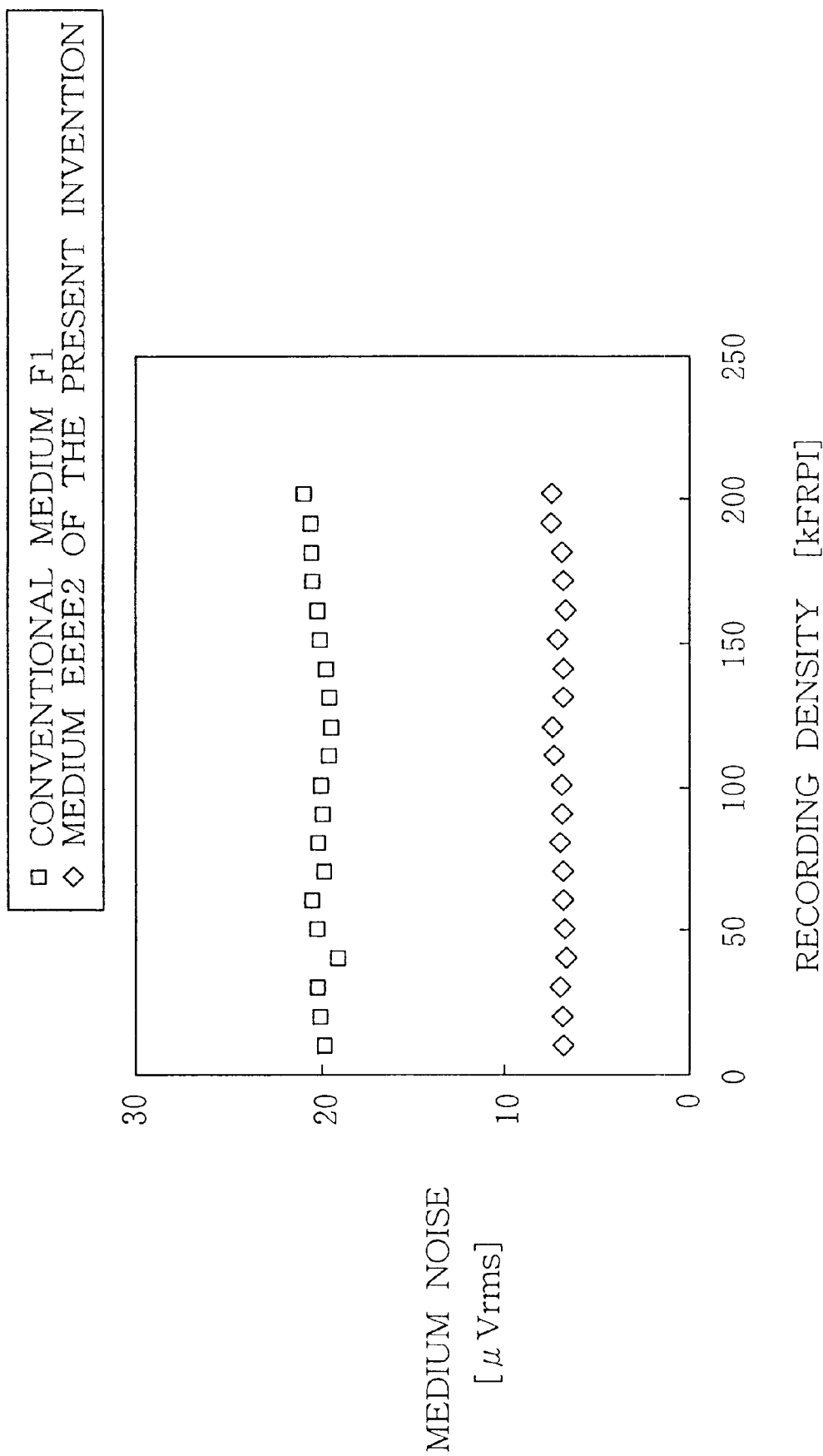
FIG. 72 is a graph showing the medium noise dependency on the recording density in Example 9 of the present invention.

FIG. 72 shows the medium noise dependency on the recording density for the EEEE2 of the present invention and the conventional medium F1. As is clear from FIG. 72, the conventional medium F1 shows a very high medium noise in the lower recording density, whereas in the medium EEEE2 of the present invention, the medium noise in the same recording region is much suppressed in comparison to the conventional medium F1. This is because the medium EEEE2 of the present invention includes a film having a preferable perpendicular magnetic anisotropy on the perpendicular magnetization film of $Co_{80}Cr_{17}Ta_3$. Accordingly, in contrast to the conventional F1, it is possible to much more suppress generation of reversed magnetic domain in the vicinity of the surface of the perpendicular magnetization film.

Note that the FeTaN film has no magnetic domain wall structure and the spike-shaped noise is not generated easily due to the magnetic domain wall movement.

Next, the film thickness of the film formed on the perpendicular magnetization film was gradually changed from 5 to 55 [nm] to check the medium noise values at recording density 10 [KFRPI] for all the film types. The results of this check are shown in FIG. 73 to FIG. 77. As is clear from FIG. 73 to FIG. 77, when the value R (Hk/4pMs) is smaller than 1.4, medium noise cannot be improved (reduced) even if the film thickness is reduced. This is because if R is below 1.4, the perpendicular orientation characteristic is insufficient and it is impossible to sufficiently suppress generation of a reversed magnetic domain in the vicinity of the surface of the perpendicular magnetization film.

On the other hand, if the film satisfies the relationship that R is equal to or greater than 1.4, the medium noise is reduced up to the film thickness 50 [nm] for all the film types. As has been described above, if a film satisfies the relationship that R is equal to or greater than 1.4, it is possible to suppress generation of a reversed magnetic domain in the vicinity of the surface of the perpendicular magnetization film.

However, even if the film satisfies the aforementioned relationship, the medium noise reduction cannot be seen when the film thickness exceeds 50 [nm]. This is because of the fact that if the film thickness is too great, the orientation perpendicular to the film surface is deteriorated and it is impossible to suppress generation of a reversed magnetic domain in the vicinity of the surface of the perpendicular magnetization film.

As has been described above, the recording medium EEEE2 of the present invention shows a preferable medium noise characteristic even in a low recording density region. That is, by using the EEEE2 of the present invention, it is possible to realize suppression of medium noise increase in the low recording region. Moreover, when the $Co_{76}Cr_{20}Pt_2TaLa$ film is provided under or both under and over the perpendicular magnetization film, similar results can be obtained because of the aforementioned reasons. Furthermore, film types other than the $Co_{76}Cr_{20}Pt_2TaLa$ film can also have similar results if the relationship that R is equal to or more than 1.4 is satisfied.

Moreover, in the experiment using the ID/MR composite head used in Example 1 instead of the mono-pole composite head, similar results were obtained because of the aforementioned reasons.

EXAMPLE 10-1

Media of Example 10-1 were prepared in the same way as in Example 9 except for that the $Co_xCr_{96-x}Pt_2TaLa$ ($74 \leq x \leq 78$) target was replaced by $Co_xCr_{96-x}Pt_2TaLu$ ($74 \leq x \leq 78$) target. The medium having the $Co_{76}Cr_{20}Pt_2TaLu$ film of 50 [nm] will be referred to as FFFF2 of the present invention.

It should be noted we also prepared a medium having the $Co_{76}Cr_{20}Pt_2TaLu$ film and the $Co_{80}Cr_{17}Ta_3$ film in the reversed order. That is, firstly, $Co_{76}Cr_{20}Pt_2TaLu$ film was formed on the substrate, and then the $Co_{80}Cr_{17}Ta_3$ film was formed on the $Co_{76}Cr_{20}Pt_2TaLu$ film.

FIG. 7 shows the perpendicular magnetic anisotropic energy Ku and saturation magnetization Ms of the $Co_{74}Cr_{22}Pt_2TaLu$ film, the $Co_{75}Cr_{21}Pt_2TaLu$ film, the $Co_{76}Cr_{20}Pt_2TaLu$ film, the $Co_{77}Cr_{19}Pt_2TaLu$ film, the $Co_{78}Cr_{18}Pt_2TaLu$ film, and the $Co_{80}Cr_{17}Ta_3$ film.

By using a mono-pole/MR (magneto-resistance effect) composite head, the recording/reproduction characteristics were checked on the medium FFFF2 of the present invention and the conventional medium F1. The check conditions and the head characteristics were set in the same way as Example 5.

Figure 78:
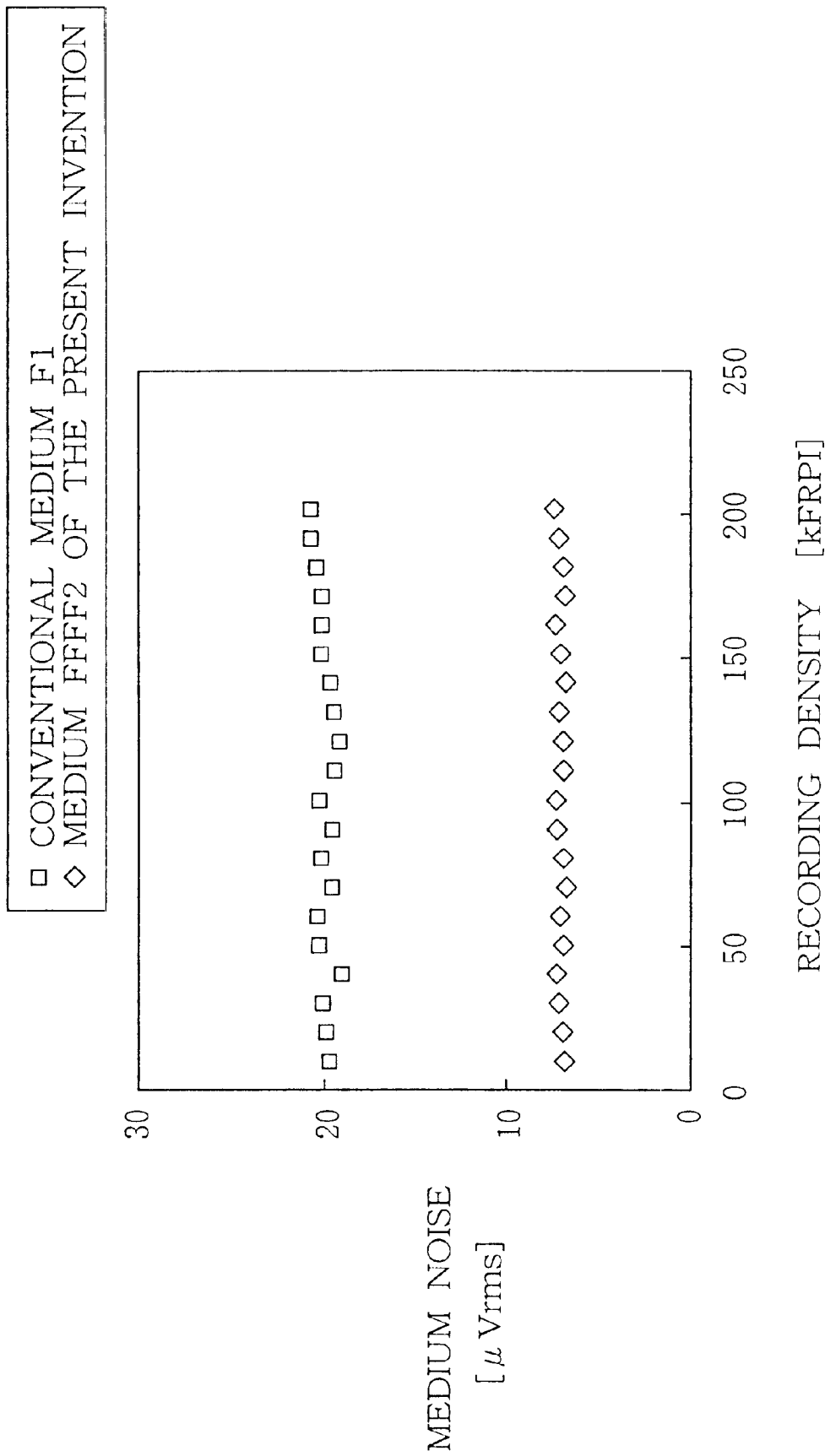
FIG. 78 is a graph showing the medium noise dependency on the recording density in Example 10-1 of the present invention.

FIG. 78 shows the medium noise dependency on the recording density for the FFFF2 of the present invention and the conventional medium F1. As is clear from FIG. 78, the conventional medium F1 shows a very high medium noise in the lower recording density, whereas in the medium FFFF2 of the present invention, the medium noise in the same recording region is much suppressed in comparison to the conventional medium F1. This is because the medium FFFF2 of the present invention includes a film having a preferable perpendicular magnetic anisotropy on the perpendicular magnetization film of $Co_{80}Cr_{17}Ta_3$. Accordingly, in contrast to the conventional F1, it is possible to much more suppress generation of reversed magnetic domain in the vicinity of the surface of the perpendicular magnetization film.

Note that the FeTaN film has no magnetic domain wall structure and the spike-shaped noise is not generated easily due to the magnetic domain wall movement.

Next, the film thickness of the film formed on the perpendicular magnetization film was gradually changed from 5 to 55 [nm] to check the medium noise values at recording density 10 [KFRPI] for all the film types. The results of this check are shown in FIG. 79 to FIG. 83. As is clear from FIG. 79 to FIG. 83, when the value R (Hk/4pMs) is smaller than 1.4, medium noise cannot be improved (reduced) even if the film thickness is reduced. This is because if R is below 1.4, the perpendicular orientation characteristic is insufficient and it is impossible to sufficiently suppress generation of a reversed magnetic domain in the vicinity of the surface of the perpendicular magnetization film.

On the other hand, if the film satisfies the relationship that R is equal to or greater than 1.4, the medium noise is reduced up to the film thickness 50 [nm] for all the film types. As has been described above, if a film satisfies the relationship that R is equal to or greater than 1.4, it is possible to suppress generation of a reversed magnetic domain in the vicinity of the surface of the perpendicular magnetization film. However, even if the film satisfies the aforementioned relationship, the medium noise reduction cannot be seen when the film thickness exceeds 50 [nm]. This is because of the fact that if the film thickness is too great, the orientation perpendicular to the film surface is deteriorated and it is impossible to suppress generation of a reversed magnetic domain in the vicinity of the surface of the perpendicular magnetization film.

As has been described above, the recording medium FFFF2 of the present invention shows a preferable medium noise characteristic even in a low recording density region. That is, by using the FFFF2 of the present invention, it is possible to realize suppression of medium noise increase in the low recording region. Moreover, when the $Co_{76}Cr_{20}Pt_2TaLu$ film is provided under or both under and over the perpendicular magnetization film, similar results can be obtained because of the aforementioned reasons. Furthermore, film types other than the $Co_{76}Cr_{20}Pt_2TaLu$ film can also have similar results if the relationship that R is equal to or more than 1.4 is satisfied.

Moreover, in the experiment using the ID/MR composite head used in Example 1 instead of the mono-pole composite head, similar results were obtained because of the aforementioned reasons.

EXAMPLE 10-2

Media of Example 10-1 were prepared in the same way as in Example 9 except for that the $Co_xCr_{96-x}Pt_2PrSr$ (74≦x ≦78) target was replaced by $Co_xCr_{96-x}Pt_2PrSr$ (74≦x≦78) target. The medium having the $Co_{76}Cr_{20}Pt_2PrSr$ film of 50 [nm] will be referred to as FFFF3 of the present invention.

It should be noted we also prepared a medium having the $Co_{76}Cr_{20}Pt_2PrSr$ film and the $Co_{80}Cr_{17}Ta_3$ film in the reversed order. That is, firstly, $Co_{76}Cr_{20}Pt_2PrSr$ film was formed on the substrate, and then the $Co_{80}Cr_{17}Ta_3$ film was formed on the $Co_{76}Cr_{20}Pt_2PrSr$ film.

FIG. 35 and FIG. 7 shows the perpendicular magnetic anisotropic energy Ku and saturation magnetization Ms of the $Co_{74}Cr_{22}Pt_2PrSr$ film, the $Co_{75}Cr_{21}Pt_2PrSr$ film, the $Co_{76}Cr_{20}Pt_2PrSr$ film, the $Co_{77}Cr_{19}Pt_2PrSr$ film, the $Co_{78}Cr_{18}Pt_2PrSr$ film, and the $Co_{80}Cr_{17}Ta_3$ film.

By using a mono-pole/MR (magneto-resistance effect) composite head, the recording/reproduction characteristics were checked on the medium FFFF3 of the present invention and the conventional medium F1. The check conditions and the head characteristics were set in the same way as Example 5.

Figure 84:
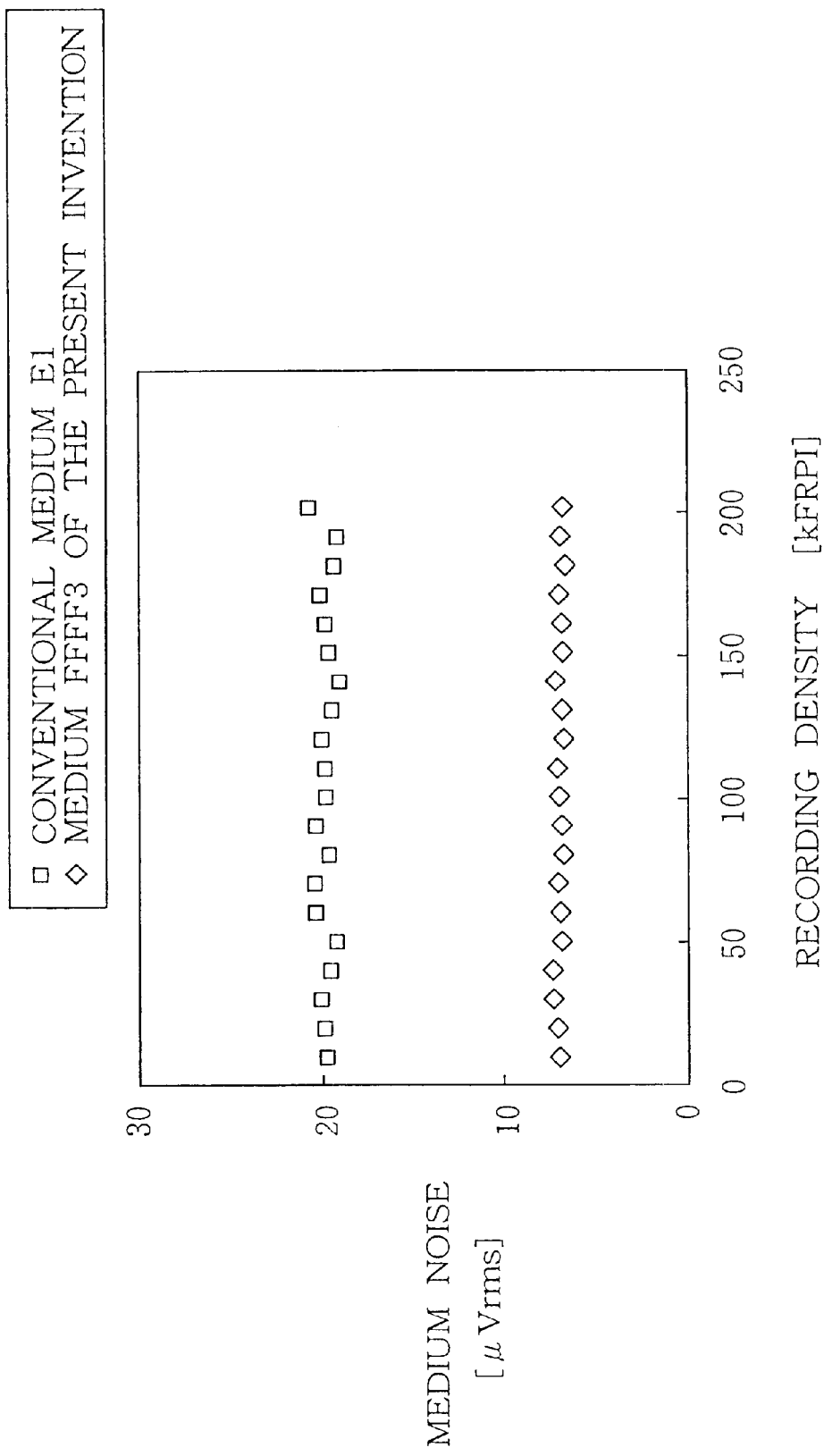
FIG. 84 is a graph showing the medium noise dependency on the recording density in Example 10-2 of the present invention.

FIG. 84 shows the medium noise dependency on the recording density for the FFFF3 of the present invention and the conventional medium F1. As is clear from FIG. 84, the conventional medium F1 shows a very high medium noise in the lower recording density, whereas in the medium FFFF3 of the present invention, the medium noise in the same recording region is much suppressed in comparison to the conventional medium F1. This is because the medium FFFF3 of the present invention includes a film having a preferable perpendicular magnetic anisotropy on the perpendicular magnetization film of $Co_{80}Cr_{17}Ta_3$. Accordingly, in contrast to the conventional F1, it is possible to much more suppress generation of reversed magnetic domain in the vicinity of the surface of the perpendicular magnetization film.

Note that the FeTaN film has no magnetic domain wall structure and the spike-shaped noise is not generated easily due to the magnetic domain wall movement.

Next, the film thickness of the film formed on the perpendicular magnetization film was gradually changed from 5 to 55 [nm] to check the medium noise values at recording density 10 [KFRPI] for all the film types. The results of this check are shown in FIG. 85 to FIG. 89. As is clear from FIG. 85 to FIG. 89, when the value R (Hk/4pMs) is smaller than 1.4, medium noise cannot be improved (reduced) even if the film thickness is reduced. This is because if R is below 1.4, the perpendicular orientation characteristic is insufficient and it is impossible to sufficiently suppress generation of a reversed magnetic domain in the vicinity of the surface of the perpendicular magnetization film.

On the other hand, if the film satisfies the relationship that R is equal to or greater than 1.4, the medium noise is reduced up to the film thickness 50 [nm] for all the film types. As has been described above, if a film satisfies the relationship that R is equal to or greater than 1.4, it is possible to suppress generation of a reversed magnetic domain in the vicinity of the surface of the perpendicular magnetization film. However, even if the film satisfies the aforementioned relationship, the medium noise reduction cannot be seen when the film thickness exceeds 50 [nm]. This is because of the fact that if the film thickness is too great, the orientation perpendicular to the film surface is deteriorated and it is impossible to suppress generation of a reversed magnetic domain in the vicinity of the surface of the perpendicular magnetization film.

As has been described above, the recording medium FFFF3 of the present invention shows a preferable medium noise characteristic even in a low recording density region. That is, by using the FFFF3 of the present invention, it is possible to realize suppression of medium noise increase in the low recording region. Moreover, when the $Co_{76}Cr_{20}Pt_2PrSr$ film is provided under or both under and over the perpendicular magnetization film, similar results can be obtained because of the aforementioned reasons. Furthermore, film types other than the $Co_{76}Cr_{20}Pt_2TaLu$ film can also have similar results if the relationship that R is equal to or more than 1.4 is satisfied.

Moreover, in the experiment using the ID/MR composite head used in Example 1 instead of the mono-pole composite head, similar results were obtained because of the aforementioned reasons.

EXAMPLE 11

By using a 6-inch target of $Co_{78}Cr_{19}Ta_3$ (%) for sputtering, 100 [nm] $Co_{78}Cr_{19}Ta_3$ was formed on a substrate at temperature of 400 degrees centigrade. The film formation conditions were set as follows: initial vacuum degree $5 \times 10^{-7}$ [mTorr], electric power 0.5 [kW], argon gas pressure 4 [mTorr], and film formation speed 3 [nm/sed].

On this film, an $YCo_5$ film was formed by using an $YCo_5$ target, while gradually changing the film thickness from 5 to 55 [nm]. Furthermore, on this $YCo_5$ film, a C protection film was formed to have thickness of 10 [nm].

The medium having the $YCo_5$ of 50 [nm] will be referred to as A2 of the present invention. On the contrary, the conventional medium having only the $Co_{78}Cr_{19}Ta_3$ and no $YCo_5$ will be referred to as a conventional medium A1.

It should be noted that we also prepared a medium having the $YCo_5$ film and the $Co_{78}Cr_{19}Ta_3$ (at %) formed in the reversed order. That is, the $YCo_5$ film was first formed on the substrate and the $Co_{78}Cr_{19}Ta_3$ (at %) film was formed thereon.

The perpendicular magnetic anisotropic energy Ku of the $YCo_5$ film and the $Co_{78}Cr_{19}Ta_3$ (at %) film were measured using a torque magnetometer. The results are shown in FIG. 90 and FIG. 7. As shown in FIG. 90 and FIG. 7, the perpendicular magnetic anisotropic energy Ku of the $Co_{78}Cr_{19}Ta_3$ (at %) film is $9.0 \times 10^5$, whereas the perpendicular magnetic anisotropic energy Ku of the $YCo_5$ film is $5.0 \times 10^7$, i.e., by far greater than the $Co_{78}Cr_{19}Ta_3$ (at %) film.

An ID/MR composite head was used to check the recording/reproduction characteristics of the medium A2 of the present invention and the conventional medium A1. The recording/reproduction conditions and the head used were same as the Example 1.

Figure 91:
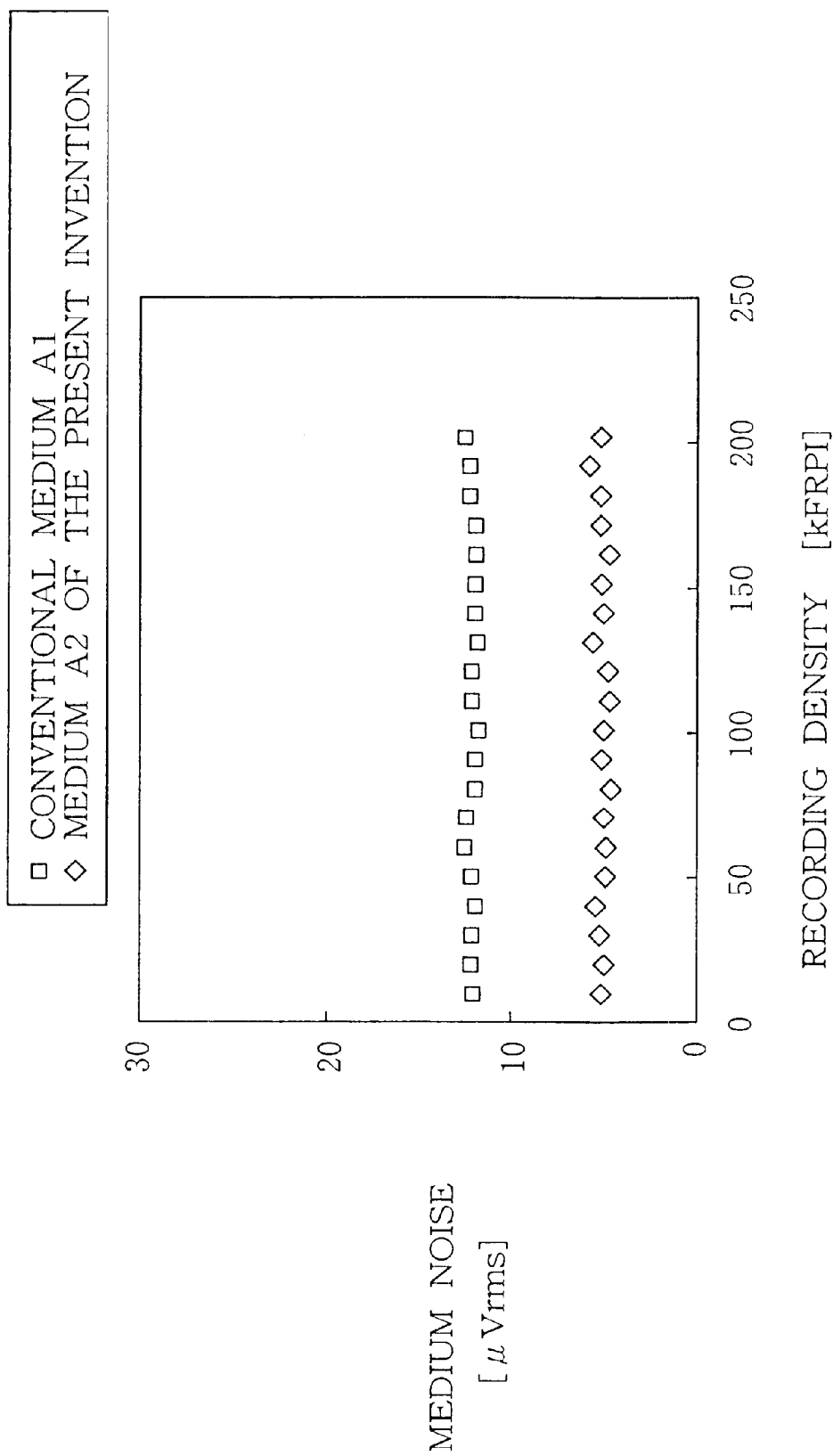
FIG. 91 is a graph showing the medium noise dependency on the recording density in Example 11 of the present invention.

FIG. 91 shows medium noise dependency on the recording density for the medium A2 of the present invention and the conventional medium A1. As is clear from this FIG. 91, the conventional medium A1 has a very high noise in a lower recording density, whereas the medium A2 of the present invention has a suppressed noise in this low recording density region. This is because the medium A2 of the present invention has the perpendicular magnetic anisotropic energy Ku much higher than the $Co_{78}Cr_{19}Ta_3$ (at %) and has the film having a preferable magnetic anisotropy on the perpendicular magnetization film of $Co_{78}Cr_{19}Ta_3$ (at %). Accordingly, it is possible to effectively suppress generation of a reversed magnetic domain which may be caused in the vicinity of the surface of the perpendicular magnetization film.

Next, the film thickness provided on the perpendicular magnetization film was gradually changed from 5 to 55 [nm] so as to check the medium noise values at the recording density 10 [kFRPI]. The check results are shown in FIG. 92. As is clear from FIG. 92, no output lowering can be seen up to the $YCo_5$ film thickness of 50 [nm], but when the film thickness exceeds 50 [nm], there is no improvement (reduction) of the medium noise. This is because, if the $YCo_5$ film thickness becomes too great, the $YCo_5$ film orientation in the perpendicular direction is deteriorated, reducing the perpendicular magnetic anisotropic energy Ku. Accordingly it becomes impossible to suppress generation of a reversed magnetic domain in the vicinity of the surface of the perpendicular magnetization film.

As has been described above, the medium A2 of the present invention has an excellent medium noise characteristic even in a low recording density region. That is, by using the medium A2 of the present invention, it is possible to suppress the medium noise increase in the low recording density region which has been the problem of the conventional perpendicular magnetic recording medium.

Moreover, similar results can be obtained when the $YCo_5$ film is provided under the perpendicular magnetization film or both under and over the perpendicular magnetization film.

EXAMPLE 12

Media of Example 12 were prepared in the same way as Example 11, except for that a $CeCo_5$ target was used instead of the $YCo_5$ target.

The medium having the $CeCo_5$ of 50 [nm] will be referred to as B2 of the present invention.

Note that we also prepared media having CeC5 film and the $Co_{78}Cr_{19}Ta_3$ film formed in the reversed order, i.e., was firstly formed on the substrate, and then the $Co_{78}Cr_{19}Ta_3$ film was formed thereon.

The perpendicular magnetic anisotropic energy Ku of the $CeCo_5$ film and the $Co_{78}Cr_{19}Ta_3$ (at %) film were measured using a torque magnetometer. The results are shown in FIG. 90 and FIG. 7. As shown in FIG. 90 and FIG. 7, the perpendicular magnetic anisotropic energy Ku of the $Co_{78}Cr_{19}Ta_3$ (at %) film is $9.0 \times 10^5$, whereas the perpendicular magnetic anisotropic energy Ku of the $CeCo_5$ film is $6.0 \times 10^7$ [erg/cc] i.e., by far greater than the $Co_{78}Cr_{19}Ta_3$ (at %) film.

An ID/MR composite head was used to check the recording/reproduction characteristics of the medium B2 of the present invention and the conventional medium A1. The recording/reproduction conditions and the head used were same as the Example 11.

Figure 93:
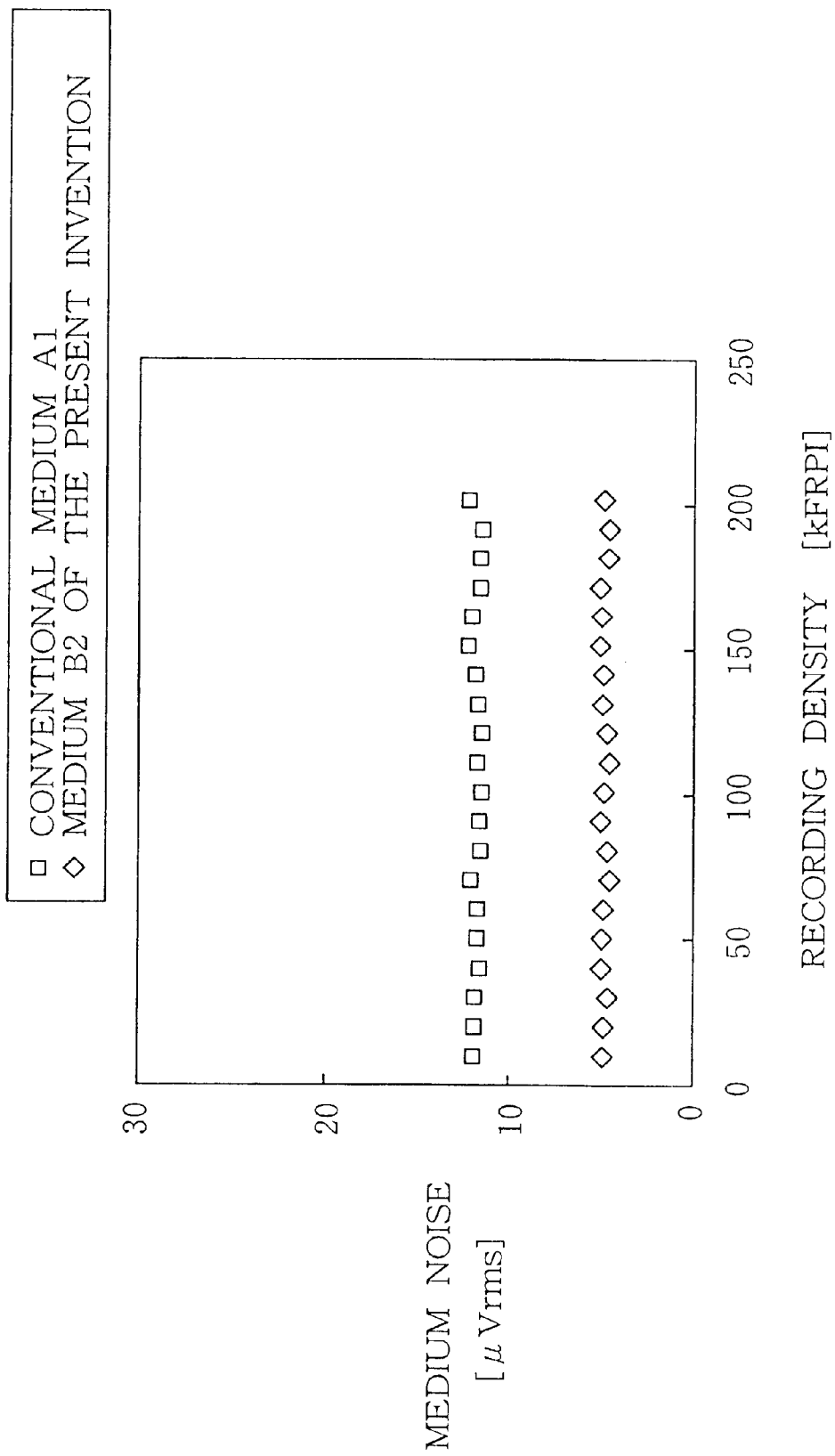
FIG. 93 is a graph showing the medium noise dependency on the recording density in Example 12 of the present invention.

FIG. 93 shows medium noise dependency on the recording density for the medium B2 of the present invention and the conventional medium A1. As is clear from this FIG. 93, the conventional medium A1 has a very high noise in a lower recording density, whereas the medium B2 of the present invention has a suppressed noise in this low recording density region. This is because the medium B2 of the present invention has the perpendicular magnetic anisotropic energy Ku much higher than the $Co_{78}Cr_{19}Ta_3$ (at %) and has the film having a preferable magnetic anisotropy on the perpendicular magnetization film of $Co_{78}Cr_{19}Ta_3$ (at %) Accordingly, it is possible to effectively suppress generation of a reversed magnetic domain which may be caused in the vicinity of the surface of the perpendicular magnetization film.

Next, the film thickness provided on the perpendicular magnetization film was gradually changed from 5 to 55 [nm] so as to check the medium noise values at the recording density 10 [kFRPI]. The check results are shown in FIG. 94. As is clear from FIG. 94, no output lowering can be seen up to the $CeCo_5$ film thickness of 50 [nm], but when the film thickness exceeds 50 [nm], there is no improvement (reduction) of the medium noise. This is because, if the $CeCo_5$ film thickness becomes too great, the $CeCo_5$ film orientation in the perpendicular direction is deteriorated, reducing the perpendicular magnetic anisotropic energy Ku. Accordingly it becomes impossible to suppress generation of a reversed magnetic domain in the vicinity of the surface of the perpendicular magnetization film.

As has been described above, the medium B2 of the present invention has an excellent medium noise characteristic even in a low recording density region. That is, by using the medium B2 of the present invention, it is possible to suppress the medium noise increase in the low recording density region which has been the problem of the conventional perpendicular magnetic recording medium.

Moreover, similar results can be obtained when the $CeCo_5$ film is provided under the perpendicular magnetization film or both under and over the perpendicular magnetization film.

EXAMPLE 13

Media of Example 13 were prepared in the same way as Example 11, except for that a $SmCo_5Ti$ target was used instead of the $YCo_5$ target.

The medium having the $SmCo_5Ti$ of 50 [nm] will be referred to as C2 of the present invention.

Note that we also prepared media having $SmCo_5Ti$ film and the $Co_{78}Cr_{19}Ta_3$ film formed in the reversed order, i.e., the $SmCo_5Ti$ film was formed firstly and then the $Co_{78}Cr_{19}Ta_3$ film was formed thereon.

The perpendicular magnetic anisotropic energy Ku of the $SmCo_5Ti$ film and the $Co_{78}Cr_{19}Ta_3$ (at %) film were measured using a torque magnetometer. The results are shown in FIG. 90 and FIG. 7. As shown in FIG. 90 and FIG. 7, the perpendicular magnetic anisotropic energy Ku of the $Co_{78}Cr_{19}Ta_3$ (at %) film is $9.0 \times 10^5$, whereas the perpendicular magnetic anisotropic energy Ku of the $SmCo_5Ti$ film is $1.0 \times 10^8$ [erg/cc] i.e., which is by far greater than the $Co_{78}Cr_{19}Ta_3$ (at %) film.

An ID/MR composite head was used to check the recording/reproduction characteristics of the medium C2 of the present invention and the conventional medium A1. The recording/reproduction conditions and the head used were same as the Example 11.

Figure 95:
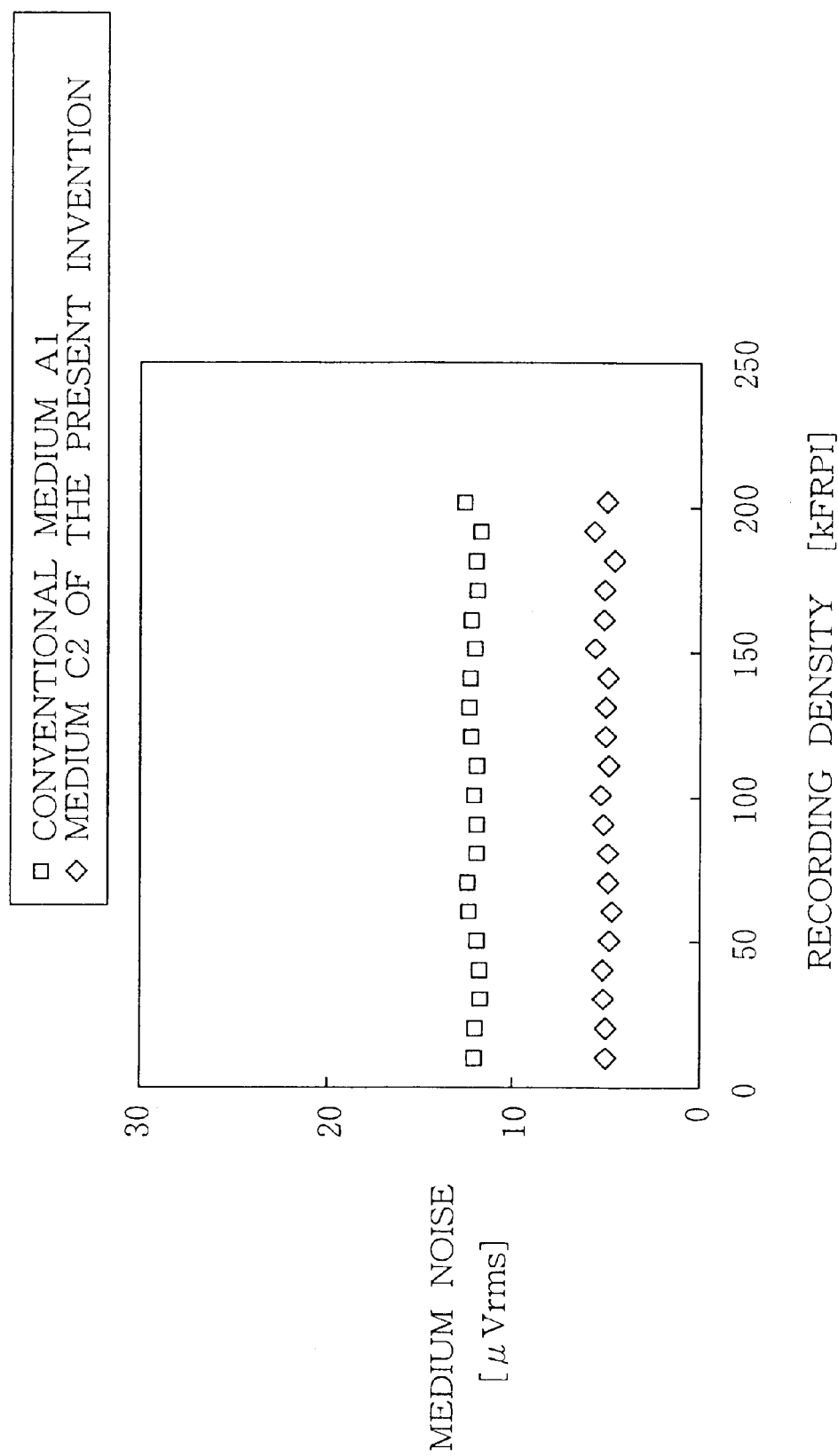
FIG. 95 is a graph showing the medium noise dependency on the recording density in Example 13 of the present invention.

FIG. 95 shows medium noise dependency on the recording density for the medium C2 of the present invention and the conventional medium A1. As is clear from this FIG. 95, the conventional medium A1 has a very high noise in a lower recording density region, whereas the medium C2 of the present invention has a suppressed noise in this low recording density region. This is because the medium C2 of the present invention has the perpendicular magnetic anisotropic energy Ku much higher than the $Co_{78}Cr_{19}Ta_3$ (at %) and has the film having a preferable magnetic anisotropy on the perpendicular magnetization film of $Co_{78}Cr_{19}Ta_3$ (at %). Accordingly, it is possible to effectively suppress generation of a reversed magnetic domain which may be caused in the vicinity of the surface of the perpendicular magnetization film.

Next, the film thickness provided on the perpendicular magnetization film was gradually changed from 5 to 55 [nm] so as to check the medium noise values at the recording density 10 [kFRPI]. The check results are shown in FIG. 96. As is clear from FIG. 96, no output lowering can be seen up to the $SmCo_5Ti$ film thickness of 50 [nm], but when the film thickness exceeds 50 [nm], there is no improvement (reduction) of the medium noise. This is because, if the $SmCo_5Ti$ film thickness becomes too great, the $SmCo_5Ti$ film orientation in the perpendicular direction is deteriorated, reducing the perpendicular magnetic anisotropic energy Ku. Accordingly it becomes impossible to suppress generation of a reversed magnetic domain in the vicinity of the surface of the perpendicular magnetization film.

As has been described above, the medium C2 of the present invention has an excellent medium noise characteristic even in a low recording density region. That is, by using the medium C2 of the present invention, it is possible to suppress the medium noise increase in the low recording density region which has been the problem of the conventional perpendicular magnetic recording medium.

Moreover, similar results can be obtained when the $SmCo_5$ film is provided under the perpendicular magnetization film or both under and over the perpendicular magnetization film.

EXAMPLE 14

Media of Example 14 were prepared in the same way as Example 11, except for that a $LaCo_5$ target was used instead of the $YCo_5$ target.

The medium having the $LaCo_5$ of 50 [nm] will be referred to as D2 of the present invention.

Note that we also prepared media having $LaCo_5$ film and the $Co_{78}Cr_{19}Ta_3$ film formed in the reversed order, i.e., the $LaCo_5$ film was formed firstly and then the $Co_{78}Cr_{19}Ta_3$ film was formed thereon.

The perpendicular magnetic anisotropic energy Ku of the $LaCo_5$ film and the $Co_{78}Cr_{19}Ta_3$ (at %) film were measured using a torque magnetometer. The results are shown in FIG. 90 and FIG. 7. As shown in FIG. 90 and FIG. 7, the perpendicular magnetic anisotropic energy Ku of the $Co_{78}Cr_{19}Ta_3$ (at %) film is $9.0 \times 10^5$ [erg/cc] whereas the perpendicular magnetic anisotropic energy Ku of the $LaCo_5$ film is $6.0 \times 10^7$ [erg/cc] i.e., which is by far greater than the $Co_{78}Cr_{19}Ta_3$ (at %) film.

An ID/MR composite head was used to check the recording/reproduction characteristics of the medium D2 of the present invention and the conventional medium A1. The recording/reproduction conditions and the head used were same as the Example 11.

Figure 97:
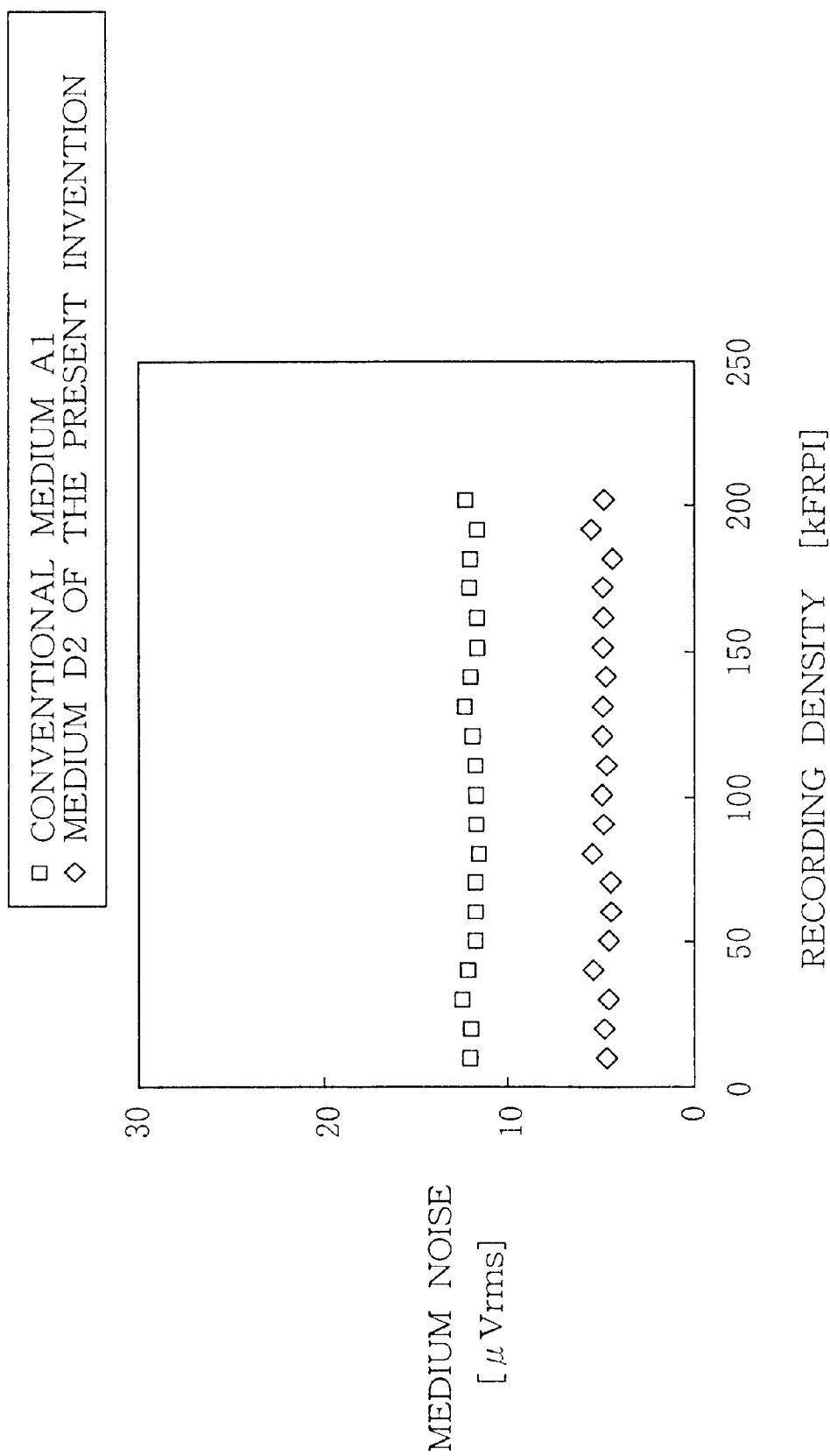
FIG. 97 is a graph showing the medium noise dependency on the recording density in Example 14 of the present invention.

FIG. 97 shows medium noise dependency on the recording density for the medium D2 of the present invention and the conventional medium A1. As is clear from this FIG. 97, the conventional medium A1 has a very high noise in a lower recording density region, whereas the medium D2 of the present invention has a suppressed noise in this low recording density region. This is because the medium D2 of the present invention has the perpendicular magnetic anisotropic energy Ku much higher than the $Co_{78}Cr_{19}Ta_3$ (at %) and has the film having a preferable magnetic anisotropy on the perpendicular magnetization film of $Co_{78}Cr_{19}Ta_3$ (at %). Accordingly, it is possible to effectively suppress generation of a reversed magnetic domain which may be caused in the vicinity of the surface of the perpendicular magnetization film.

Next, the film thickness provided on the perpendicular magnetization film was gradually changed from 5 to 55 [nm] so as to check the medium noise values at the recording density 10 [kFRPI]. The check results are shown in FIG. 98. As is clear from FIG. 98, no output lowering can be seen up to the $LaCo_5$ film thickness of 50 [nm], but when the film thickness exceeds 50 [nm], there is no improvement (reduction) of the medium noise. This is because, if the $LaCo_5$ film thickness becomes too great, the $LaCo_5$ film orientation in the perpendicular direction is deteriorated, reducing the perpendicular magnetic anisotropic energy Ku. Accordingly it becomes impossible to suppress generation of a reversed magnetic domain in the vicinity of the surface of the perpendicular magnetization film.

As has been described above, the medium D2 of the present invention has an excellent medium noise characteristic even in a low recording density region. That is, by using the medium D2 of the present invention, it is possible to suppress the medium noise increase in the low recording density region which has been the problem of the conventional perpendicular magnetic recording medium.

Moreover, similar results can be obtained when the $LaCo_5$ film is provided under the perpendicular magnetization film or both under and over the perpendicular magnetization film.

EXAMPLE 15

Media of Example 15 were prepared in the same way as Example 11, except for that a $PrCo_5$ target was used instead of the $YCo_5$ target.

The medium having the $PrCo_5$ of 50 [nm] will be referred to as E2 of the present invention.

Note that we also prepared media having $PrCo_5$ film and the $Co_{78}Cr_{19}Ta_3$ (at %) film formed in the reversed order, i.e., the $PrCo_5$ film was formed firstly and then the $Co_{78}Cr_{19}Ta_3$ film was formed thereon.

The perpendicular magnetic anisotropic energy Ku of the $PrCo_5$ film and the $Co_{78}Cr_{19}Ta_3$ (at %) film were measured using a torque magnetometer. The results are shown in FIG.

90 and FIG. 7. As shown in FIG. 90 and FIG. 7, the perpendicular magnetic anisotropic energy Ku of the $CO_{78}Cr_{19}Ta_3$ (at %) film is $9.0 \times 10^5$ [erg/cc] whereas the perpendicular magnetic anisotropic energy Ku of the $PrCo_5$ film is $8.0 \times 10^7$ [erg/cc] i.e., which is by far greater than the $Co_{78}Cr_{19}Ta_3$ (at %) film.

An ID/MR composite head was used to check the recording/reproduction characteristics of the medium E2 of the present invention and the conventional medium A1. The recording/reproduction conditions and the head used were identical to those of the Example 11.

Figure 99:
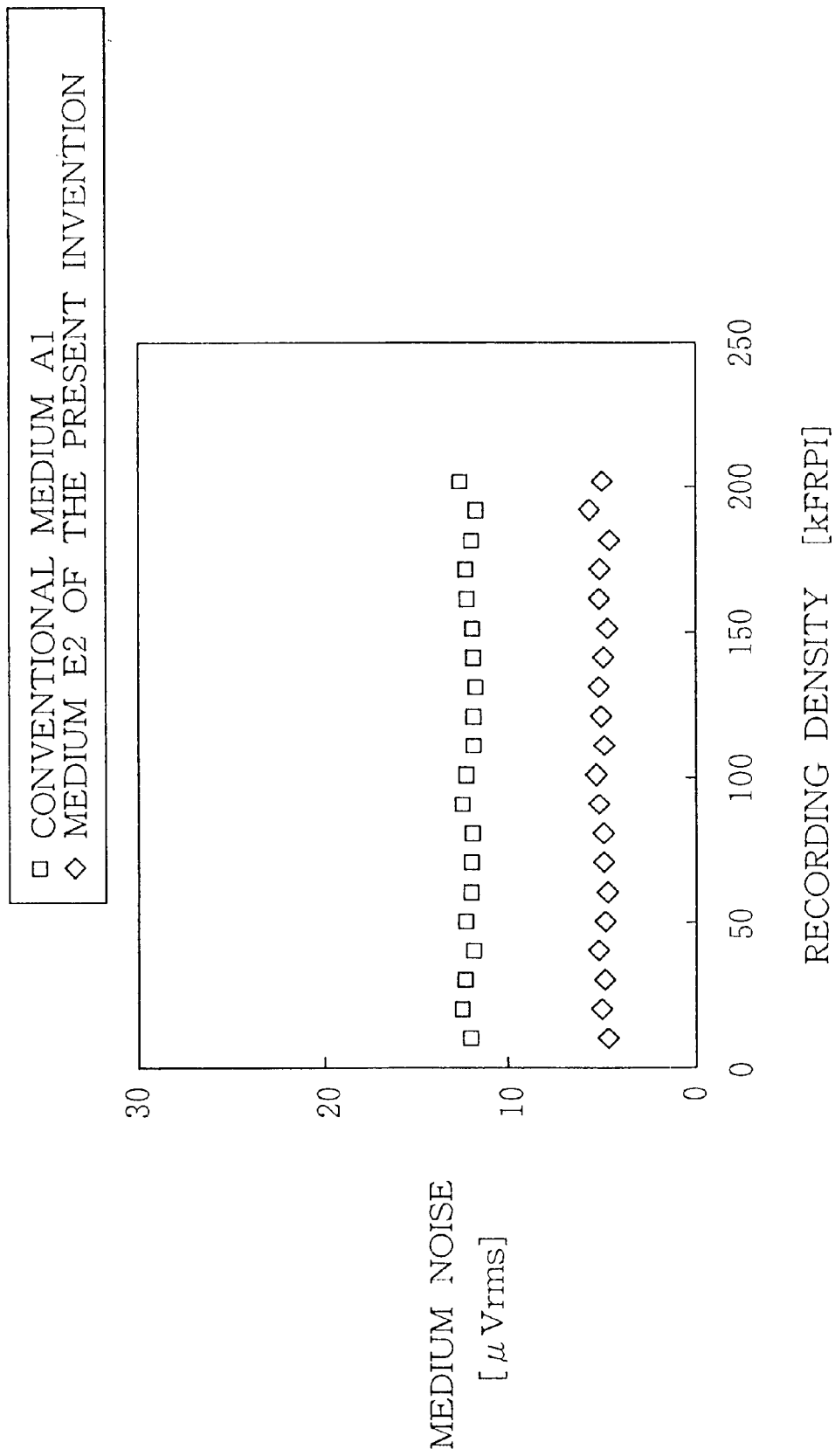
FIG. 99 is a graph showing the medium noise dependency on the recording density in Example 15 of the present invention.

FIG. 99 shows medium noise dependency on the recording density for the medium E2 of the present invention and the conventional medium A1. As is clear from this FIG. 99, the conventional medium A1 has a very high noise in a lower recording density region, whereas the medium E2 of the present invention has a suppressed noise in this low recording density region. This is because the medium E2 of the present invention has the perpendicular magnetic anisotropic energy Ku much higher than the $Co_{78}Cr_{19}Ta_3$ (at %) and has the film having a preferable magnetic anisotropy on the perpendicular magnetization film of $Co_{78}Cr_{19}Ta_3$ (at %). Accordingly, it is possible to effectively suppress generation of a reversed magnetic domain which may be caused in the vicinity of the surface of the perpendicular magnetization film.

Next, the film thickness provided on the perpendicular magnetization film was gradually changed from 5 to 55 [nm] so as to check the medium noise values at the recording density 10 [kFRPI]. The check results are shown in FIG. 100. As is clear from FIG. 100, no output lowering can be seen up to 50 [nm] thickness of the $PrCo_5$, but when the film thickness exceeds 50 [nm] there is no improvement (reduction) of the medium noise. This is because, if the $PrCo_5$ film thickness becomes too great, the $PrCo_5$ film orientation in the perpendicular direction is deteriorated, reducing the perpendicular magnetic anisotropic energy Ku. Accordingly it becomes impossible to suppress generation of a reversed magnetic domain in the vicinity of the surface of the perpendicular magnetization film.

As has been described above, the medium E2 of the present invention has an excellent medium noise characteristic even in a low recording density region. That is, by using the medium E2 of the present invention, it is possible to suppress the medium noise increase in the low recording density region which has been the problem of the conventional perpendicular magnetic recording medium.

Moreover, similar results can be obtained when the $PrCo_5$ film is provided under the perpendicular magnetization film or both under and over the perpendicular magnetization film.

EXAMPLE 16

Media of Example 16 were prepared in the same way as Example 11, except for that a $Y_2Co_{17}$ target was used instead of the $YCo_5$ target.

The medium having the $Y_2Co_{17}$ of 50 [nm] thickness will be referred to as F2 of the present invention.

Note that we also prepared media having $Y_2Co_{17}$ film and the $Co_{78}Cr_{19}Ta_3$ (at %) film formed in the reversed order, i.e., the $Y_2Co_{17}$ film was formed firstly and then the $Co_{78}Cr_{19}Ta_3$ film was formed thereon.

The perpendicular magnetic anisotropic energy Ku of the $Y_2Co_{17}$ film and the $Co_{78}Cr_{19}Ta_3$ (at %) film were measured using a torque magnetometer. The results are shown in FIG. 90 and FIG. 7. As shown in FIG. 90 and FIG. 7, the perpendicular magnetic anisotropic energy Ku of the $Co_{78}Cr_{19}Ta_3$ (at %) film is $9.0 \times 10^5$ [erg/cc] whereas the perpendicular magnetic anisotropic energy Ku of the $Y_2Co_{17}$ film is $2.0 \times 10^7$ [erg/cc] i.e., which is by far greater than the $Co_{78}Cr_{19}Ta_3$ (at %) film.

An ID/MR composite head was used to check the recording/reproduction characteristics of the medium F2 of the present invention and the conventional medium A1. The recording/reproduction conditions and the head used were identical to those of the Example 11.

Figure 101:
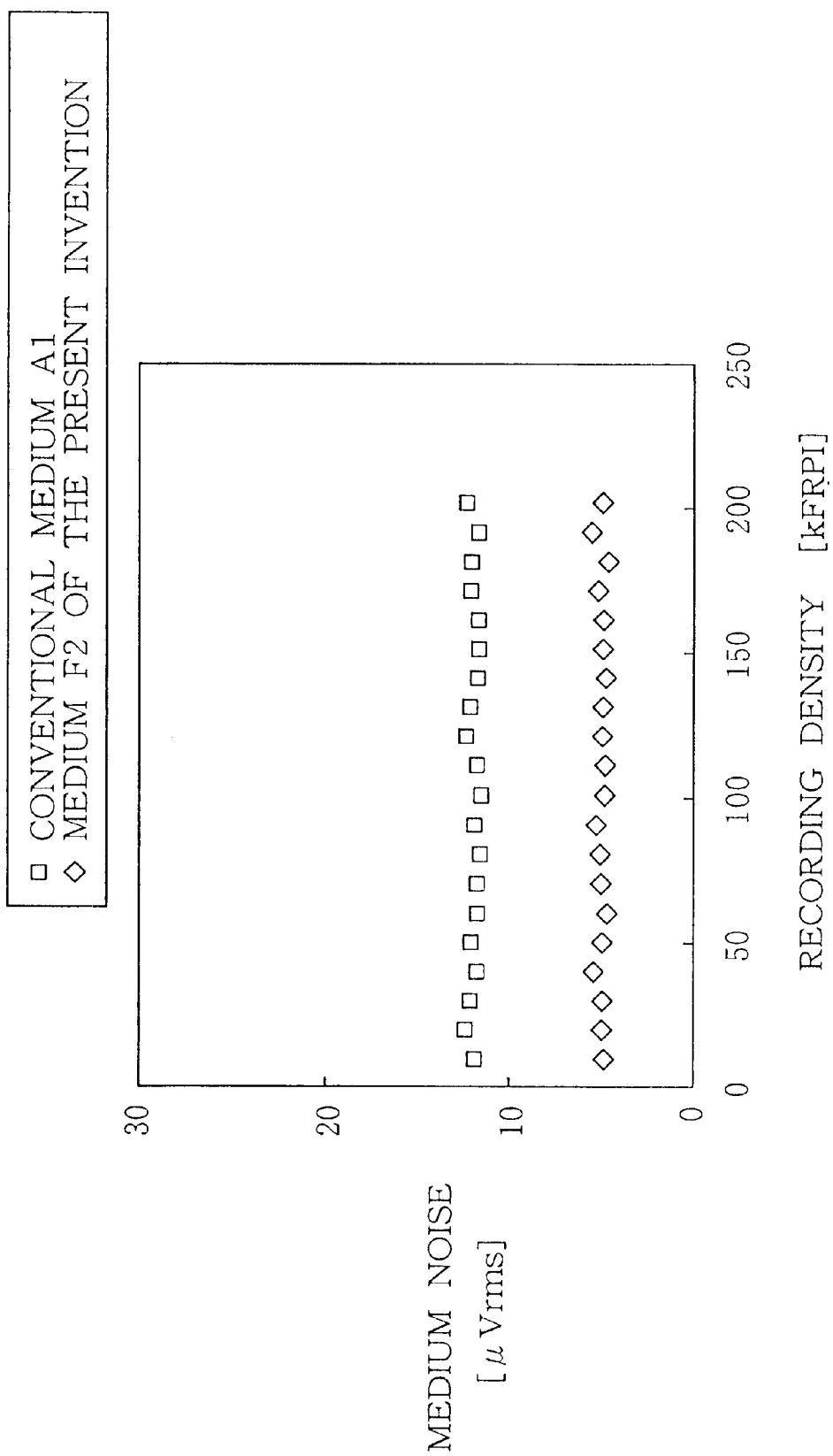
FIG. 101 is a graph showing the medium noise dependency on the recording density in Example 16 of the present invention.

FIG. 101 shows medium noise dependency on the recording density for the medium F2 of the present invention and the conventional medium A1. As is clear from this FIG. 101, the conventional medium A1 has a very high noise in a lower recording density region, whereas the medium F2 of the present invention has a suppressed noise in this low recording density region. This is because the medium F2 of the present invention has the perpendicular magnetic anisotropic energy Ku much higher than the $Co_{78}Cr_{19}Ta_3$ (at %) and has the film having a preferable magnetic anisotropy on the perpendicular magnetization film of $Co_{78}Cr_{19}Ta_3$ (at %). Accordingly, it is possible to effectively suppress generation of a reversed magnetic domain which may be caused in the vicinity of the surface of the perpendicular magnetization film.

Next, the film thickness provided on the perpendicular magnetization film was gradually changed from 5 to 55 [nm] so as to check the medium noise values at the recording density 10 [kFRPI]. The check results are shown in FIG. 102. As is clear from FIG. 102, no output lowering can be seen up to 50 [nm] thickness of the $Y_2Co_{17}$, but when the film thickness exceeds 50 [nm], there is no improvement (reduction) of the medium noise. This is because, if the $Y_2Co_{17}$ film thickness becomes too great, the $Y_2Co_{17}$ film orientation in the perpendicular direction is deteriorated, reducing the perpendicular magnetic anisotropic energy Ku. Accordingly it becomes impossible to suppress generation of a reversed magnetic domain in the vicinity of the surface of the perpendicular magnetization film.

As has been described above, the medium F2 of the present invention has an excellent medium noise characteristic even in a low recording density region. That is, by using the medium F2 of the present invention, it is possible to suppress the medium noise increase in the low recording density region which has been the problem of the conventional perpendicular magnetic recording medium.

Moreover, similar results can be obtained when the $Y_2Co_{17}$ film is provided under the perpendicular magnetization film or both under and over the perpendicular magnetization film.

EXAMPLE 17

Media of Example 17 were prepared in the same way as Example 16, except for that a $Ce_2Co_{17}$ target was used instead of the $Y_2Co_{17}$ target.

The medium having the $Ce_2Co_{17}$ of 50 [nm] thickness will be referred to as G2 of the present invention.

Note that we also prepared media having $Y_2Co_{17}$ film and the $Co_{78}Cr_{19}Ta_3$ (at %) film formed in the reversed order, i.e., the $Y_2Co_{17}$ film was formed firstly and then the $Co_{78}Cr_{19}Ta_3$ (at %) film was formed thereon.

The perpendicular magnetic anisotropic energy Ku of the $Ce_2Co_{17}$ film and the $Co_{78}Cr_{19}Ta_3$ (at %) film were measured using a torque magnetometer. The results are shown in FIG. 90 and FIG. 7. As shown in FIG. 90 and FIG. 7, the perpendicular magnetic anisotropic energy Ku of the $Co_{78}Cr_{19}Ta_3$ (at %) film is $9.0\times10^5$ [erg/cc] whereas the perpendicular magnetic anisotropic energy Ku of the $Ce_2Co_{17}$ film is $3.0\times10^7$ [erg/cc] i.e., which is by far greater than the $Co_{78}Cr_{19}Ta_3$ (at %) film.

An ID/MR composite head was used to check the recording/reproduction characteristics of the medium G2 of the present invention and the conventional medium A1. The recording/reproduction conditions and the head used were identical to those of the Example 11.

Figure 103:
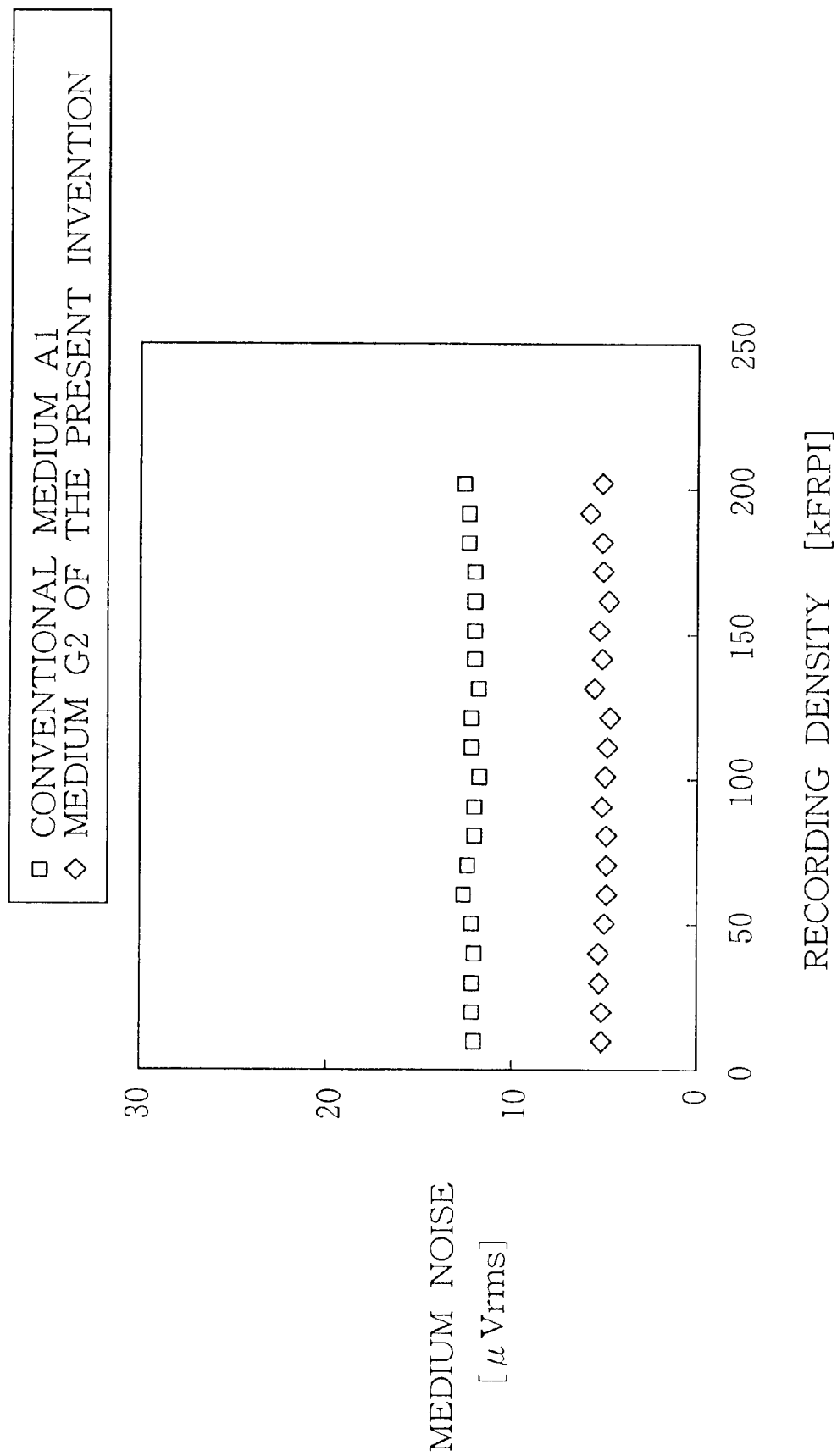
FIG. 103 is a graph showing the medium noise dependency on the recording density in Example 17 of the present invention.

FIG. 103 shows medium noise dependency on the recording density for the medium G2 of the present invention and the conventional medium A1. As is clear from this FIG. 103, the conventional medium A1 has a very high noise in a lower recording density region, whereas the medium G2 of the present invention has a suppressed noise in this low recording density region. This is because the medium G2 of the present invention has the perpendicular magnetic anisotropic energy Ku much higher than the $Co_{78}Cr_{19}Ta_3$ (at %) and has the film having a preferable magnetic anisotropy on the perpendicular magnetization film of $Co_{78}Cr_{19}Ta_3$ (at %). Accordingly, it is possible to effectively suppress generation of a reversed magnetic domain which may be caused in the vicinity of the surface of the perpendicular magnetization film.

Next, the film thickness provided on the perpendicular magnetization film was gradually changed from 5 to 55 [nm] so as to check the medium noise values at the recording density 10 [kFRPI]. The check results are shown in FIG. 104. As is clear from FIG. 104, no output lowering can be seen up to 50 [nm] thickness of the $Ce_2Co_{17}$, but when the film thickness exceeds 50 [nm] there is no improvement (reduction) of the medium noise. This is because, if the $Ce_2Co_{17}$ film thickness becomes too great, the $Ce_2Co_{17}$ film orientation in the perpendicular direction is deteriorated, reducing the perpendicular magnetic anisotropic energy Ku. Accordingly it becomes impossible to suppress generation of a reversed magnetic domain in the vicinity of the surface of the perpendicular magnetization film.

As has been described above, the medium G2 of the present invention has an excellent medium noise characteristic even in a low recording density region. That is, by using the medium G2 of the present invention, it is possible to suppress the medium noise increase in the low recording density region which has been the problem of the conventional perpendicular magnetic recording medium.

Moreover, similar results can be obtained when the $Ce_2Co_{17}$ film is provided under the perpendicular magnetization film or both under and over the perpendicular magnetization film.

EXAMPLE 18

Media of Example 18 were prepared in the same way as Example 16, except for that a $Sm_2Co_{17}Ti$ target was used instead of the $Y_2Co_{17}$ target.

The medium having the $Sm_2Co_{17}Ti$ of 50 [nm] thickness will be referred to as H2 of the present invention.

Note that we also prepared media having $Sm_2Co_{17}Ti$ film and the $Co_{78}Cr_{19}Ta_3$ (at %) film formed in the reversed order, i.e., the $Sm_2Co_{17}Ti$ film was formed firstly and then the $Co_{78}Cr_{19}Ta_3$ (at %) film was formed thereon.

The perpendicular magnetic anisotropic energy Ku of the $Sm_2Co_{17}Ti$ film and the $Co_{78}Cr_{19}Ta_3$ (at %) film were measured using a torque magnetometer. The results are shown in FIG. 90 and FIG. 7. As shown in FIG. 90 and FIG. 7, the perpendicular magnetic anisotropic energy Ku of the $Co_{78}Cr_{19}Ta_3$ (at %) film is $9.0\times10^5$ [erg/cc] whereas the perpendicular magnetic anisotropic energy Ku of the $Sm_2Co_{17}Ti$ film is $4.2\times10^7$ [erg/cc] i.e., which is by far greater than the $Co_{78}Cr_{19}Ta_3$ (at %) film.

An ID/MR composite head was used to check the recording/reproduction characteristics of the medium H2 of the present invention and the conventional medium A1. The recording/reproduction conditions and the head used were identical to those of the Example 11.

Figure 105:
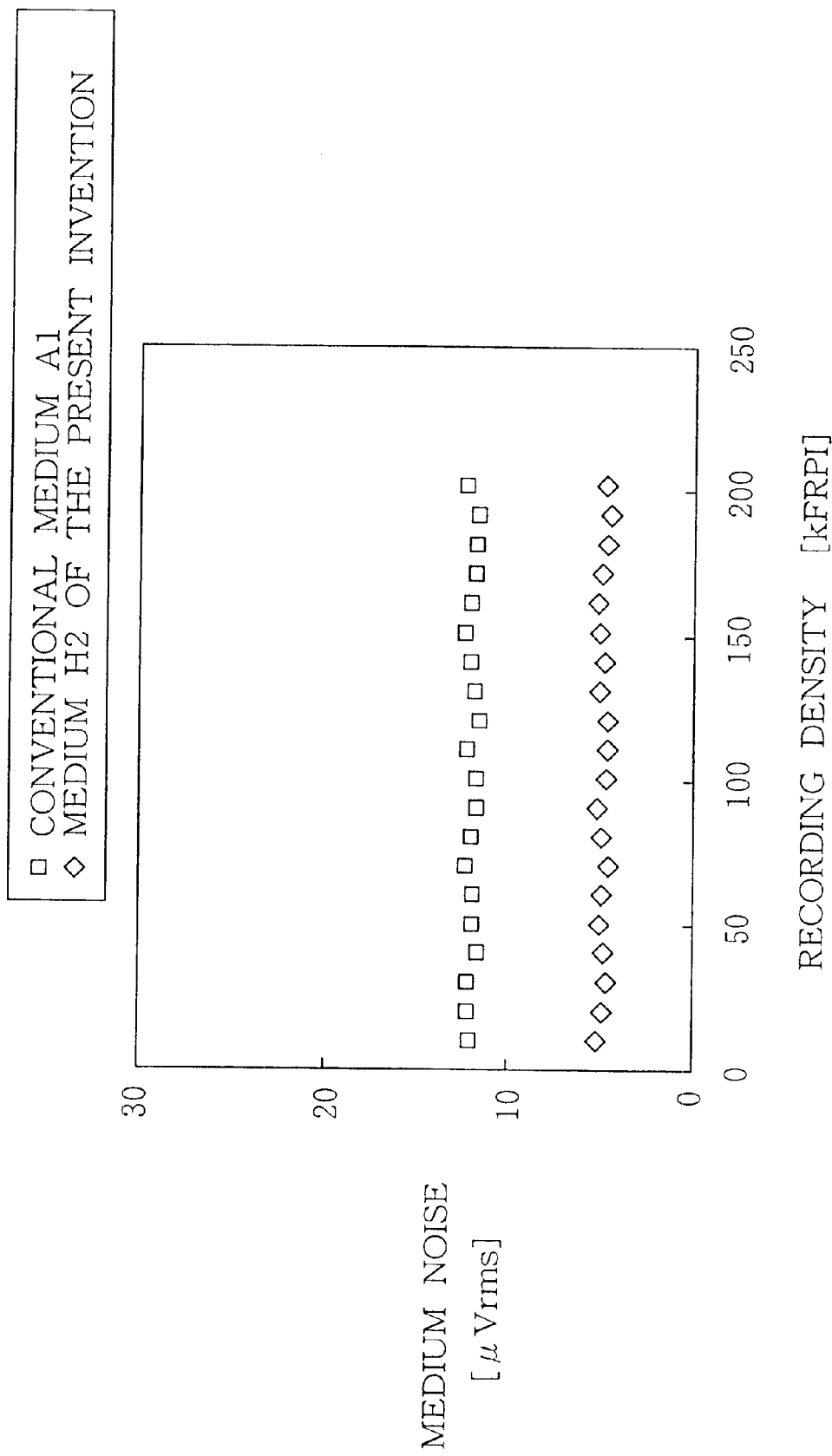
FIG. 105 is a graph showing the medium noise dependency on the recording density in Example 18 of the present invention.

FIG. 105 shows medium noise dependency on the recording density for the medium H2 of the present invention and the conventional medium A1. As is clear from this FIG. 105, the conventional medium A1 has a very high noise in a lower recording density region, whereas the medium H2 of the present invention has a suppressed noise in this low recording density region. This is because the medium H2 of the present invention has the perpendicular magnetic anisotropic energy Ku much higher than the $Co_{78}Cr_{19}Ta_3$ (at %) and has the film having a preferable magnetic anisotropy on the perpendicular magnetization film of $Co_{78}Cr_{19}Ta_3$ (at %). Accordingly, it is possible to effectively suppress generation of a reversed magnetic domain which may be caused in the vicinity of the surface of the perpendicular magnetization film.

Next, the film thickness provided on the perpendicular magnetization film was gradually changed from 5 to 55 [nm] so as to check the medium noise values at the recording density 10 [kFRPI]. The check results are shown in FIG. 106. As is clear from FIG. 106, no output lowering can be seen up to 50 [nm] thickness of the $Sm_2Co_{17}Ti$, but when the film thickness exceeds 50 [nm], there is no improvement (reduction) of the medium noise. This is because, if the $Sm_2Co_{17}Ti$ film thickness becomes too great, the $Sm_2Co_{17}Ti$ film orientation in the perpendicular direction is deteriorated, reducing the perpendicular magnetic anisotropic energy Ku. Accordingly it becomes impossible to suppress generation of a reversed magnetic domain in the vicinity of the surface of the perpendicular magnetization film.

As has been described above, the medium H2 of the present invention has an excellent medium noise characteristic even in a low recording density region. That is, by using the medium H2 of the present invention, it is possible to suppress the medium noise increase in the low recording density region which has been the problem of the conventional perpendicular magnetic recording medium.

Moreover, similar results can be obtained when the $Sm_2Co_{17}Ti$ film is provided under the perpendicular magnetization film or both under and over the perpendicular magnetization film.

EXAMPLE 19

Media of Example 19 were prepared in the same way as Example 16, except for that a $La_2Co_{17}$ target was used instead of the $Y_2Co_{17}$ target.

The medium having the $La_2Co_{17}$ of 50 [nm] thickness will be referred to as J2 of the present invention.

Note that we also prepared media having $La_2Co_{17}$ film and the $Co_{78}Cr_{19}Ta_3$ (at %) film formed in the reversed order, i.e., the $La_2Co_{17}$ film was formed firstly on the substrate and then the $Co_{78}Cr_{19}Ta_3$ (at %) film was formed thereon.

The perpendicular magnetic anisotropic energy Ku of the $La_2Co_{17}$ film and the $Co_{78}Cr_{19}Ta_3$ (at %) film were measured using a torque magnetometer. The results are shown in FIG. 90 and FIG. 7. As shown in FIG. 90 and FIG. 7, the perpendicular magnetic anisotropic energy Ku of the $Co_{78}Cr_{19}Ta_3$ (at %) film is $9.0\times10^5$ [erg/cc] whereas the perpendicular magnetic anisotropic energy Ku of the $La_2Co_{17}$ film is $3.5\times10^7$ [erg/cc] i.e., which is by far greater than the $Co_{78}Cr_{19}Ta_3$ (at %) film.

An ID/MR composite head was used to check the recording/reproduction characteristics of the medium J2 of the present invention and the conventional medium A1. The recording/reproduction conditions and the head used were identical to those of the Example 11.

Figure 107:
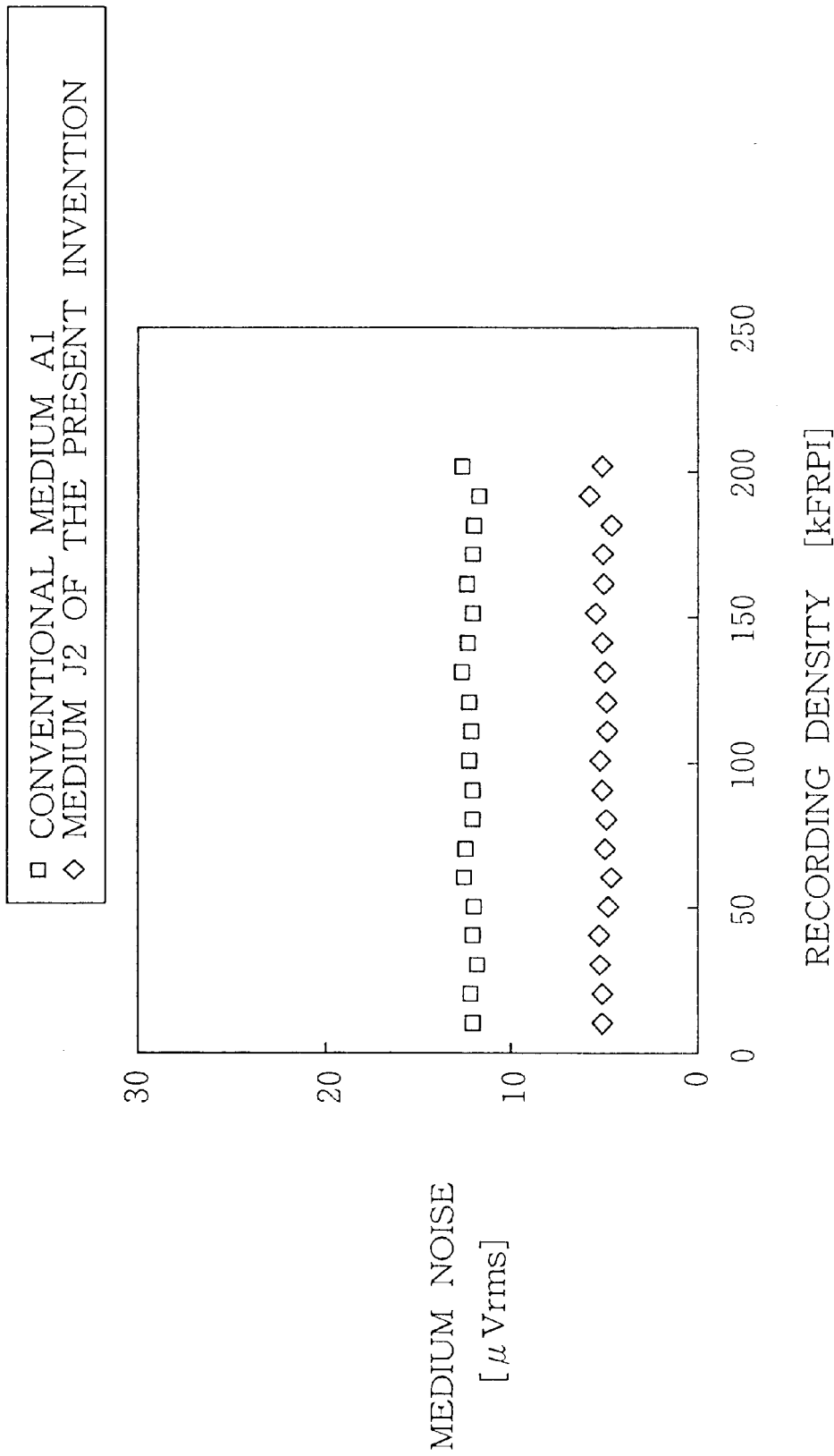
FIG. 107 is a graph showing the medium noise dependency on the recording density in Example 19 of the present invention.

FIG. 107 shows medium noise dependency on the recording density for the medium J2 of the present invention and the conventional medium A1. As is clear from this FIG. 107, the conventional medium A1 has a very high noise in a lower recording density region, whereas the medium J2 of the present invention has a suppressed noise in this low recording density region. This is because the medium J2 of the present invention has the perpendicular magnetic anisotropic energy Ku much higher than the $Co_{78}Cr_{19}Ta_3$ (at %) and has the film having a preferable magnetic anisotropy on the perpendicular magnetization film of $Co_{78}Cr_{19}Ta_3$ (at %). Accordingly, it is possible to effectively suppress generation of a reversed magnetic domain which may be caused in the vicinity of the surface of the perpendicular magnetization film.

Next, the film thickness provided on the perpendicular magnetization film was gradually changed from 5 to 55 [nm] so as to check the medium noise values at the recording density 10 [kFRPI]. The check results are shown in FIG. 108. As is clear from FIG. 108, no output lowering can be seen up to 50 [nm] thickness of the $La_2Co_{17}$, but when the film thickness exceeds 50 [nm] there is no improvement (reduction) of the medium noise. This is because, if the $La_2Co_{17}$ film thickness becomes too great, the $La_2Co_{17}$ film orientation in the perpendicular direction is deteriorated, reducing the perpendicular magnetic anisotropic energy Ku. Accordingly it becomes impossible to suppress generation of a reversed magnetic domain in the vicinity of the surface of the perpendicular magnetization film.

As has been described above, the medium J2 of the present invention has an excellent medium noise characteristic even in a low recording density region. That is, by using the medium J2 of the present invention, it is possible to suppress the medium noise increase in the low recording density region which has been the problem of the conventional perpendicular magnetic recording medium.

Moreover, similar results can be obtained when the $La_2Co_{17}$ film is provided under the perpendicular magnetization film or both under and over the perpendicular magnetization film.

EXAMPLE 20

Media of Example 20 were prepared in the same way as Example 16, except for that a $Pr_2Co_{17}$ target was used instead of the $Y_2Co_{17}$ target.

The medium having the $Pr_2Co_{17}$ of 50 [nm] thickness will be referred to as K2 of the present invention.

Note that we also prepared media having $Pr_2Co_{17}$ film and the $Co_{78}Cr_{19}Ta_3$ (at %) film formed in the reversed order, i.e., the $Pr_2Co_{17}$ film was formed firstly on the substrate and then the $Co_{78}Cr_{19}Ta_3$ (at %) film was formed thereon.

The perpendicular magnetic anisotropic energy Ku of the $La_2Co_{17}$ film and the $Co_{78}Cr_{19}Ta_3$ (at %) film were measured using a torque magnetometer. The results are shown in FIG. 90 and FIG. 7. As shown in FIG. 90 and FIG. 7, the perpendicular magnetic anisotropic energy Ku of the $Co_{78}Cr_{19}Ta_3$ (at %) film is $9.0\times10^5$ [erg/cc] whereas the perpendicular magnetic anisotropic energy Ku of the $Pr_2Co_{17}$ film is $2.7\times10^7$ [erg/cc] i.e., which is by far greater than the $Co_{78}Cr_{19}Ta_3$ (at %) film.

An ID/MR composite head was used to check the recording/reproduction characteristics of the medium K2 of the present invention and the conventional medium A1. The recording/reproduction conditions and the head used were identical to those of the Example 11.

Figure 109:
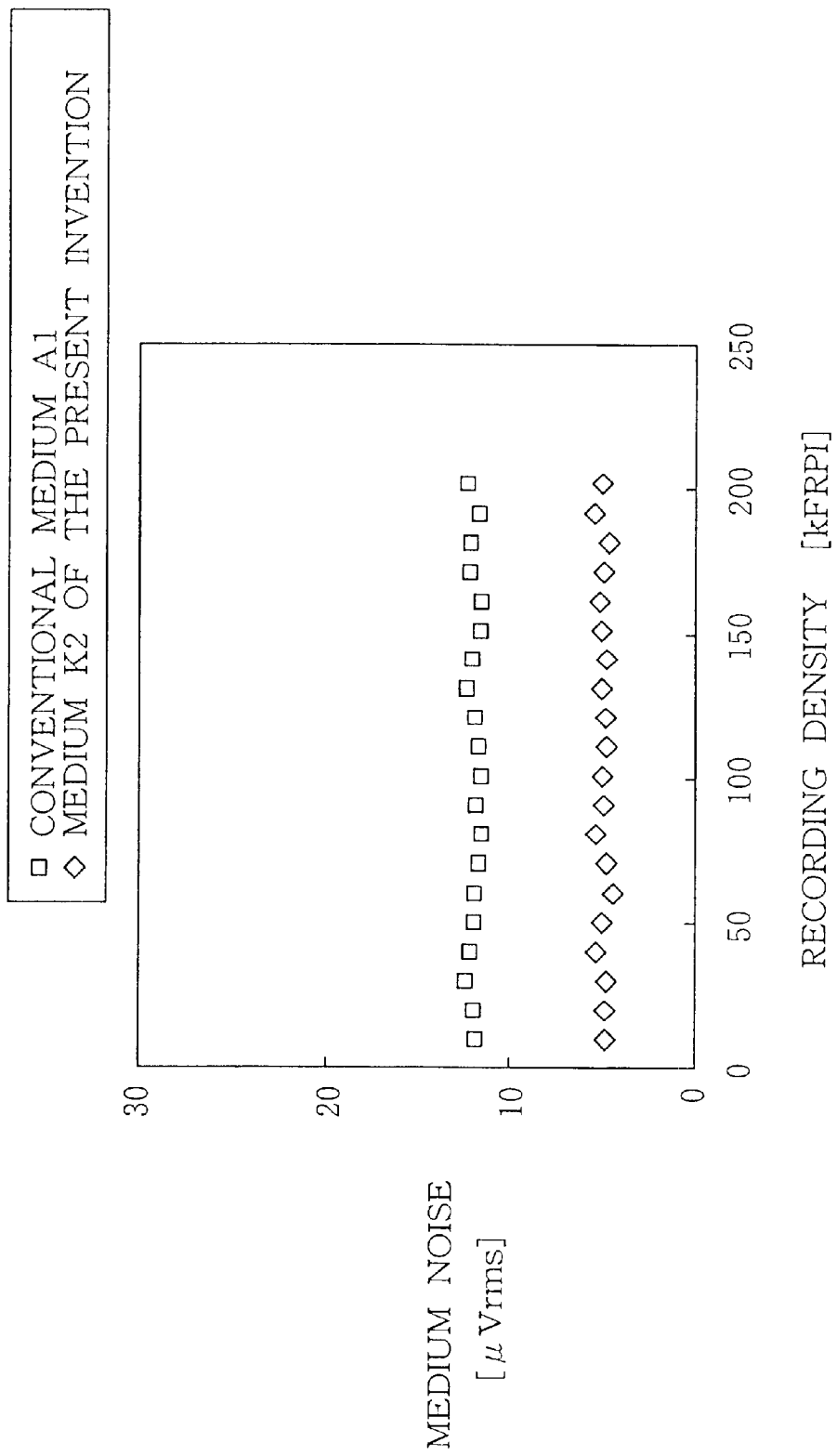
FIG. 109 is a graph showing the medium noise dependency on the recording density in Example 20 of the present invention.

FIG. 109 shows medium noise dependency on the recording density for the medium K2 of the present invention and the conventional medium A1. As is clear from this FIG. 109, the conventional medium A1 has a very high noise in a lower recording density region, whereas the medium K2 of the present invention has a suppressed noise in this low recording density region. This is because the medium K2 of the present invention has the perpendicular magnetic anisotropic energy Ku much higher than the $Co_{78}Cr_{19}Ta_3$ (at %) and has the film having a preferable magnetic anisotropy on the perpendicular magnetization film of $Co_{78}Cr_{19}Ta_3$ (at %). Accordingly, it is possible to effectively suppress generation of a reversed magnetic domain which may be caused in the vicinity of the surface of the perpendicular magnetization film.

Next, the film thickness provided on the perpendicular magnetization film was gradually changed from 5 to 55 [nm] so as to check the medium noise values at the recording density 10 [kFRPI]. The check results are shown in FIG. 110. As is clear from FIG. 110, no output lowering can be seen up to 50 [nm] thickness of the $Pr_2Co_{17}$, but when the film thickness exceeds 50 [nm], there is no improvement (reduction) of the medium noise. This is because, if the $Pr_2Co_{17}$ film thickness becomes too great, the $Pr_2Co_{17}$ film orientation in the perpendicular direction is deteriorated, reducing the perpendicular magnetic anisotropic energy Ku. Accordingly it becomes impossible to suppress generation of a reversed magnetic domain in the vicinity of the surface of the perpendicular magnetization film.

As has been described above, the medium K2 of the present invention has an excellent medium noise characteristic even in a low recording density region. That is, by using the medium K2 of the present invention, it is possible to suppress the medium noise increase in the low recording density region which has been the problem of the conventional perpendicular magnetic recording medium.

Moreover, similar results can be obtained when the $Pr_2Co_{17}$ film is provided under the perpendicular magnetization film or both under and over the perpendicular magnetization film.

EXAMPLE 21

Media of Example 21 were prepared in the same way as Example 11, except for that the $YCo_5$ target was replaced by a Ba ferrite, i.e., a $BaFe_{12}O_{19}$ target.

The medium having the $BaFe_{12}O_{19}$ of 50 [nm] thickness will be referred to as L2 of the present invention.

Note that we also prepared media having $BaFe_{12}O_{19}$ film and the $Co_{78}Cr_{19}Ta_3$ (at %) film formed in the reversed order, i.e., the $BaFe_{12}O_{19}$ film was formed firstly on the substrate and then the $Co_{78}Cr_{19}Ta_3$ (at %) film was formed thereon.

The perpendicular magnetic anisotropic energy Ku of the $BaFe_{12}O_{19}$ film and the $Co_{78}Cr_{19}Ta_3$ (at %) film were measured using a torque magnetometer. The results are shown in FIG. 111 and FIG. 7. As shown in FIG. 111 and FIG. 7, the perpendicular magnetic anisotropic energy Ku of the $Co_{78}Cr_{19}Ta_3$ (at %) film is $9.0\times10^5$ [erg/cc] whereas the perpendicular magnetic anisotropic energy Ku of the $BaFe_{12}O_{19}$ film is $3.3\times10^6$ [erg/cc] i.e., which is by far greater than the Ku value of the $Co_{78}Cr_{19}Ta_3$ (at %) film.

An ID/MR composite head was used to check the recording/reproduction characteristics of the medium L2 of the present invention and the conventional medium A1. The recording/reproduction conditions and the head used were identical to those of the Example 11.

Figure 112:
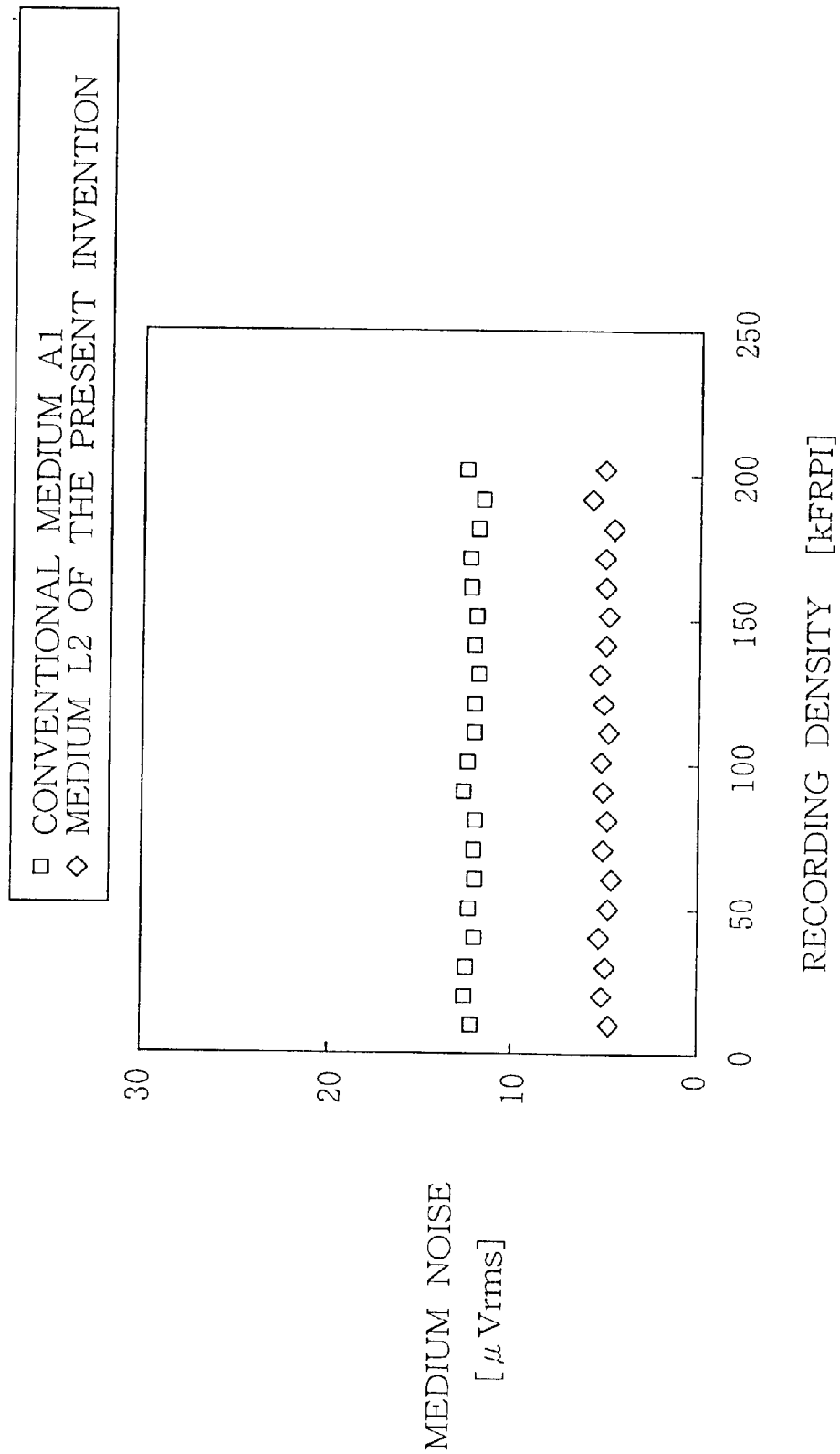
FIG. 112 is a graph showing the medium noise dependency on the recording density in Example 21 of the present invention.

FIG. 112 shows medium noise dependency on the recording density for the medium L2 of the present invention and the conventional medium A1. As is clear from this FIG. 112, the conventional medium A1 has a very high noise in a lower recording density region, whereas the medium L2 of the present invention has a suppressed noise in this low recording density region. This is because the medium L2 of the present invention has the perpendicular magnetic anisotropic energy Ku much higher than the $Co_{78}Cr_{19}Ta_3$ (at %) and has the film having a preferable magnetic anisotropy on the perpendicular magnetization film of $Co_{78}Cr_{19}Ta_3$ (at %). Accordingly, it is possible to effectively suppress generation of a reversed magnetic domain which may be caused in the vicinity of the surface of the perpendicular magnetization film.

Next, the film thickness provided on the perpendicular magnetization film was gradually changed from 5 to 55 [nm] so as to check the medium noise values at the recording density 10 [kFRPI]. The check results are shown in FIG. 113. As is clear from FIG. 113, no output lowering can be seen up to 50 [nm] thickness of the $BaFe_{12}O_{19}$, but when the film thickness exceeds 50 [nm], there is no improvement (reduction) of the medium noise. This is because, if the $BaFe_{12}O_{19}$ film thickness becomes too great, the $BaFe_{12}O_{19}$ film orientation in the perpendicular direction is deteriorated, reducing the perpendicular magnetic anisotropic energy Ku. Accordingly it becomes impossible to suppress generation of a reversed magnetic domain in the vicinity of the surface of the perpendicular magnetization film.

As has been described above, the medium L2 of the present invention has an excellent medium noise characteristic even in a low recording density region. That is, by using the medium L2 of the present invention, it is possible to suppress the medium noise increase in the low recording density region which has been the problem of the conventional perpendicular magnetic recording medium.

Moreover, similar results can be obtained when the $BaFe_{12}O_{19}$ film is provided under the perpendicular magnetization film or both under and over the perpendicular magnetization film.

EXAMPLE 22

Media of Example 22 were prepared in the same way as Example 11, by using another Ba ferrite, i.e., a $BaFe_{18}O_{27}$ target instead of the $BaFe_{12}O_{19}$ target used in Example 21.

The medium having the $BaFe_{18}O_{27}$ of 50 [nm] thickness will be referred to as M2 of the present invention.

Note that we also prepared media having $BaFe_{18}O_{27}$ film and the $Co_{78}Cr_{19}Ta_3$ (at %) film formed in the reversed order, i.e., the $BaFe_{18}O_{27}$ film was formed firstly on the substrate and then the $Co_{78}Cr_{19}Ta_3$ (at %) film was formed thereon.

The perpendicular magnetic anisotropic energy Ku of the $BaFe_{18}O_{27}$ film and the $Co_{78}Cr_{19}Ta_3$ (at %) film were measured using a torque magnetometer. The results are shown in FIG. 111 and FIG. 7. As shown in FIG. 111 and FIG. 7, the perpendicular magnetic anisotropic energy Ku of the $Co_{78}Cr_{19}Ta_3$ (at %) film is $9.0\times10^5$ [erg/cc] whereas the vertical magnetic anisotropic energy Ku of the $BaFe_{18}O_{27}$ film is $3.0\times10^6$ [erg/cc] i.e., which is by far greater than the Ku value of the $CO_{28}Cr_{19}Ta_3$ (at %) film.

An ID/MR composite head was used to check the recording/reproduction characteristics of the medium M2 of the present invention and the conventional medium A1. The recording/reproduction conditions and the head used were identical to those of the Example 11.

Figure 114:
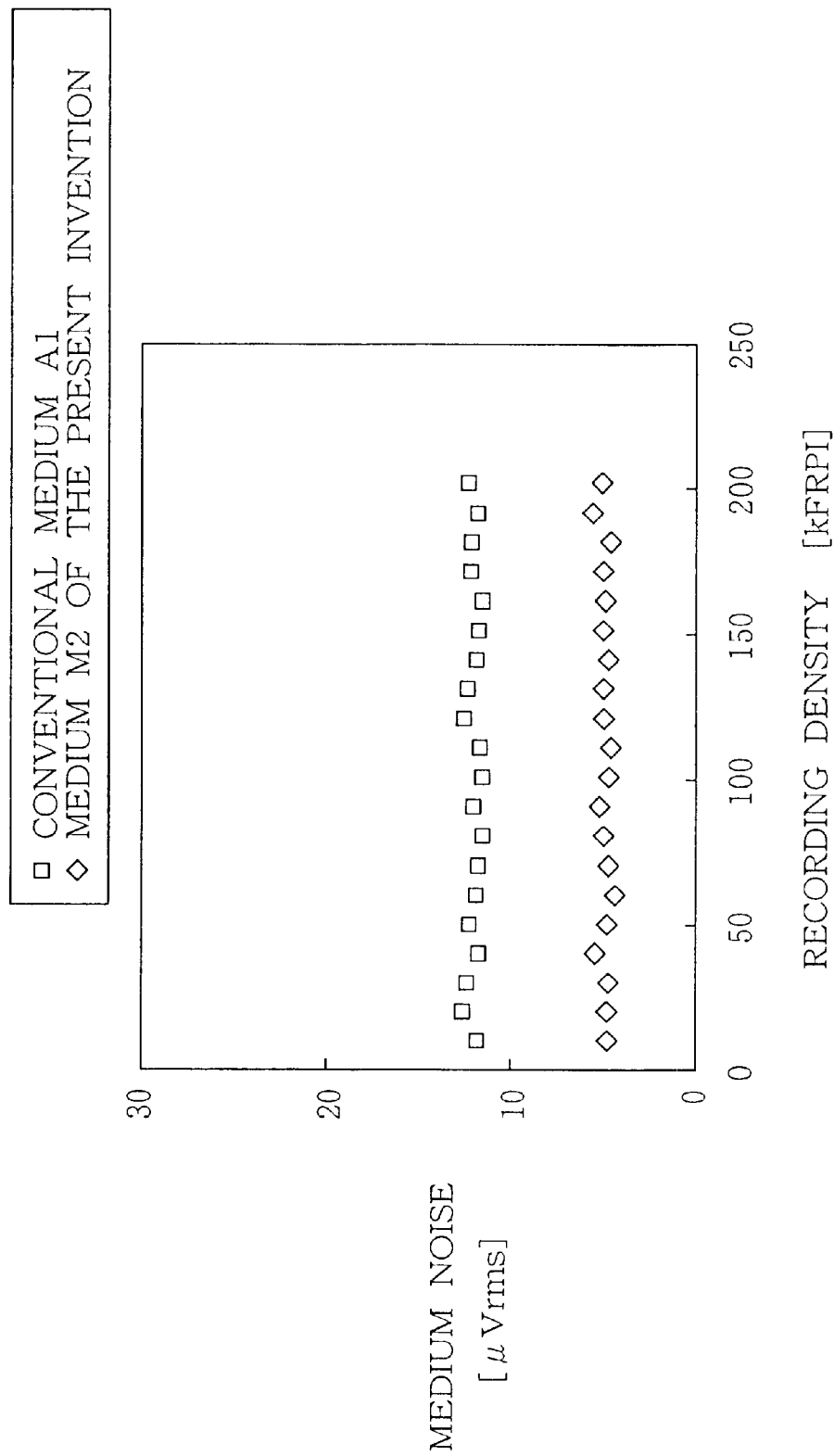
FIG. 114 is a graph showing the medium noise dependency on the recording density in Example 22 of the present invention.

FIG. 114 shows medium noise dependency on the recording density for the medium M2 of the present invention and the conventional medium A1. As is clear from this FIG. 114, the conventional medium A1 has a very high noise in a lower recording density region, whereas the medium M2 of the present invention has a suppressed noise in this low recording density region. This is because the medium M2 of the present invention has the perpendicular magnetic anisotropic energy Ku much higher than the $Co_{78}Cr_{19}Ta_3$ (at %) and has the film having a preferable magnetic anisotropy on the perpendicular magnetization film of $Co_{78}Cr_{19}Ta_3$ (at %). Accordingly, it is possible to effectively suppress generation of a reversed magnetic domain which may be caused in the vicinity of the surface of the perpendicular magnetization film.

Next, the film thickness provided on the perpendicular magnetization film was gradually changed from 5 to 55 [nm] so as to check the medium noise values at the recording density 10 [kFRPI]. The check results are shown in FIG. 115. As is clear from FIG. 115, no output lowering can be seen up to 50 [nm] thickness of the $BaFe_{18}Co_{27}$, but when the film thickness exceeds 50 [nm], there is no improvement (reduction) of the medium noise. This is because, if the $BaFe_{18}O_{27}$ film thickness becomes too great, the $BaFe_{18}O_{27}$ film orientation in the perpendicular direction is deteriorated, reducing the perpendicular magnetic anisotropic energy Ku. Accordingly it becomes impossible to suppress generation of a reversed magnetic domain in the vicinity of the surface of the perpendicular magnetization film.

As has been described above, the medium M2 of the present invention has an excellent medium noise characteristic even in a low recording density region. That is, by using the medium M2 of the present invention, it is possible to suppress the medium noise increase in the low recording density region which has been the problem of the conventional perpendicular magnetic recording medium.

Moreover, similar results can be obtained when the $BaFe_{18}O_{27}$ film is provided under the perpendicular magnetization film or both under and over the perpendicular magnetization film.

EXAMPLE 23

Media of Example 23 were prepared in the same way as Example 11, using a Sr ferrite target, i.e., a $SrFe_{12}O_{19}$ target in stead of the $BaFe_{12}O_{19}$ target used in Example 21. The medium having the $SrFe_{12}O_{19}$ of 50 [nm] thickness will be referred to as N2 of the present invention.

Note that we also prepared media having $SrFe_{12}O_{19}$ film and the $Co_{78}Cr_{19}Ta_3$ (at %) film formed in the reversed order, i.e., the $BaFe_{12}O_{19}$ film was formed firstly on the substrate and then the $Co_{78}Cr_{19}Ta_3$ (at %) film was formed thereon.

The perpendicular magnetic anisotropic energy Ku of the $SrFe_{12}O_{19}$ film and the $Co_{78}Cr_{19}Ta_3$ (at %) film were measured using a torque magnetometer. The results are shown in FIG. 111 and FIG. 7. As shown in FIG. 111 and FIG. 7, the perpendicular magnetic anisotropic energy Ku of the $Co_{78}Cr_{19}Ta_3$ (at %) film is $9.0\times10^5$ [erg/cc] whereas the vertica magnetic anisotropic energy Ku of the $SrFe_{12}O_{19}$ film is $3.4\times10^6$ [erg/cc] i.e., which is by far greater than the Ku value of the $Co_{78}Cr_{19}Ta_3$ (at %) film.

An ID/MR composite head was used to check the recording/reproduction characteristics of the medium N2 of the present invention and the conventional medium A1. The recording/reproduction conditions and the head used were identical to those of the Example 11.

Figure 116:
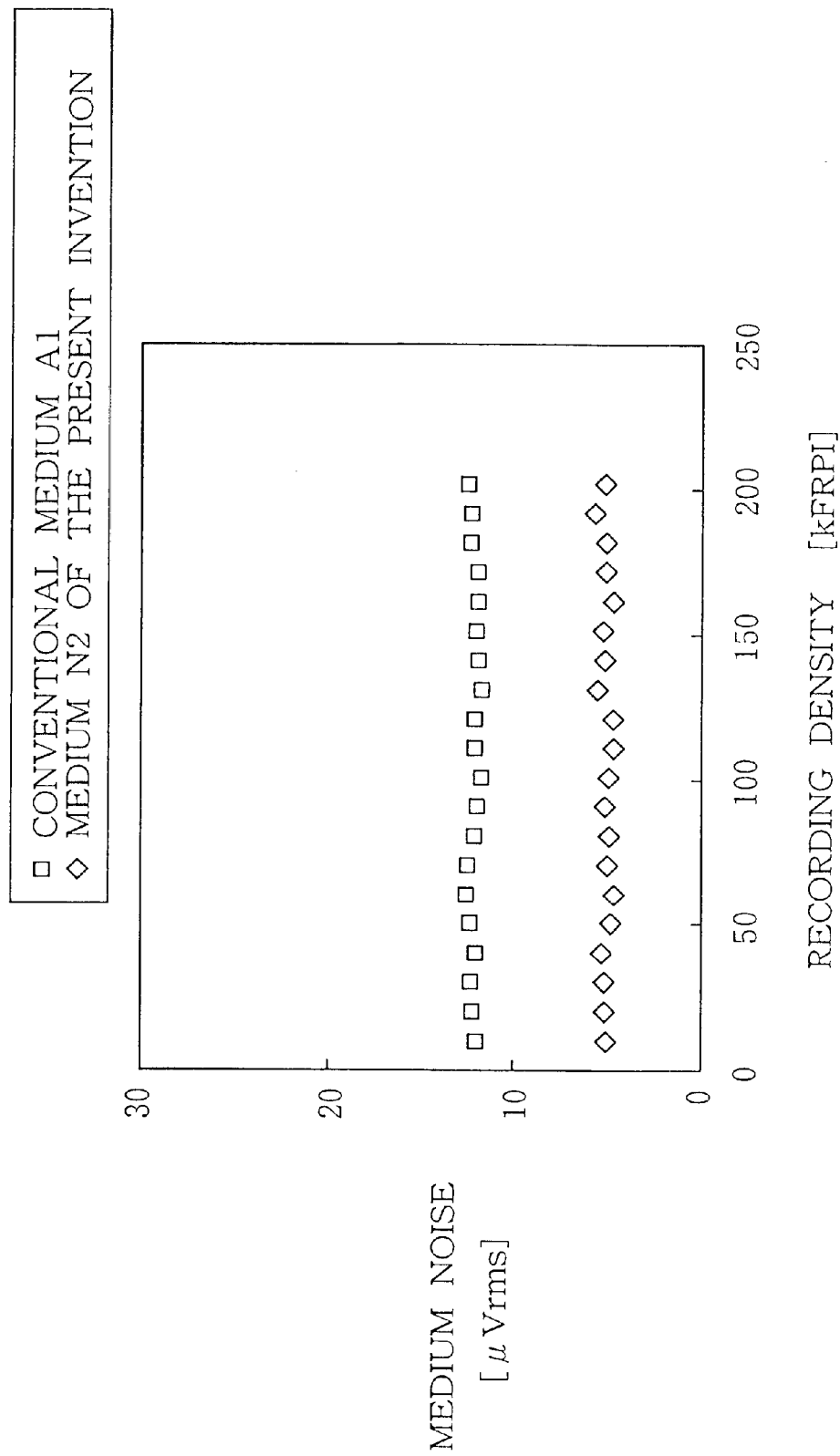
FIG. 116 is a graph showing the medium noise dependency on the recording density in Example 23 of the present invention.

FIG. 116 shows medium noise dependency on the recording density for the medium N2 of the present invention and the conventional medium A1. As is clear from this FIG. 116, the conventional medium A1 has a very high noise in a lower recording density region, whereas the medium N2 of the present invention has a suppressed noise in this low recording density region. This is because the medium N2 of the present invention has the perpendicular magnetic anisotropic energy Ku much higher than the $Co_{78}Cr_{19}Ta_3$ (at %) and has the film having a preferable magnetic anisotropy on the perpendicular magnetization film of $Co_{78}Cr_{19}Ta_3$ (at %). Accordingly, it is possible to effectively suppress generation of a reversed magnetic domain which may be caused in the vicinity of the surface of the perpendicular magnetization film.

Next, the film thickness provided on the perpendicular magnetization film was gradually changed from 5 to 55 [nm] so as to check the medium noise values at the recording density 10 [kFRPI]. The check results are shown in FIG. 117. As is clear from FIG. 117, no output lowering can be seen up to 50 [nm] thickness of the $SrFe_{12}Co_{19}$, but when the film thickness exceeds 50 [nm], there is no improvement (reduction) of the medium noise. This is because, if the $SrFe_{12}O_{19}$ film thickness becomes too great, the $SrFe_{12}O_{19}$ film orientation in the perpendicular direction is deteriorated, reducing the perpendicular magnetic anisotropic energy Ku. Accordingly it becomes impossible to suppress generation of a reversed magnetic domain in the vicinity of the surface of the perpendicular magnetization film.

As has been described above, the medium N2 of the present invention has an excellent medium noise characteristic even in a low recording density region. That is, by using the medium N2 of the present invention, it is possible to suppress the medium noise increase in the low recording density region which has been the problem of the conventional perpendicular magnetic recording medium.

Moreover, similar results can be obtained when the $SrFe_{12}O_{19}$ film is provided under the perpendicular magnetization film or both under and over the perpendicular magnetization film.

EXAMPLE 24

Media of Example 24 were prepared in the same way as Example 11, using another Sr ferrite target, i.e., a $SrFe_{18}O_{27}$, target instead of the $SrFe_{12}O_{19}$, target used in Example 23. The medium having the $SrFe_{18}O_{27}$ of 50 [nm] thickness will be referred to as P2 of the present invention.

Note that we also prepared media having $SrFe^{18}O_{27}$ film and the $Co_{78}Cr_{19}Ta_3$ (at %) film formed in the reversed order, i.e., the $BaFe_{18}O_{27}$, film was formed firstly on the substrate and then the $Co_{78}Cr_{19}Ta_3$ (at %) film was formed thereon.

The perpendicular magnetic anisotropic energy Ku of the $SrFe_{18}O_{27}$ film and the $Co_{78}Cr_{19}Ta_3$ (at %) film were measured using a torque magnetometer. The results are shown in FIG. 111 and FIG. 7. As shown in FIG. 111 and FIG. 7, the perpendicular magnetic anisotropic energy Ku of the $Co_{78}Cr_{19}Ta_3$ (at %) film is $9.0\times10^5$ [erg/cc] whereas the vertical magnetic anisotropic energy Ku of the $SrFe_{18}O_{27}$ film is $3.1\times10^6$ [erg/cc] i.e., which is by far greater than the Ku value of the $Co_{78}Cr_{19}Ta_3$ (at %) film.

An ID/MR composite head was used to check the recording/reproduction characteristics of the medium P2 of the present invention and the conventional medium A1. The recording/reproduction conditions and the head used were identical to those of the Example 11.

Figure 118:
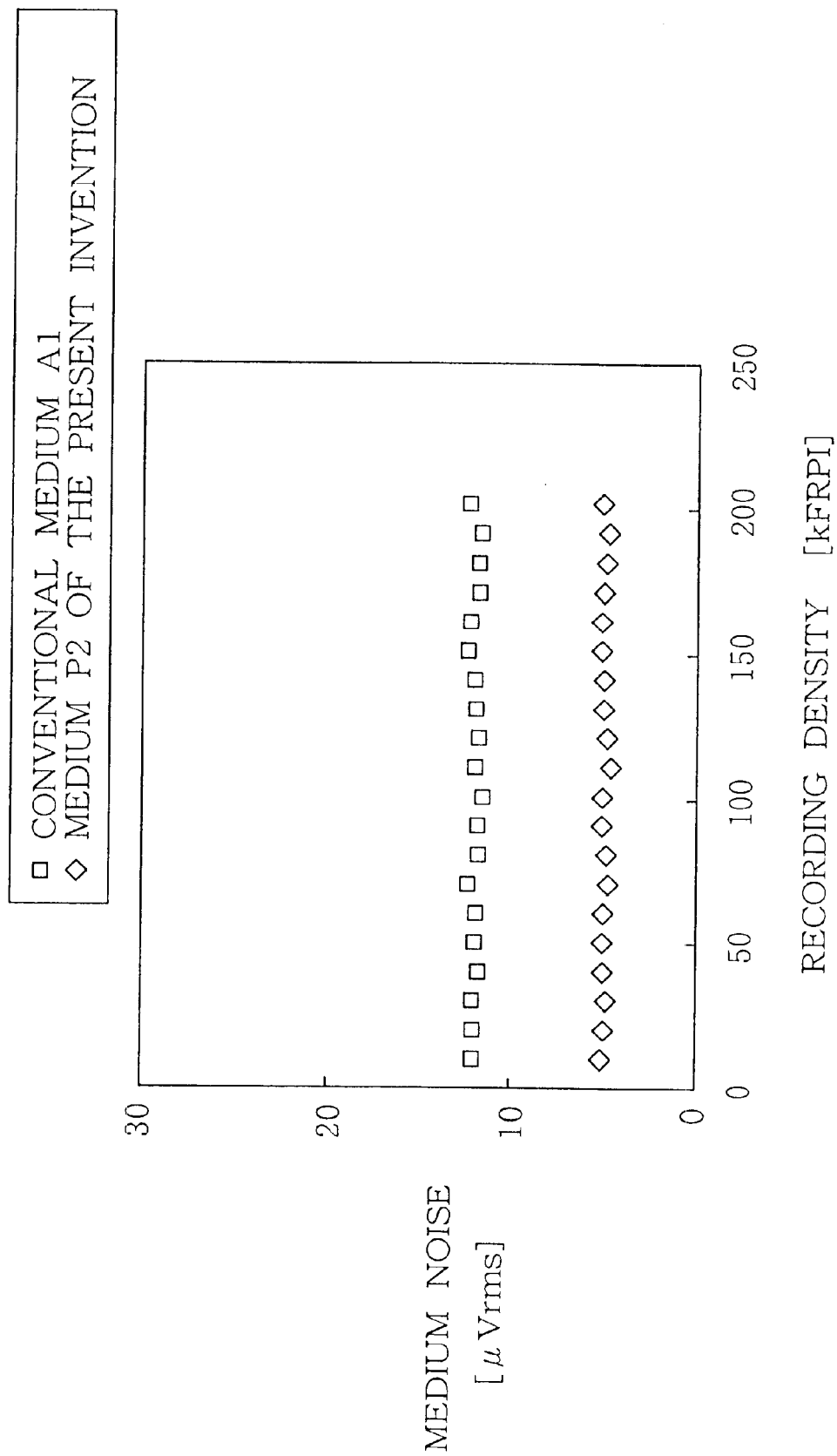
FIG. 118 is a graph showing the medium noise dependency on the recording density in Example 24 of the present invention.

FIG. 118 shows medium noise dependency on the recording density for the medium P2 of the present invention and the conventional medium A1. As is clear from this FIG. 118, the conventional medium A1 has a very high noise in a lower recording density region, whereas the medium P2 of the present invention has a suppressed noise in this low recording density region. This is because the medium P2 of the present invention has the perpendicular magnetic anisotropic energy Ku much higher than the $Co_{78}Cr_{19}Ta_3$ (at %) and has the film having a preferable magnetic anisotropy on the perpendicular magnetization film of $Co_{78}Cr_{19}Ta_3$ (at %). Accordingly, it is possible to effectively suppress generation of a reversed magnetic domain which may be caused in the vicinity of the surface of the perpendicular magnetization film.

Next, the film thickness provided on the perpendicular magnetization film was gradually changed from 5 to 55 [nm] so as to check the medium noise values at the recording density 10 [kFRPI]. The check results are shown in FIG. 119. As is clear from FIG. 119, no output lowering can be seen up to 50 [nm] thickness of the $SrFe_{18}Co_{27}$, but when the film thickness exceeds 50 [nm], there is no improvement (reduction) of the medium noise. This is because, if the $SrFe_{12}O_{19}$ film thickness becomes too great, the $SrFe_{12}O_{19}$ film orientation in the perpendicular direction is deteriorated, reducing the perpendicular magnetic anisotropic energy Ku. Accordingly it becomes impossible to suppress generation of a reversed magnetic domain in the vicinity of the surface of the perpendicular magnetization film.

As has been described above, the medium P2 of the present invention has an excellent medium noise characteristic even in a low recording density region. That is, by using the medium P2 of the present invention, it is possible to suppress the medium noise increase in the low recording density region which has been the problem of the conventional perpendicular magnetic recording medium.

Moreover, similar results can be obtained when the $SrFe_{18}O_{27}$ film is provided under the perpendicular magnetization film or both under and over the perpendicular magnetization film.

EXAMPLE 25

Media of Example 25 were prepared in the same way as Example 11 except for that the $YCo_5$ target was replaced $Pt_{50}Co_{50}$ (at %) target. The medium having the $Pt_{50}Co_{50}$ of 50 [nm] thickness will be referred to as Q2 of the present invention.

Note that we also prepared media having $Pt_{50}Co_{50}$ film and the $Co_{78}Cr_{19}Ta_3$ (at %) film formed in the reversed order, i.e., the $Pt_{50}Co_{50}$ film was formed firstly on the substrate and then the $Co_{78}Cr_{19}Ta_3$ (at %) film was formed thereon.

The perpendicular magnetic anisotropic energy Ku of the $Pt_{50}Co_{50}$ (at %) film and the $Co_{78}Cr_{19}Ta3$ (at %) film were measured using a torque magnetometer. The results are shown in FIG. 111 and FIG. 7. As shown in FIG. 111 and FIG. 7, the perpendicular magnetic anisotropic energy Ku of the $Co_{78}Cr_{19}Ta_3$ (at %) film is $9.0 \times 10^5$ [erg/cc] whereas the vertica magnetic anisotropic energy Ku of the $Pt_{50}Co_{50}$ film is $1.0 \times 10^7$ [erg/cc] i.e., which is by far greater than the Ku value of the $Co_{78}Cr_{19}Ta_3$ (at %) film.

An ID/MR composite head was used to check the recording/reproduction characteristics of the medium Q2 of the present invention and the conventional medium A1. The recording/reproduction conditions and the head used were identical to those of the Example 11.

Figure 120:
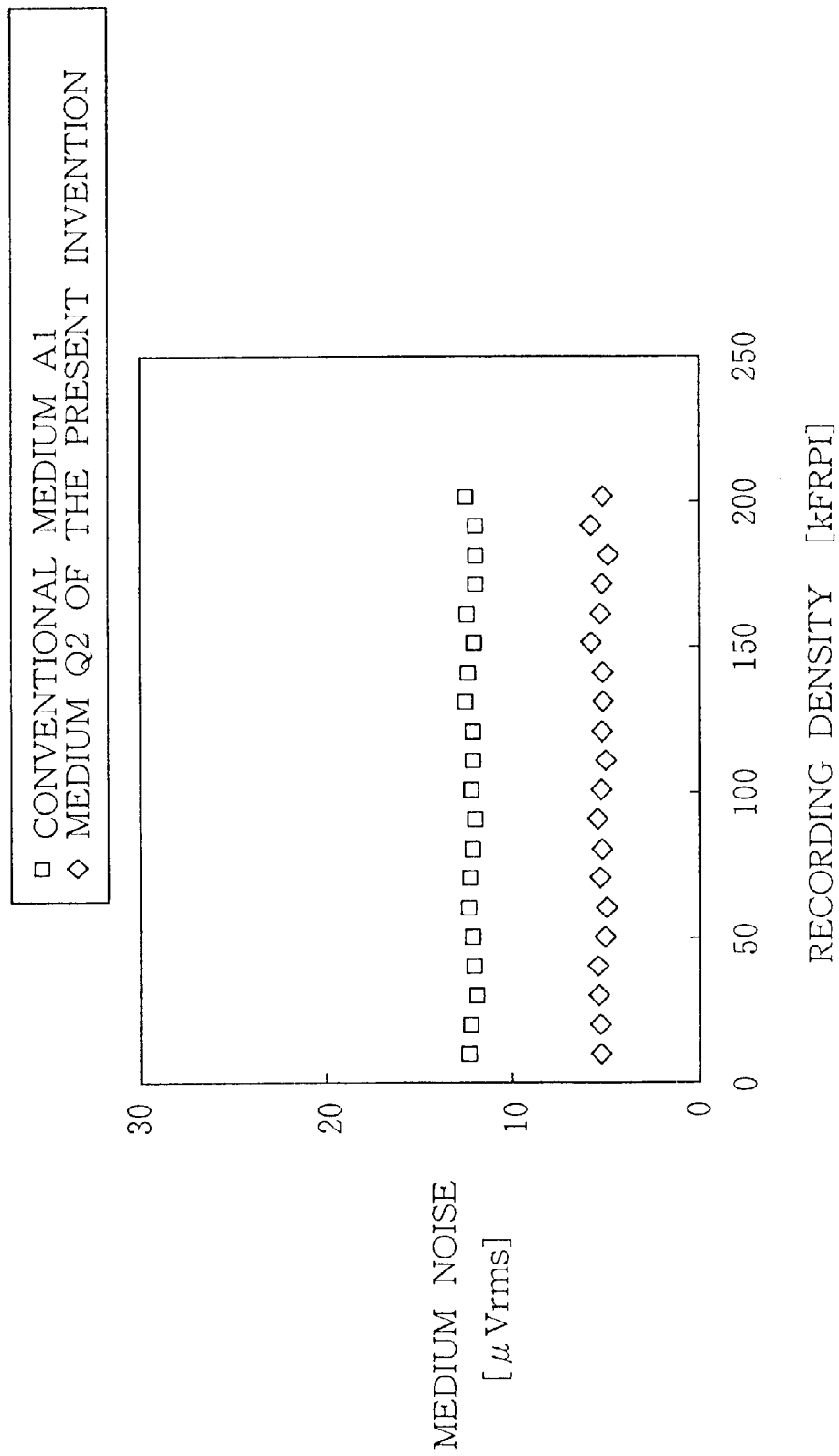
FIG. 120 is a graph showing the medium noise dependency on the recording density in Example 25 of the present invention.

FIG. 120 shows medium noise dependency on the recording density for the medium Q2 of the present invention and the conventional medium A1. As is clear from this FIG. 120, the conventional medium A1 has a very high noise in a lower recording density region, whereas the medium Q2 of the present invention has a suppressed noise in this low recording density region. This is because the medium Q2 of the present invention has the perpendicular magnetic anisotropic energy Ku much higher than the $Co_{78}Cr_{19}Ta_3$ (at %) and has the film having a preferable magnetic anisotropy on the perpendicular magnetization film of $Co_{78}Cr_{19}Ta_3$ (at %). Accordingly, it is possible to effectively suppress generation of a reversed magnetic domain which may be caused in the vicinity of the surface of the perpendicular magnetization film.

Next, the film thickness provided on the perpendicular magnetization film was gradually changed from 5 to 55 [nm] so as to check the medium noise values at the recording density 10 [kFRPI]. The check results are shown in FIG. 121. As is clear from FIG. 121, no output lowering can be seen up to 50 [nm] thickness of the $Pt_{50}Co_{50}$, but when the film thickness exceeds 50 [nm] there is no improvement (reduction) of the medium noise. This is because, if the $Pt_{50}Co_{50}$ film thickness becomes too great, the $Pt_{50}Co_{50}$ film orientation in the perpendicular direction is deteriorated, reducing the perpendicular magnetic anisotropic energy Ku. Accordingly it becomes impossible to suppress generation of a reversed magnetic domain in the vicinity of the surface of the perpendicular magnetization film.

As has been described above, the medium Q2 of the present invention has an excellent medium noise characteristic even in a low recording density region. That is, by using the medium Q2 of the present invention, it is possible to suppress the medium noise increase in the low recording density region which has been the problem of the conventional perpendicular magnetic recording medium.

Moreover, similar results can be obtained when the $Pt_{50}Co_{50}$ film is provided under the perpendicular magnetization film or both under and over the perpendicular magnetization film.

EXAMPLE 26

Using a 6-inch FeSiAl target for sputtering, a FeSiAl film was formed with a thickness of 500 [nm] on 2.5-inch substrates. The film formation conditions were as follows: initial vacuum degree $5 \times 10^{-7}$ [mTorr]; electric power 0.5 [kw]; argon gas pressure 4 [mTorr]; film formation speed 3 [nm/sec].

Then, each of the FeSiAl films on the substrates at temperature of 400 degrees centigrade was covered by 100 [nm] of $Co_{78}Cr_{19}Ta_3$ (at %) film formed by using a $Co_{78}Cr_{19}Ta_3$ target under the same film formation conditions as FeSiAl.

Next, the $Co_{78}Cr_{19}Ta_3$ films were respectively covered by 10 to 55 [nm] thickness of $YCo_5$ films. Furthermore, a C (carbon) protection film of 10 [nm] was formed to cover each of the aforementioned films.

The medium having the 50 [nm] of $YCo_5$ will be referred to as AA2 of the present invention.

On the other hand, the medium having no $YCo_5$ film will be referred to as a conventional medium (comparative example) B1.

It should be noted we also prepared a medium having the $YCO_5$ film and the $Co_{78}Cr_{19}Ta_3$ film in the reversed order. That is, firstly, $YCo_5$ film was formed on the substrate, and then the $Co_{78}Cr_{19}Ta_3$ film was formed on the $YCo_5$ film.

As has been shown in Example 11, the perpendicular magnetic anisotropic energy Ku of the $Co_{78}Cr_{19}Ta_3$ film is $9.0 \times 10^5$ [erg/cc], whereas the perpendicular magnetic anisotropic energy of the $YCo_5$ film is $5.0 \times 10^7$ [erg/cc], which is by far greater than the Ku of the $Co_{78}Cr_{19}Ta_3$ film. (See FIG. 90 and FIG. 7)

By using a mono-pole/MR (magneto-resistance effect) composite head, the recording/reproduction characteristics were checked on the medium AA2 of the present invention and the conventional medium B1. The check conditions were set as follows: mono-pole head recording track width 4 [micrometers], the main magnetic pole film thickness 0.4 [micrometers], reproduction track width 3 [micrometers], and reproduction gap length 0.32 [micrometers]. Note that the check was performed under the condition of: recording current 10 [mAop], sense current 12 [mA], peripheral velocity 12.7 [m/s], and floating amount 45 [nm].

Figure 122:
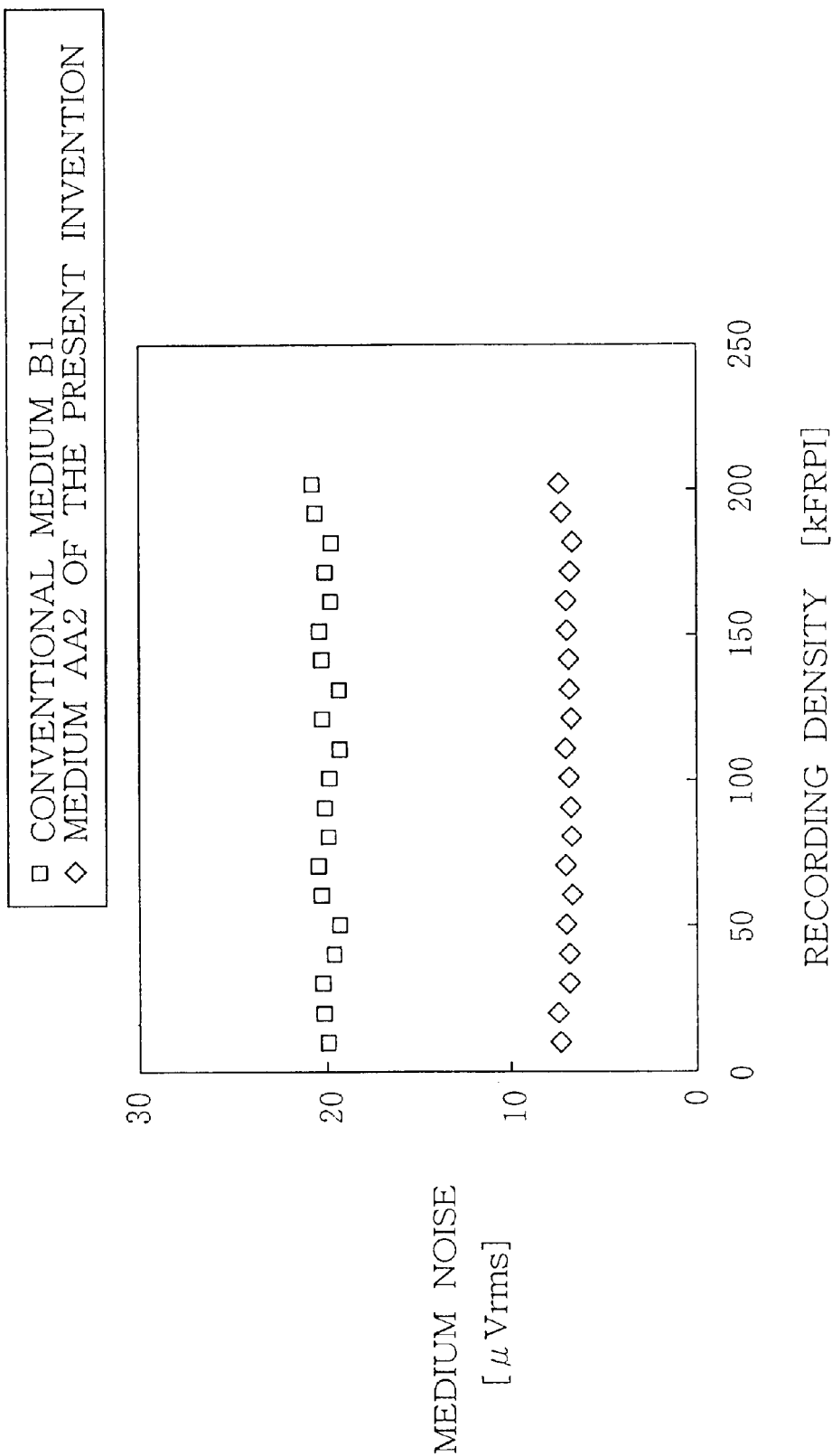

FIG. 122 shows the medium noise dependency on the recording density for the AA2 of the present invention and the conventional medium B1. As is clear from FIG. 122, the conventional medium B1 shows a very high medium noise in the lower recording density, whereas in the medium AA2 of the present invention, the medium noise in the same recording region is much suppressed in comparison to the conventional medium E1. This is because the medium AA2 of the present invention includes the $YCo_5$ film having much higher perpendicular magnetic anisotropy Ku than the $Co_{78}Cr_{19}Ta_3$ and the film is formed on the $Co_{78}Cr_{19}Ta_3$ film Accordingly, in contrast to the conventional B1, it is possible to much more suppress generation of reversed magnetic domain in the vicinity of the surface of the perpendicular magnetization film. Note that the FeSiAl film has no magnetic domain wall structure and the spike-shaped noise is not generated easily due to the magnetic domain wall movement.

Next, the film thickness of the film formed on the perpendicular magnetization film was gradually changed from 5 to 55 [nm] to check the medium noise values at recording density 10 [KFRPI] for all the film types. The results of this check are shown in FIG. 123. As is clear from FIG. 123, no output lowering can be seen up to 50 [nm] of the $YCo_5$ film. When the $YCo_5$ film thickness exceeds 50 [nm], the medium noise cannot be improved (reduced). This is because if $YCo_5$ film thickness becomes too large, $YCo_5$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium AA2 of the present invention shows a preferable medium noise characteristic even in a low recording density region. That is, by using the AA2 of the present invention, it is possible to realize suppression of medium noise increase in the low recording region.

Moreover, when the YCo$_5$ film was provided under or both under and over the perpendicular magnetization film, similar results were obtained because of the aforementioned reasons.

Furthermore, in the experiment using the ID/MR composite head used in Example 1 instead of the mono-pole composite head, similar results were obtained because of the aforementioned reasons.

EXAMPLE 27

Media of Example 27 was prepared in the same way as Example 26, except for that the YCo$_5$ target for sputtering was replaced by a CeCo$_5$ target.

The medium having the CeCo$_5$ of 50 [nm] will be referred to as BB2 of the present invention.

It should be noted we also prepared a medium having the CeCo$_5$ film and the Co$_{78}$Cr$_{19}$Ta$_3$ film in the reversed order. That is, firstly, CeCo$_5$ film was formed on the FeSiAl film, and then the Co$_{78}$Cr$_{19}$Ta$_3$ film was formed on the CeCo$_5$ film.

As has been shown in Example 12, the perpendicular magnetic anisotropic energy Ku of the Co$_{78}$Cr$_{19}$Ta$_3$ film is 9.0×10$^5$ [erg/cc], whereas the perpendicular magnetic anisotropic energy of the CeCo$_5$ film is 6.0×10$^7$ [erg/cc], which is by far greater than the Ku of the Co$_{78}$Cr$_{19}$Ta$_3$ film. (See FIG. 90 and FIG. 7)

By using a mono-pole/MR (magneto-resistance effect) composite head, the recording/reproduction characteristics were checked on the medium BB2 of the present invention and the conventional medium B1. The check conditions were the same as in Example 26.

Figure 124:
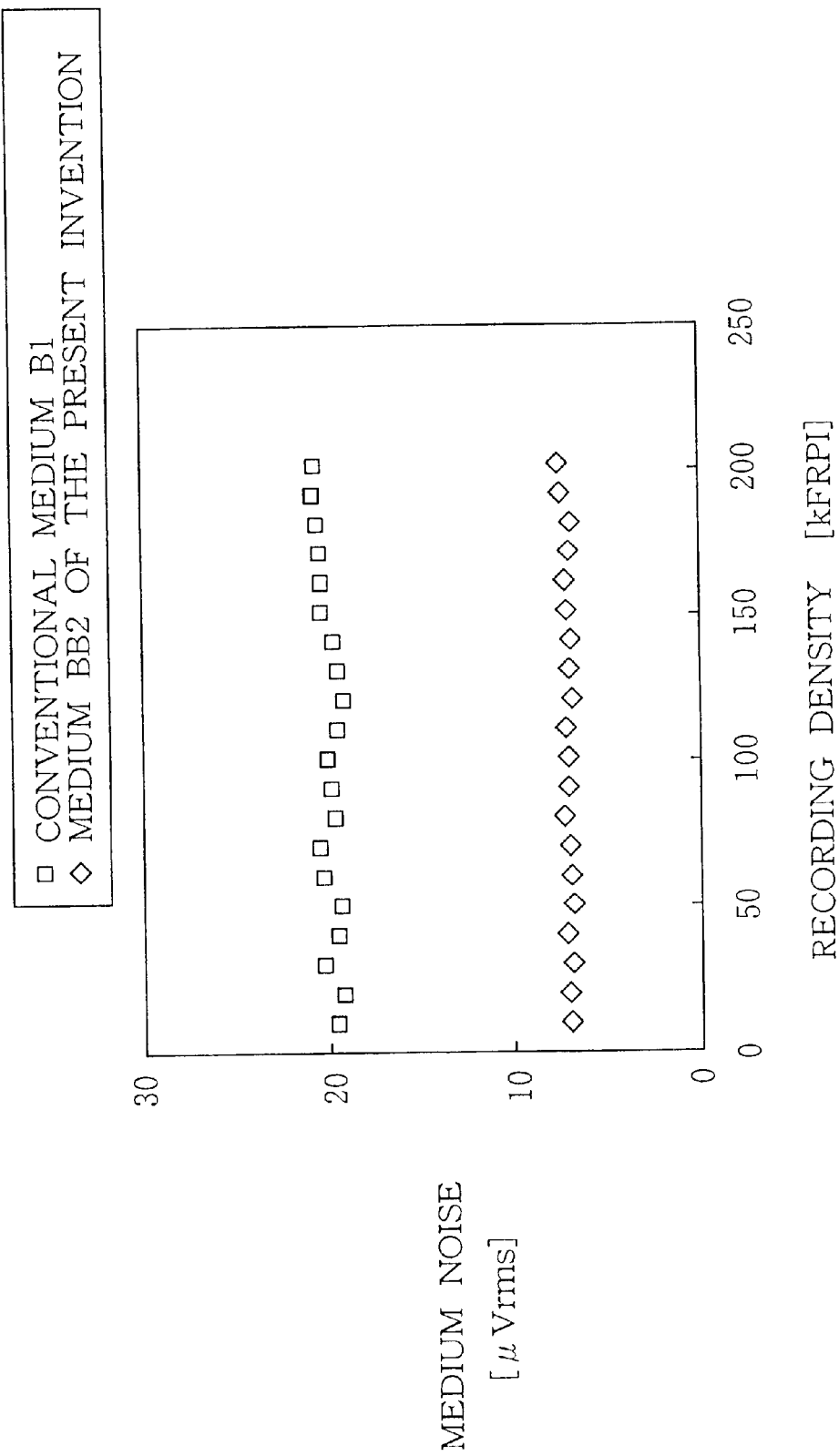

FIG. 124 shows the medium noise dependency on the recording density for the BB2 of the present invention and the conventional medium B1. As is clear from FIG. 124, the conventional medium B1 shows a very high medium noise in the lower recording density, whereas in the medium BB2 of the present invention, the medium noise in the same recording region is much suppressed in comparison to the conventional medium B1. This is because the medium BB2 of the present invention includes the film having much higher perpendicular magnetic anisotropy Ku than the Co$_{78}$Cr$_{19}$Ta$_3$ and the film is formed on that Co$_{78}$Cr$_{19}$Ta$_3$ film. Accordingly, in contrast to the conventional B1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 125. As is clear from FIG. 125, no output lowering can be seen up to 50 [nm] of the CeCo$_5$ film. When the CeCo$_5$ film thickness exceeds 50 [nm], the medium noise cannot be improved (reduced). This is because if CeCo$_5$ film thickness becomes too large, YCo$_5$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium BB2 of the present invention shows a preferable medium noise characteristic even in a low recording density region. That is, by using the BB2 of the present invention, it is possible to realize suppression of medium noise increase in the low recording region.

Moreover, when the CeCo$_5$ film was provided under or both under and over the perpendicular magnetization film, similar results were obtained because of the aforementioned reasons.

Furthermore, in the experiment using the ID/MR composite head used in Example 1 instead of the mono-pole composite head, similar results were obtained because of the aforementioned reasons.

EXAMPLE 28

Media of Example 28 were prepared in the same way as Example 26, except for that the YCo$_5$ target for sputtering was replaced by a SmCo$_5$ target.

The medium having the SmCo$_5$ of 50 [nm] will be referred to as CC2 of the present invention.

It should be noted we also prepared a medium having the SmCo$_5$ film and the Co$_{78}$Cr$_{19}$Ta$_3$ (at %) film in the reversed order. That is, firstly, SmCo$_5$ film was formed on the FeSiAl film, and then the Co$_{78}$Cr$_{19}$Ta$_3$ film was formed on the SmCo$_5$ film.

As has been shown in Example 13, the perpendicular magnetic anisotropic energy Ku of the Co$_{78}$Cr$_{19}$Ta$_3$ film is 9.0×10$^5$ [erg/cc], whereas the perpendicular magnetic anisotropic energy of the SmCo$_5$ film is 1.0×10$^8$ [erg/cc], which is by far greater than the Ku of the Co$_{78}$Cr$_{19}$Ta$_3$ film. (See FIG. 90 and FIG. 7)

By using a mono-pole/MR (magneto-resistance effect) composite head, the recording/reproduction characteristics were checked on the medium CC2 of the present invention and the conventional medium B1. The check conditions were the same as in Example 26.

Figure 126:
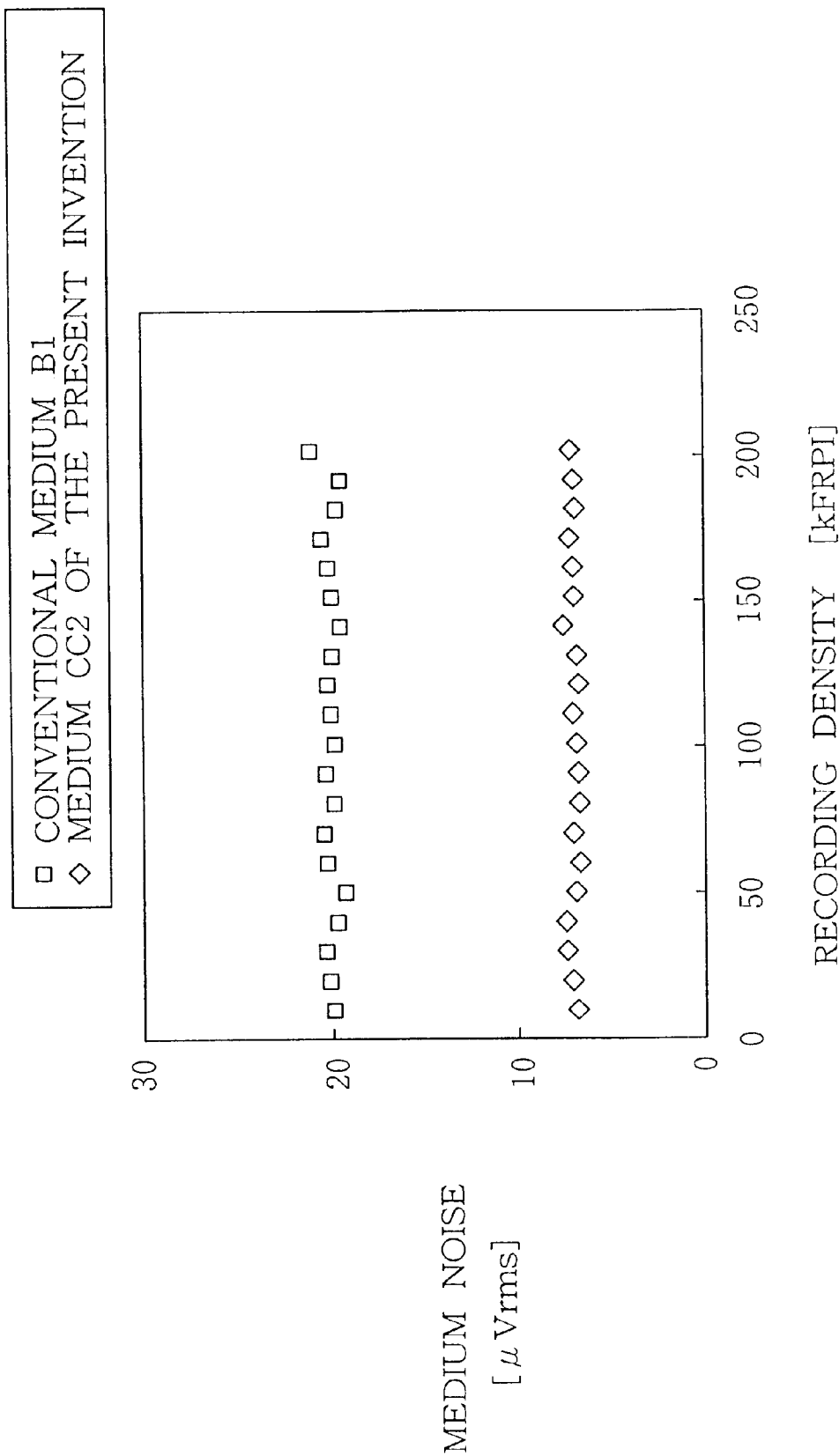

FIG. 126 shows the medium noise dependency on the recording density for the CC2 of the present invention and the conventional medium B1. As is clear from FIG. 126, the conventional medium B1 shows a very high medium noise in the lower recording density, whereas in the medium CC2 of the present invention, the medium noise in the same recording region is much suppressed in comparison to the conventional medium B1. This is because the medium CC2 of the present invention includes the film having much higher perpendicular magnetic anisotropy Ku than the Co$_{78}$Cr$_{19}$Ta$_3$ and the film is formed on that Co$_{78}$Cr$_{19}$Ta$_3$ film. Accordingly, in contrast to the conventional B1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 127. As is clear from FIG. 127, no output lowering can be seen up to 50 [nm] of the SmCo$_5$ film. When the SmCo$_5$ film thickness exceeds 50 [nm], the medium noise cannot be improved (reduced). This is because if SmCo$_5$ film thickness becomes too large, YCo$_5$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium CC2 of the present invention shows a preferable medium noise characteristic even in a low recording density region. That is, by using the CC2 of the present invention, it is possible to realize suppression of medium noise increase in the low recording region.

Moreover, when the SmCo$_5$ film was provided under or both under and over the perpendicular magnetization film, similar results were obtained because of the aforementioned reasons.

Furthermore, in the experiment using the ID/MR composite head used in Example 1 instead of the mono-pole composite head, similar results were obtained because of the aforementioned reasons.

EXAMPLE 29

Media of Example 29 were prepared in the same way as Example 26, except for that the YCo$_5$ target for sputtering was replaced by a LaCo$_5$ target.

The medium having the LaCo$_5$ of 50 [nm] will be referred to as DD2 of the present invention.

It should be noted we also prepared a medium having the LaCo$_5$ film and the Co$_{78}$Cr$_{19}$Ta$_3$ (at %) film in the reversed order. That is, firstly, LaCo$_5$ film was formed on the FeSiAl film, and then the Co$_{78}$Cr$_{19}$Ta$_3$ film was formed on the LaCo$_5$ film.

As has been shown in Example 14, the perpendicular magnetic anisotropic energy Ku of the Co$_{78}$Cr$_{19}$Ta$_3$ film is 9.0×10$^5$ [erg/cc], whereas the perpendicular magnetic anisotropic energy of the LaCo$_5$ film is 6.0×10$^7$ [erg/cc], which is by far greater than the Ku of the Co$_{78}$Cr$_{19}$Ta$_3$ film. (See FIG. 90 and FIG. 7)

By using a mono-pole/MR (magneto-resistance effect) composite head, the recording/reproduction characteristics were checked on the medium DD2 of the present invention and the conventional medium B1. The check conditions were the same as in Example 26.

Figure 128:
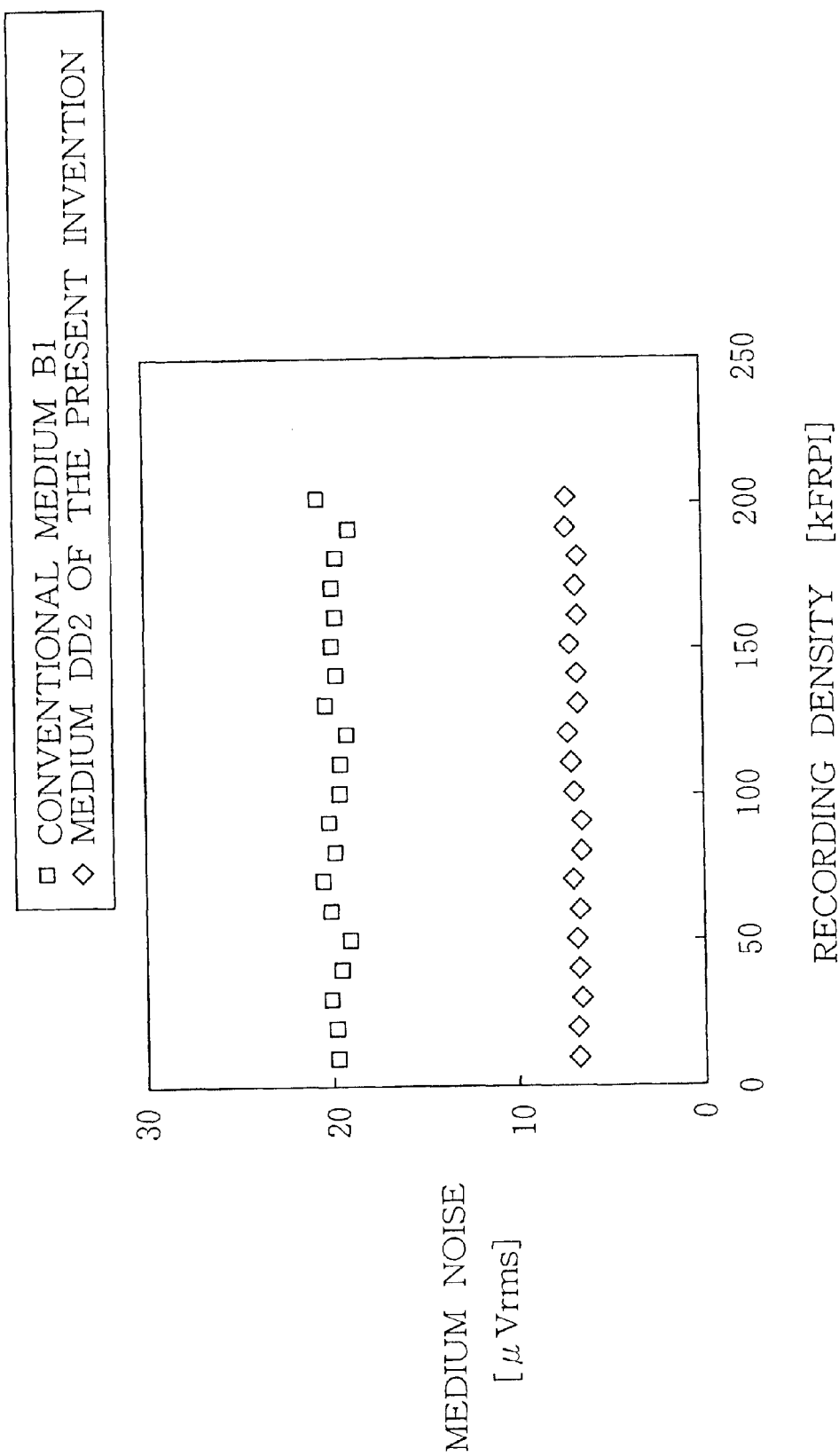

FIG. 128 shows the medium noise dependency on the recording density for the DD2 of the present invention and the conventional medium B1. As is clear from FIG. 128, the conventional medium B1 shows a very high medium noise in the lower recording density, whereas in the medium DD2 of the present invention, the medium noise in the same recording region is much suppressed in comparison to the conventional medium B1. This is because the medium DD2 of the present invention includes the film having much higher perpendicular magnetic anisotropy Ku than the Co$_{78}$Cr$_{19}$Ta$_3$ and the film is formed on that Co$_{78}$Cr$_{19}$Ta$_3$ film. Accordingly, in contrast to the conventional B1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 129. As is clear from FIG. 129, no output lowering can be seen up to 50 [nm] of the LaCo$_5$ film. When the LaCo$_5$ film thickness exceeds 50 [nm], the medium noise cannot be improved (reduced). This is because if LaCo$_5$ film thickness becomes too large, LaCo$_5$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium DD2 of the present invention shows a preferable medium noise characteristic even in a low recording density region. That is, by using the DD2 of the present invention, it is possible to realize suppression of medium noise increase in the low recording region.

Moreover, when the LaCo$_5$ film was provided under or both under and over the perpendicular magnetization film, similar results were obtained because of the aforementioned reasons.

Furthermore, in the experiment using the ID/MR composite head used in Example 11 instead of the mono-pole composite head, similar results were obtained because of the aforementioned reasons.

EXAMPLE 30

Media of Example 30 were prepared in the same way as Example 26, except for that the YCo$_5$ target for sputtering was replaced by a PrCo$_5$ target.

The medium having the PrCo$_5$ of 50 [nm] will be referred to as EE2 of the present invention.

It should be noted we also prepared a medium having the PrCo$_5$ film and the Co$_{78}$Cr$_{19}$Ta$_3$ (at %) film in the reversed order. That is, firstly, PrCo$_5$ film was formed on the FeSiAl film, and then the Co$_{78}$Cr$_{19}$Ta$_3$ film was formed on the PrCo$_5$ film.

As has been shown in Example 15, the perpendicular magnetic anisotropic energy Ku of the Co$_{78}$Cr$_{19}$Ta$_3$ film is 9.0×10$^5$ [erg/cc], whereas the perpendicular magnetic anisotropic energy of the PrCo$_5$ film is 8.0×10$^7$ [erg/cc], which is by far greater than the Ku of the Co$_{78}$Cr$_{19}$Ta$_3$ film. (See FIG. 90 and FIG. 7)

By using a mono-pole/MR (magneto-resistance effect) composite head, the recording/reproduction characteristics were checked on the medium EE2 of the present invention and the conventional medium B1. The check conditions were the same as in Example 26.

Figure 130:
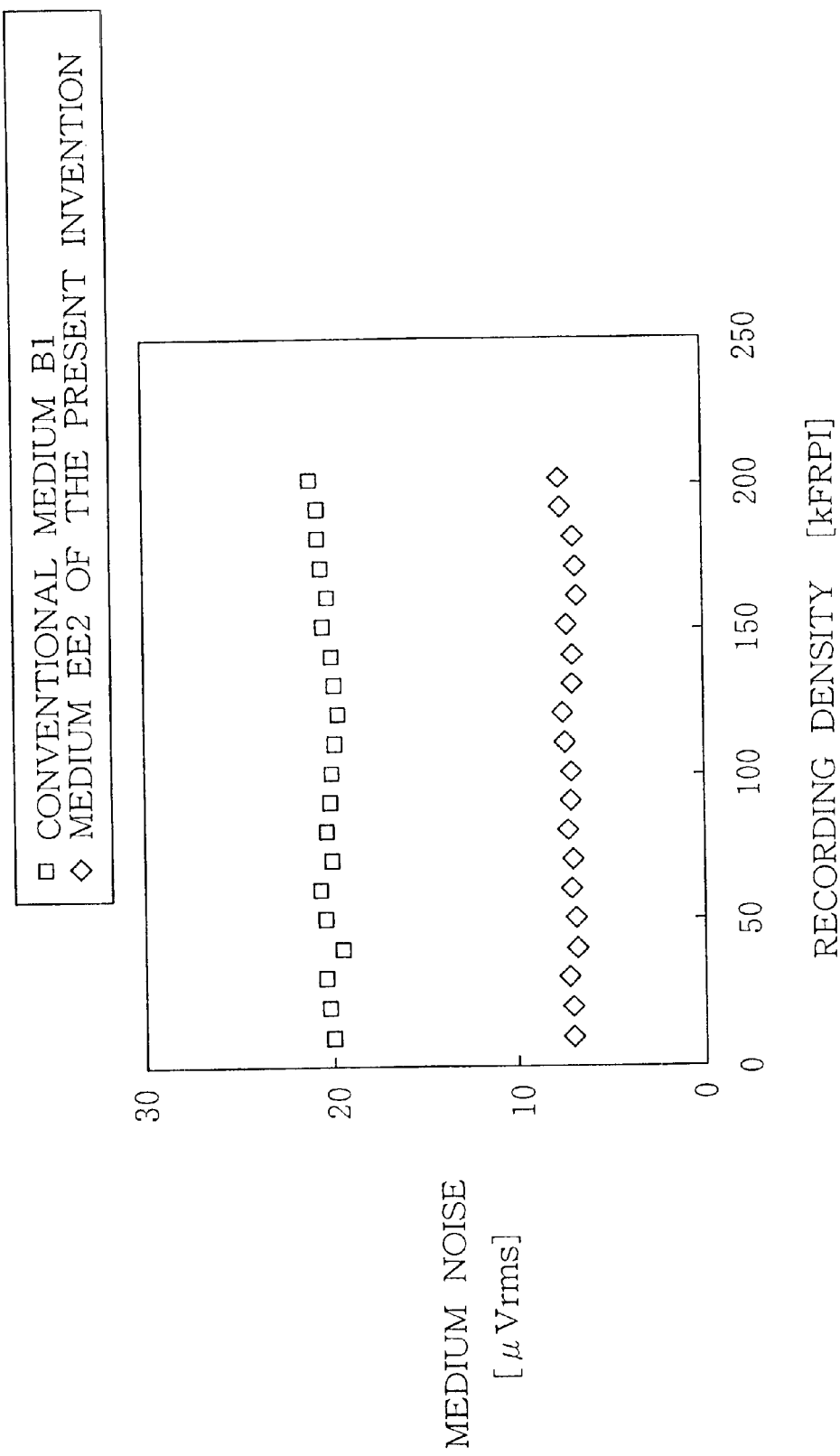

FIG. 130 shows the medium noise dependency on the recording density for the EE2 of the present invention and the conventional medium B1. As is clear from FIG. 130, the conventional medium B1 shows a very high medium noise in the lower recording density, whereas in the medium EE2 of the present invention, the medium noise in the same recording region is much suppressed in comparison to the conventional medium B1. This is because the medium EE2 of the present invention includes the film having much higher perpendicular magnetic anisotropy Ku than the Co$_{78}$Cr$_{19}$Ta$_3$ and the film is formed on the Co$_{78}$Cr$_{19}$Ta$_3$ film. Accordingly, in contrast to the conventional B1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 131. As is clear from FIG. 131, no output lowering can be seen up to 50 [nm] of the PrCo$_5$ film. When the PrCo$_5$ film thickness exceeds 50 [nm], the medium noise cannot be improved (reduced). This is because if PrCo$_5$ film thickness becomes too large, PrCo$_5$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium EE2 of the present invention shows a preferable medium noise characteristic even in a low recording density region. That is, by using the EE2 of the present invention, it is possible to realize suppression of medium noise increase in the low recording region.

Moreover, when the PrCo$_5$ film was provided under or both under and over the perpendicular magnetization film, similar results were obtained because of the aforementioned reasons.

Furthermore, in the experiment using the ID/MR composite head used in Example 11 instead of the mono-pole composite head, similar results were obtained because of the aforementioned reasons.

EXAMPLE 31

Media of Example 30 were prepared in the same way as Example 26, except for that the YCo$_5$ target for sputtering was replaced by a Y$_2$Co$_{17}$ target.

The medium having the Y$_2$Co$_{17}$ of 50 [nm] will be referred to as FF2 of the present invention.

It should be noted we also prepared a medium having the Y$_2$Co$_{17}$ film and the Co$_{78}$Cr$_{19}$Ta$_3$ (at %) film in the reversed order. That is, firstly, Y$_2$Co$_{17}$ film was formed on the FeSiAl film, and then the Co$_{78}$Cr$_{19}$Ta$_3$ film was formed on the Y$_2$Co$_{17}$ film.

As has been shown in Example 16, the perpendicular magnetic anisotropic energy Ku of the Co$_{78}$Cr$_{19}$Ta$_3$ film is 9.0×10$^5$ [erg/cc], whereas the perpendicular magnetic anisotropic energy of the Y$_2$Co$_{17}$ film is 2.0×10$^7$ [erg/cc], which is by far greater than the Ku of the Co$_{78}$Cr$_{19}$Ta$_3$ film. (See FIG. 90 and FIG. 7)

By using a mono-pole/MR (magneto-resistance effect) composite head, the recording/reproduction characteristics were checked on the medium FF2 of the present invention and the conventional medium B1. The check conditions were the same as in Example 26.

Figure 132:
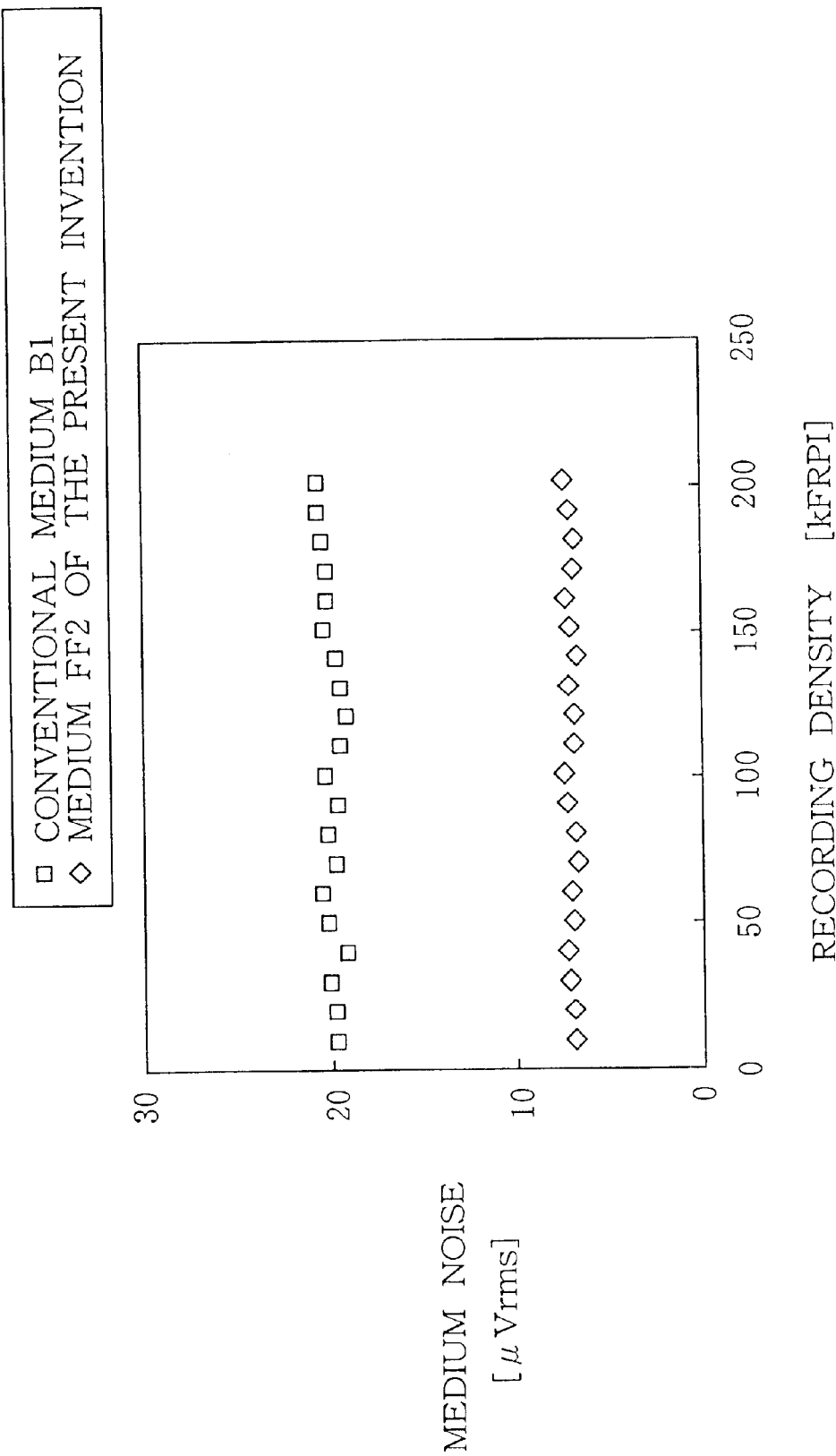

FIG. 132 shows the medium noise dependency on the recording density for the FF2 of the present invention and the conventional medium B1. As is clear from FIG. 132, the conventional medium B1 shows a very high medium noise in the lower recording density, whereas in the medium FF2 of the present invention, the medium noise in the same recording region is much suppressed in comparison to the conventional medium B1. This is because the medium FF2 of the present invention includes the film having much higher perpendicular magnetic anisotropy Ku than the Co$_{78}$Cr$_{19}$Ta$_3$ and the film is formed on the Co$_{78}$Cr$_{19}$Ta$_3$ film. Accordingly, in contrast to the conventional B1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 133. As is clear from FIG. 133, no output lowering can be seen up to 50 [nm] of the Y$_2$Co$_{17}$ film. When the Y$_2$Co$_{17}$ film thickness exceeds 50 [nm], the medium noise cannot be improved (reduced). This is because if Y$_2$Co$_{17}$ film thickness becomes too large, Y$_2$Co$_{17}$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium FF2 of the present invention shows a preferable medium noise characteristic even in a low recording density region. That is, by using the FF2 of the present invention, it is possible to realize suppression of medium noise increase in the low recording region.

Moreover, when the Y$_2$Co$_{17}$ film was provided under or both under and over the perpendicular magnetization film, similar results were obtained because of the aforementioned reasons.

Furthermore, in the experiment using the ID/MR composite head used in Example 11 instead of the mono-pole composite head, similar results were obtained because of the aforementioned reasons.

EXAMPLE 32

Media of Example 32 were prepared in the same way as Example 26, except for that the YCo$_5$ target for sputtering was replaced by a Ce$_2$Co$_{17}$ target.

The medium having the Ce$_2$Co$_{17}$ of 50 [nm] will be referred to as GG2 of the present invention.

It should be noted we also prepared a medium having the Ce$_2$Co$_{17}$ film and the Co$_{78}$Cr$_{19}$Ta$_3$ (at %) film in the reversed order. That is, firstly, Ce$_2$Co$_{17}$ film was formed on the FeSiAl film, and then the Co$_{78}$Cr$_{19}$Ta$_3$ film was formed on the Ce$_2$Co$_{17}$ film.

As has been shown in Example 17, the perpendicular magnetic anisotropic energy Ku of the Co$_{78}$Cr$_{19}$Ta$_3$ film is 9.0×10$^5$ [erg/cc], whereas the perpendicular magnetic anisotropic energy of the Ce$_2$Co$_{17}$ film is 3.0×10$^7$ [erg/cc], which is by far greater than the Ku of the Co$_{78}$Cr$_{19}$Ta$_3$ film. (See FIG. 90 and FIG. 7)

By using a mono-pole/MR (magneto-resistance effect) composite head, the recording/reproduction characteristics were checked on the medium GG2 of the present invention and the conventional medium B1. The check conditions were the same as in Example 26.

FIG. 134 shows the medium noise dependency on the recording density for the GG2 of the present invention and the conventional medium B1. As is clear from FIG. 134, the conventional medium B1 shows a very high medium noise in the lower recording density, whereas in the medium GG2 of the present invention, the medium noise in the same recording region is much suppressed in comparison to the conventional medium B1. This is because the medium GG2 of the present invention includes the film having much higher perpendicular magnetic anisotropy Ku than the Co$_{78}$Cr$_{19}$Ta$_3$ and the film is formed on the Co$_{78}$Cr$_{19}$Ta$_3$ film. Accordingly, in contrast to the conventional B1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 135. As is clear from FIG. 135, no output lowering can be seen up to 50 [nm] of the Ce$_2$Co$_{17}$ film. When the Ce$_2$Co$_{17}$ film thickness exceeds 50 [nm], the medium noise cannot be improved (reduced). This is because if Ce$_2$Co$_{17}$ film thickness becomes too large, Ce$_2$Co$_{17}$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium GG2 of the present invention shows a preferable medium noise characteristic even in a low recording density region. That is, by using the GG2 of the present invention, it is possible to realize suppression of medium noise increase in the low recording region.

Moreover, when the $Ce_2Co_{17}$ film was provided under or both under and over the perpendicular magnetization film, similar results were obtained because of the aforementioned reasons.

Furthermore, in the experiment using the ID/MR composite head used in Example 11 instead of the mono-pole composite head, similar results were obtained because of the aforementioned reasons.

EXAMPLE 33

Media of Example 33 were prepared in the same way as Example 26, except for that the $YCo_5$ target for sputtering was replaced by a $Sm_2Co_{17}$ target.

The medium having the. $Sm_2Co_{17}$ of 50 [nm] will be referred to as HH2 of the present invention.

It should be noted we also prepared a medium having the $Sm_2Co_{17}$ film and the $Co_{78}Cr_{19}Ta_3$ (at %) film in the reversed order. That is, firstly, $Sm_2Co_{17}$ film was formed on the FeSiAl film, and then the $Co_{78}Cr_{19}Ta_3$ film was formed on the $Sm_2Co_{17}$ film.

As has been shown in Example 18, the perpendicular magnetic anisotropic energy Ku of the $Co_{78}Cr_{19}Ta_3$ film is $9.0 \times 10^5$ [erg/cc], whereas the perpendicular magnetic anisotropic energy of the $Sm_2Co_{17}$ film is $4.2 \times 10^7$ [erg/cc], which is by far greater than the Ku of the $Co_{78}Cr_{19}Ta_3$ film. (See FIG. 90 and FIG. 7)

By using a mono-pole/MR (magneto-resistance effect) composite head, the recording/reproduction characteristics were checked on the medium HH2 of the present invention and the conventional medium B1. The check conditions were the same as in Example 26.

FIG. 136 shows the medium noise dependency on the recording density for the HH2 of the present invention and the conventional medium B1. As is clear from FIG. 136, the conventional medium B1 shows a very high medium noise in the lower recording density, whereas in the medium HH2 of the present invention, the medium noise in the same recording region is much suppressed in comparison to the conventional medium B1. This is because the medium HH2 of the present invention includes the film having much higher perpendicular magnetic anisotropy Ku than the $Co_{78}Cr_{19}Ta_3$ and the film is formed on the $Co_{78}Cr_{19}Ta_3$ film. Accordingly, in contrast to the conventional B1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 137. As is clear from FIG. 137, no output lowering can be seen up to 50 [nm] of the $Ce_2Co_{17}$ film. When the $Ce_2Co_{17}$ film thickness exceeds 50 [nm], the medium noise cannot be improved (reduced). This is because if $Sm_2Co_{17}$ film thickness becomes too large, $Sm_2Co_{17}$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium HH2 of the present invention shows a preferable medium noise characteristic even in a low recording density region. That is, by using the HH2 of the present invention, it is possible to realize suppression of medium noise increase in the low recording region.

Moreover, when the $SM_2Co_{17}$ film was provided under or both under and over the perpendicular magnetization film, similar results were obtained because of the aforementioned reasons.

Furthermore, in the experiment using the ID/MR composite head used in Example 11 instead of the mono-pole composite head, similar results were obtained because of the aforementioned reasons.

EXAMPLE 34

Media of Example 34 were prepared in the same way as Example 26, except for that the $YCo_5$ target for sputtering was replaced by a $La_2Co_{17}$ target.

The medium having the $La_2Co_{17}$ of 50 [nm] will be referred to as JJ2 of the present invention.

It should be noted we also prepared a medium having the $La_2Co_{17}$ film and the $Co_{78}Cr_{19}Ta_3$ (at %) film in the reversed order. That is, firstly, $La_2Co_{17}$ film was formed on the FeSiAl film, and then the $Co_{78}Cr_{19}Ta_3$ film was formed on the $La_2Co_{17}$ film.

As has been shown in Example 19, the perpendicular magnetic anisotropic energy Ku of the $Co_{78}Cr_{19}Ta_3$ film is $9.0 \times 10^5$ [erg/cc], whereas the perpendicular magnetic anisotropic energy of the $La_2Co_{17}$ film is $3.5 \times 10^7$ [erg/cc], which is by far greater than the Ku of the $Co_{78}Cr_{19}Ta_3$ film. (See FIG. 90 and FIG. 7)

By using a mono-pole/MR (magneto-resistance effect) composite head, the recording/reproduction characteristics were checked on the medium JJ2 of the present invention and the conventional medium B1. The check conditions were the same as in Example 26.

FIG. 138 shows the medium noise dependency on the recording density for the JJ2 of the present invention and the conventional medium B1. As is clear from FIG. 138, the conventional medium B1 shows a very high medium noise in the lower recording density, whereas in the medium JJ2 of the present invention, the medium noise in the same recording region is much suppressed in comparison to the conventional medium B1. This is because the medium JJ2 of the present invention includes the film having much higher perpendicular magnetic anisotropy Ku than the $Co_{78}Cr_{19}Ta_3$ and the film is formed on the $Co_{78}Cr_{19}Ta_3$ film. Accordingly, in contrast to the conventional B1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 139. As is clear from FIG. 139, no output lowering can be seen up to 50 [nm] of the $La_2Co_{17}$ film. When the $La_2Co_{17}$ film thickness exceeds 50 [nm], the medium noise cannot be improved (reduced). This is because if $La_2Co_{17}$ film thickness becomes too large, $La_2Co_{17}$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium JJ2 of the present invention shows a preferable medium noise characteristic even in a low recording density region. That is, by using the JJ2 of the present invention, it is possible to realize suppression of medium noise increase in the low recording region.

Moreover, when the $La_2Co_{17}$ film was provided under or both under and over the perpendicular magnetization film, similar results were obtained because of the aforementioned reasons.

Furthermore, in the experiment using the ID/MR composite head used in Example 11 instead of the mono-pole composite head, similar results were obtained because of the aforementioned reasons.

EXAMPLE 35

Media of Example 35 were prepared in the same way as Example 26, except for that the $YCo_5$ target for sputtering was replaced by a $Pr_2Co_{17}$ target.

The medium having the $Pr_2Co_{17}$ of 50 [nm] will be referred to as KK2 of the present invention.

It should be noted we also prepared a medium having the $Pr_2Co_{17}$ film and the $Co_{78}Cr_{19}Ta_3$ (at %) film in the reversed order. That is, firstly, $Pr_2Co_{17}$ film was formed on the FeSiAl film, and then the $Co_{78}Cr_{19}Ta_3$ film was formed on the $Pr_2Co_{17}$ film.

As has been shown in Example 20, the perpendicular magnetic anisotropic energy Ku of the $Co_{78}Cr_{19}Ta_3$ film is $9.0 \times 10^5$ [erg/cc], whereas the perpendicular magnetic anisotropic energy of the $La_2Co_{17}$ film is $2.7 \times 10^7$ [erg/cc], which is by far greater than the Ku of the $Co_{78}Cr_{19}Ta_3$ film. (See FIG. 90 and FIG. 7)

By using a mono-pole/MR (magneto-resistance effect) composite head, the recording/reproduction characteristics were checked on the medium KK2 of the present invention and the conventional medium B1. The check conditions were the same as in Example 26.

FIG. 140 shows the medium noise dependency on the recording density for the KK2 of the present invention and the conventional medium B1. As is clear from FIG. 140, the conventional medium B1 shows a very high medium noise in the lower recording density, whereas in the medium KK2 of the present invention, the medium noise in the same recording region is much suppressed in comparison to the conventional medium B1. This is because the medium KK2 of the present invention includes the film having much higher perpendicular magnetic anisotropy Ku than the $Co_{78}Cr_{19}Ta_3$ and the film is formed on the $Co_{78}Cr_{19}Ta_3$ film. Accordingly, in contrast to the conventional B1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 141. As is clear from FIG. 141, no output lowering can be seen up to 50 [nm] of the $Pr_2Co_{17}$ film. When the $Pr_2Co_{17}$ film thickness exceeds 50 [nm], the medium noise cannot be improved (reduced). This is because if $Pr_2Co_{17}$ film thickness becomes too large, $Pr_2Co_{17}$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium KK2 of the present invention shows a preferable medium noise characteristic even in a low recording density region. That is, by using the KK2 of the present invention, it is possible to realize suppression of medium noise increase in the low recording region.

Moreover, when the $Pr_2Co_{17}$ film was provided under or both under and over the perpendicular magnetization film, similar results were obtained because of the aforementioned reasons.

Furthermore, in the experiment using the ID/MR composite head used in Example 11 instead of the mono-pole composite head, similar results were obtained because of the aforementioned reasons.

EXAMPLE 36

Media of Example 36 were prepared in the same way as Example 26, except for that the $YCo_5$ target for sputtering was replaced by one of Ba ferrite materials, i.e., a $BaFe_{12}O_{19}$ target made from $BaFe_{12}O_{19}$.

The medium having the $BaFe_{12}O_{19}$ of 50 [nm] will be referred to as LL2 of the present invention.

It should be noted we also prepared a medium having the $BaFe_{12}O_{19}$ film and the $Co_{78}Cr_{19}Ta_3$ (at %) film in the reversed order. That is, firstly, $BaFe_{12}O_{19}$ film was formed on the FeSiAl film, and then the $Co_{78}Cr_{19}Ta_3$ film was formed on the $BaFe_{12}O_{19}$ film.

As has been shown in Example 21, the perpendicular magnetic anisotropic energy Ku of the $Co_{78}Cr_{19}Ta_3$ film is $9.0 \times 10^5$ [erg/cc], whereas the perpendicular magnetic anisotropic energy of the $BaFe_{12}O_{19}$ film is $3.3 \times 10^6$ [erg/cc], which is by far greater than the Ku of the $Co_{78}Cr_{19}Ta_3$ film. (See FIG. 111 and FIG. 7)

By using a mono-pole/MR (magneto-resistance effect) composite head, the recording/reproduction characteristics were checked on the medium LL2 of the present invention and the conventional medium B1. The check conditions were the same as in Example 26.

FIG. 142 shows the medium noise dependency on the recording density for the LL2 of the present-invention and the conventional medium B1. As is clear from FIG. 142, the conventional medium B1 shows a very high medium noise in the lower recording density, whereas in the medium LL2 of the present invention, the medium noise in the same recording region is much suppressed in comparison to the conventional medium B1. This is because the medium LL2 of the present invention includes the film having much higher perpendicular magnetic anisotropy Ku than the $Co_{78}Cr_{19}Ta_3$ and the film is formed on the $Co_{78}Cr_{19}Ta_3$ film. Accordingly, in contrast to the conventional B1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 143. As is clear from FIG. 143, no output lowering can be seen up to 50 [nm] of the $BaFe_{12}O_{19}$ film. When the $BaFe_{12}O_{19}$ film thickness exceeds 50 [nm], the medium noise cannot be improved (reduced). This is because if the $BaFe_{12}O_{19}$ film thickness becomes too large, the $BaFe_{12}O_{19}$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium LL2 of the present invention shows a preferable medium noise characteristic even in a low recording density region. That is, by using the LL2 of the present invention, it is possible to realize suppression of medium noise increase in the low recording region.

Moreover, when the $BaFe_{12}O_{19}$ film was provided under or both under and over the perpendicular magnetization film, similar results were obtained because of the aforementioned reasons.

Furthermore, in the experiment using the ID/MR composite head used in Example 11 instead of the mono-pole composite head, similar results were obtained because of the aforementioned reasons.

EXAMPLE 37

Media of Example 37 were prepared in the same way as Example 26, except for that the $YCo_5$ target for sputtering was replaced by one of Ba ferrite materials, i.e., a $BaFe_{18}O_{27}$ target made from $BaFe_{18}O_{27}$.

The medium having the $BaFe_{18}O_{27}$ of 50 [nm] will be referred to as MM2 of the present invention.

It should be noted we also prepared a medium having the $BaFe_{18}O_{27}$ film and the $Co_{78}Cr_{19}Ta_3$ (at %) film in the reversed order. That is, firstly, $BaFe_{18}O_{27}$ film was formed on the FeSiAl film, and then the $Co_{78}Cr_{19}Ta_3$ film was formed on the $BaFe_{18}O_{27}$ film.

As has been shown in Example 22, the perpendicular magnetic anisotropic energy Ku of the $Co_{78}Cr_{19}Ta_3$ film is $9.0 \times 10^5$ [erg/cc], whereas the perpendicular magnetic anisotropic energy of the $BaFe_{18}O_{27}$ film is $3.0 \times 10^6$ [erg/cc], which is by far greater than the Ku of the $Co_{78}Cr_{19}Ta_3$ film. (See FIG. 111 and FIG. 7)

By using a mono-pole/MR (magneto-resistance effect) composite head, the recording/reproduction characteristics were checked on the medium MM2 of the present invention and the conventional medium B1. The check conditions were the same as in Example 26.

FIG. 144 shows the medium noise dependency on the recording density for the MM2 of the present invention and the conventional medium B1. As is clear from FIG. 144, the conventional medium B1 shows a very high medium noise in the lower recording density, whereas in the medium MM2 of the present invention, the medium noise in the same recording region is much suppressed in comparison to the conventional medium B1. This is because the medium MM2 of the present invention includes the film having much higher perpendicular magnetic anisotropy Ku than the $Co_{78}Cr_{19}Ta_3$ and the film is formed on the $Co_{78}Cr_{19}Ta_3$ film. Accordingly, in contrast to the conventional B1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 145. As is clear from FIG. 145, no output lowering can be seen up to 50 [nm] of the $BaFe_{18}O_{27}$ film. When the $BaFe_{18}O_{27}$ film thickness exceeds 50 [nm], the medium noise cannot be improved (reduced). This is because if the $BaFe_{18}O_{27}$ film thickness becomes too large, the $BaFe_{18}O_{27}$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium MM2 of the present invention shows a preferable medium noise characteristic even in a low recording density region. That is, by using the MM2 of the present invention, it is possible to realize suppression of medium noise increase in the low recording region.

Moreover, when the $BaFe_{18}O_{27}$ film was provided under or both under and over the perpendicular magnetization film, similar results were obtained because of the aforementioned reasons.

Furthermore, in the experiment using the ID/MR composite head used in Example 11 instead of the mono-pole composite head, similar results were obtained because of the aforementioned reasons.

EXAMPLE 38

Media of Example 38 were prepared in the same way as Example 26, except for that the $YCo_5$ target for sputtering was replaced by one of Sr ferrite materials, i.e., a $SrFe_{12}O_{19}$ target made from $SrFe_{12}O_{19}$.

The medium having the $SrFe_{12}O_{19}$ of 50 [nm] will be referred to as NN2 of the present invention.

It should be noted we also prepared a medium having the $SrFe_{12}O_{19}$ film and the $Co_{78}Cr_{19}Ta_3$ (at %) film in the reversed order. That is, firstly, the $SrFe_{12}O_{19}$ film was formed on the FeSiAl film, and then the $Co_{78}Cr_{19}Ta_3$ film was formed on the $SrFe_{12}O_{19}$ film.

As has been shown in Example 23, the perpendicular magnetic anisotropic energy Ku of the $Co_{78}Cr_{19}Ta_3$ film is $7.0 \times 10^5$ [erg/cc], whereas the perpendicular magnetic anisotropic energy of the $SrFe_{12}O_{19}$ film is $3.4 \times 10^6$ [erg/cc], which is by far greater than the Ku of the $Co_{78}Cr_{19}Ta_3$ film. (See FIG. 111 and FIG. 7)

By using a mono-pole/MR (magneto-resistance effect) composite head, the recording/reproduction characteristics were checked on the medium NN2 of the present invention and the conventional medium B1. The check conditions were the same as in Example 26.

FIG. 146 shows the medium noise dependency on the recording density for the NN2 of the present invention and the conventional medium B1. As is clear from FIG. 146, the conventional medium B1 shows a very high medium noise in the lower recording density, whereas in the medium NN2 of the present invention, the medium noise in the same recording region is much suppressed in comparison to the conventional medium B1. This is because the medium NN2 of the present invention includes the film having much higher perpendicular magnetic anisotropy Ku than the $Co_{78}Cr_{19}Ta_3$ and the film is formed on the $Co_{78}Cr_{19}Ta_3$ film. Accordingly, in contrast to the conventional B1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 147. As is clear from FIG. 147, no output lowering can be seen up to 50 [nm] of the $SrFe_{12}O_{19}$ film. When the $SrFe_{12}O_{19}$ film thickness exceeds 50 [nm], the medium noise cannot be improved (reduced). This is because if the $SrFe_{12}O_{19}$ film thickness becomes too large, the $SrFe_{12}O_{19}$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium NN2 of the present invention shows a preferable medium noise characteristic even in a low recording density region. That is, by using the NN2 of the present invention, it is possible to realize suppression of medium noise increase in the low recording region.

Moreover, when the $SrFe_{12}O_{19}$ film was provided under or both under and over the perpendicular magnetization film, similar results were obtained because of the aforementioned reasons.

Furthermore, in the experiment using the ID/MR composite head used in Example 11 instead of the mono-pole composite head, similar results were obtained because of the aforementioned reasons.

EXAMPLE 39

Media of Example 39 were prepared in the same way as. Example 26, except for that the $YCo_5$ target for sputtering was replaced by one of Sr ferrite materials, i.e., a $SrFe_{18}O_{27}$ target made from $SrFe_{18}O_{27}$.

The medium having the $SrFe_{18}O_{27}$ of 50 [nm] will be referred to as PP2 of the present invention.

It should be noted we also prepared a medium having the $SrFe_{18}O_{27}$ film and the $Co_{78}Cr_{19}Ta_3$ (at %) film in the reversed order. That is, firstly, the $SrFe_{18}O_{27}$ film was formed on the FeSiAl film, and then the $Co_{78}Cr_{19}Ta_3$ film was formed on the $SrFe_{18}O_{27}$ film.

As has been shown in Example 24, the perpendicular magnetic anisotropic energy Ku of the $Co_{78}Cr_{19}Ta_3$ film is $9.0\times10^5$ [erg/cc], whereas the perpendicular magnetic anisotropic energy of the $SrFe_{18}O_{27}$ film is $3.1\times10^6$ [erg/cc], which is by far greater than the Ku of the $Co_{78}Cr_{19}Ta_3$ film. (See FIG. 111 and FIG. 7)

By using a mono-pole/MR (magneto-resistance effect) composite head, the recording/reproduction characteristics were checked on the medium PP2 of the present invention and the conventional medium B1. The check conditions were the same as in Example 26.

FIG. 148 shows the medium noise dependency on the recording density for the PP2 of the present invention and the conventional medium B1. As is clear from FIG. 148, the conventional medium B1 shows a very high medium noise in the lower recording density, whereas in the medium PP2 of the present invention, the medium noise in the same recording region is much suppressed in comparison to the conventional medium B1. This is because the medium PP2 of the present invention includes the film having much higher perpendicular magnetic anisotropy Ku than the $Co_{78}Cr_{19}Ta_3$ and the film is formed on the $Co_{78}Cr_{19}Ta_3$ film. Accordingly, in contrast to the conventional B1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 149. As is clear from FIG. 149, no output lowering can be seen up to 50 [nm] of the $SrFe_{18}O_{27}$ film. When the $SrFe_{18}O_{27}$ film thickness exceeds 50 [nm], the medium noise cannot be improved (reduced). This is because if the $SrFe_{18}O_{27}$ film thickness becomes too large, the $SrFe_{18}O_{27}$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium PP2 of the present invention shows a preferable medium noise characteristic even in a low recording density region. That is, by using the PP2 of the present invention, it is possible to realize suppression of medium noise increase in the low recording region.

Moreover, when the $SrFe_{18}O_{27}$ film was provided under or both under and over the perpendicular magnetization film, similar results were obtained because of the aforementioned reasons.

Furthermore, in the experiment using the ID/MR composite head used in Example 11 instead of the mono-pole composite head, similar results were obtained because of the aforementioned reasons.

EXAMPLE 40

Media of Example 40 were prepared in the same way as Example 26, except for that the $YCo_5$ target for sputtering was replaced by $Pt_{50}Co_{50}$ (at %) target The medium having the $Pt_{50}Co_5$ of 50 [nm] will be referred to as QQ2 of the present invention.

It should be noted we also prepared a medium having the $Pt_{50}Co_{50}$ film and the $Co_{78}Cr_{19}Ta_3$ (at %) film in the reversed order. That is, firstly, the $Pt_{50}Co_{50}$ film was formed on the FeSiAl film, and then the $Co_{78}Cr_{19}Ta_3$ film was formed on the $Pt_{50}Co_{50}$ film.

As has been shown in Example 25, the perpendicular magnetic anisotropic energy Ku of the $Co_{78}Cr_{19}Ta_3$ film is $9.0\times10^5$ [erg/cc], whereas the perpendicular magnetic anisotropic energy of the $Pt_{50}Co_{50}$ film is $1.0\times10^7$ [erg/cc], which is by far greater than the Ku of the $Co_{78}Cr_{19}Ta_3$ film. (See FIG. 111 and FIG. 7)

By using a mono-pole/MR (magneto-resistance effect) composite head, the recording/reproduction characteristics were checked on the medium QQ2 of the present invention and the conventional medium B1. The check conditions were the same as in Example 26.

FIG. 150 shows the medium noise dependency on the recording density for the QQ2 of the present invention and the conventional medium B1. As is clear from FIG. 150, the conventional medium B1 shows a very high medium noise in the lower recording density, whereas in the medium QQ2 of the present invention, the medium noise in the same recording region is much suppressed in comparison to the conventional medium B1. This is because the medium QQ2 of the present invention includes the film having much higher perpendicular magnetic anisotropy Ku than the $Co_{78}Cr_{19}Ta_3$ and the film is formed on the $Co_{78}Cr_{19}Ta_3$ film. Accordingly, in contrast to the conventional B1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 151. As is clear from FIG. 151, no output lowering can be seen up to 50 [nm] of the $Pt_{50}Co_{50}$ (at %) film. When the $Pt_{50}Co_{50}$ film thickness exceeds 50 [nm], the medium noise cannot be improved (reduced). This is because if the $Pt_{50}Co_{50}$ film thickness becomes too large, the $Pt_{50}Co_{50}$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium QQ2 of the present invention shows a preferable medium noise characteristic even in a low recording density region. That is, by using the QQ2 of the present invention, it is possible to realize suppression of medium noise increase in the low recording region.

Moreover, when the $Pt_{50}Co_{50}$ (at %) film was provided under or both under and over the perpendicular magnetization film, similar results were obtained because of the aforementioned reasons.

Furthermore, in the experiment using the ID/MR composite head used in Example 1 instead of the mono-pole composite head, similar results were obtained because of the aforementioned reasons.

EXAMPLE 41

Media of Example 41 were prepared in the same way as Example 26, except for that for sputtering, the $YCo_5$ target was replaced by $SmCo_5$ target, and the FeSiAl target was replaced by a FeTaN target.

The medium having the $SmCo_5$ of 50 [nm] will be referred to as RR2 of the present invention.

Note that we also prepared a medium having no $SmCo_5$ film. This medium will be referred to as C1.

We also prepared a medium having the $SmCo_5$ film and the $Co_{78}Cr_{19}Ta3$ (at %) film in the reversed order. That is, firstly, the $SmCo_5$ film was formed on the FeTaN film, and then the $Co_{78}Cr_{19}Ta_3$ film was formed on the $SmCo_5$ film.

As has been shown in Example 13, the perpendicular magnetic anisotropic energy Ku of the $Co_{78}Cr_{19}Ta_3$ film is $9.0 \times 10^5$ [erg/cc], whereas the perpendicular magnetic anisotropic energy of the $SmCo_5$ film is $1.0 \times 10^8$ [erg/cc], which is by far greater than the Ku of the $Co_{78}Cr_{19}Ta_3$ film. (See FIG. 90 and FIG. 7)

By using a mono-pole/MR (magneto-resistance effect) composite head, the recording/reproduction characteristics were checked on the medium RR2 of the present invention and the conventional medium C1. The check conditions were the same as in Example 26.

FIG. 152 shows the medium noise dependency on the recording density for the RR2 of the present invention and the conventional medium C1. As is clear from FIG. 152, the conventional medium C1 shows a very high medium noise in the lower recording density, whereas in the medium RR2 of the present invention, the medium noise in the same recording region is much suppressed in comparison to the conventional medium C1. This is because the medium RR2 of the present invention includes the film having much higher perpendicular magnetic anisotropy Ku than the $Co_{78}Cr_{19}Ta_3$ and the film is formed on the $Co_{78}Cr_{19}Ta_3$ film. Accordingly, in contrast to the conventional C1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 153. As is clear from FIG. 153, no output lowering can be seen up to 50 [nm] of the $SmCo_5$ (at %) film. When the $SmCo_5$ film thickness exceeds 50 [nm], the medium noise cannot be improved (reduced). This is because if the $SmCo_5$ film thickness becomes too large, the $SmCo_5$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium RR2 of the present invention shows a preferable medium noise characteristic even in a low recording density region. That is, by using the RR2 of the present invention, it is possible to realize suppression of medium noise increase in the low recording region.

Moreover, when the $SmCo_5$ film was provided under or both under and over the perpendicular magnetization film, similar results were obtained because of the aforementioned reasons.

Furthermore, in the experiment using the ID/MR composite head used in Example 11 instead of the mono-pole composite head, similar results were obtained because of the aforementioned reasons.

EXAMPLE 42

Media of Example 42 were prepared in the same way as Example 41, except for that for sputtering, the $SmCo_5$ target was replaced by $Sm_2Co_{17}$ target.

The medium having the $Sm_2Co_{17}$ of 50 [nm] will be referred to as SS2 of the present invention.

Note that we also prepared a medium having the $Sm_2Co_{17}$ film and the $Co_{78}Cr_{19}Ta_3$ (at %) film in the reversed order. That is, firstly, the $Sm_2Co_{17}$ film was formed on the FeTaN film, and then the $Co_{78}Cr_{19}Ta_3$ film was formed on the $Sm_2Co_{17}$ film.

As has been shown in Example 18, the perpendicular magnetic anisotropic energy Ku of the $Co_{78}Cr_{19}Ta_3$ film is $9.0 \times 10^5$ [erg/cc], whereas the perpendicular magnetic anisotropic energy of the $Sm_2Co_{17}$ film is $4.2 \times 10^7$ [erg/cc], which is by far greater than the Ku of the $Co_{78}Cr_{19}Ta_3$ film. (See FIG. 90 and FIG. 7)

By using a mono-pole/MR (magneto-resistance effect) composite head, the recording/reproduction characteristics were checked on the medium SS2 of the present invention and the conventional medium C1. The check conditions were the same as in Example 26.

FIG. 154 shows the medium noise dependency on the recording density for the SS2 of the present invention and the conventional medium C1. As is clear from FIG. 154, the conventional medium C1 shows a very high medium noise in the lower recording density, whereas in the medium SS2 of the present invention, the medium noise in the same recording region is much suppressed in comparison to the conventional medium C1. This is because the medium SS2 of the present invention includes the film having much higher perpendicular magnetic anisotropy Ku than the $Co_{78}Cr_{19}Ta_3$ and the film is formed on the $Co_{78}Cr_{19}Ta_3$ film.

Accordingly, in contrast to the conventional C1, it is possible to much more suppress generation of reversed magnetic domain in the vicinity of the surface of the perpendicular magnetization film.

Next, the film thickness of the film formed on the perpendicular magnetization film was gradually changed from 5 to 55 [nm] to check the medium noise values at recording density 10 [KFRPI] for all the film types. The results of this check are shown in FIG. 155. As is clear from FIG. 155, no output lowering can be seen up to 50 [nm] of the $Sm_2Co_{17}$ (at %) film. When the $Sm_2Co_{17}$ film thickness exceeds 50 [nm], the medium noise cannot be improved (reduced). This is because if the $Sm_2Co_{17}$ film thickness becomes too large, the $Sm_2Co_{17}$ film orientation in the perpendicular direction to the film surface is deteriorated and the perpendicular magnetic anisotropic energy Ku becomes smaller. Thus, it becomes impossible to suppress generation of a reversed magnetic domain in the vicinity of the perpendicular magnetization film.

As has been described above, the recording medium SS2 of the present invention shows a preferable medium noise characteristic even in a low recording density region. That is, by using the SS2 of the present invention, it is possible to realize suppression of medium noise increase in the low recording region.

Moreover, when the $Sm_2Co_{17}$ film was provided under or both under and over the perpendicular magnetization film, similar results were obtained because of the aforementioned reasons.

Furthermore, in the experiment using the ID/MR composite head used in Example 11 instead of the mono-pole composite head, similar results were obtained because of the aforementioned reasons.

In the perpendicular magnetic recording media according to the present invention, a perpendicular magnetic film is provided with a high perpendicular orientation film which has a higher perpendicular orientation than that perpendicular magnetic film and formed over or under the perpendicular magnetic film. This significantly suppress medium noise, i.e., generation of a reversed magnetic domain in the vicinity of the surface of the perpendicular magnetic film. This enables to obtain a perpendicular magnetic recording medium having a preferable medium noise characteristic.

This medium noise characteristic is further improved if the following condition is satisfied when the high perpendicular orientation film is formed using a CoCr alloy.

That is, the perpendicular magnetic anisotropic energy Ku [erg/cc] an the saturation magnetization Ms [emu/cc] is in the relationship: $R=2Ku/4\pi Ms^2$. If the CoCr alloy satisfies $R \geq 1.4$, an excellent effect can be obtained.

When the high perpendicular orientation film is made from RCo5 (R=Y, Ce, Sm, La, Pr) film, Ba ferrite film, Sr ferrite, and PtCo, it is possible an excellent effect if these films has a perpendicular magnetic anisotropic energy Ku greater than the perpendicular magnetic anisotropic energy of the perpendicular magnetization film.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-244060 (filed on Aug. $28^{th}$, 1998) including specification, claims, drawings and summary are incorporated herein by reference in its entirety.

What is claimed is:

1. A perpendicular magnetic recording medium having a perpendicular magnetization film formed on a substrate, wherein a high perpendicular orientation film having higher perpendicular magnetic anisotropic energy than the perpendicular magnetization film is formed over or/and under the perpendicular magnetization film;

wherein the high perpendicular orientation film is made from a Ba ferrite having a film thickness less than 50 nm.

2. A perpendicular magnetic recording medium as claimed in claim 1, wherein the Ba ferrite comprises $BaFe_{12}O_{19}$.

3. A perpendicular magnetic recording medium as claimed in claim 1, wherein the Ba ferrite comprises $BaFe_{18}O_{27}$.

4. A perpendicular magnetic recording medium having a perpendicular magnetization film formed on a substrate, wherein a high perpendicular orientation film having higher perpendicular magnetic anisotropic energy than the perpendicular magnetization film is formed over or/and under the perpendicular magnetization film;

wherein the high perpendicular orientation film is made from a Sr ferrite having a film thickness less than 50 nm.

5. A perpendicular magnetic recording medium as claimed in claim 4, wherein the Sr ferrite comprises $SrFe_{12}O_{19}$.

6. A perpendicular magnetic recording medium as claimed in claim 4, wherein the Sr ferrite comprises $SrFe_{18}O_{27}$.

* * * * *